United States Patent
Hayakawa et al.

(10) Patent No.: US 9,912,013 B2
(45) Date of Patent: Mar. 6, 2018

(54) ELECTROLYTE AND SECONDARY BATTERY

(71) Applicant: SONY CORPORATION, Tokyo (JP)

(72) Inventors: Yuko Hayakawa, Fukushima (JP); Tadahiko Kubota, Kanagawa (JP); Masayuki Ihara, Fukushima (JP)

(73) Assignee: Murata Manufacturing Co., LTD., Kyoto (JP)

( * ) Notice: Subject to any disclaimer, the term of this patent is extended or adjusted under 35 U.S.C. 154(b) by 0 days.

(21) Appl. No.: 15/259,267

(22) Filed: Sep. 8, 2016

(65) Prior Publication Data

US 2017/0098860 A1   Apr. 6, 2017

Related U.S. Application Data

(63) Continuation of application No. 14/794,426, filed on Jul. 8, 2015, now Pat. No. 9,450,273, which is a (Continued)

(30) Foreign Application Priority Data

Mar. 25, 2009   (JP) ................................. 2009-073661

(51) Int. Cl.
| | | |
|---|---|---|
| *H01M 10/0567* | (2010.01) | |
| *H01M 10/0569* | (2010.01) | |
| *H01M 10/0525* | (2010.01) | |
| *H01M 10/0568* | (2010.01) | |
| *H01M 4/587* | (2010.01) | |

(Continued)

(52) U.S. Cl.
CPC ....... *H01M 10/0569* (2013.01); *H01M 4/386* (2013.01); *H01M 4/525* (2013.01); (Continued)

(58) Field of Classification Search
None
See application file for complete search history.

(56) References Cited

U.S. PATENT DOCUMENTS

| | | |
|---|---|---|
| 8,197,964 B2 | 6/2012 | Saito et al. |
| 2004/0013946 A1 | 1/2004 | Abe et al. |

(Continued)

FOREIGN PATENT DOCUMENTS

| | | |
|---|---|---|
| CN | 1487621 | 4/2004 |
| CN | 101188282 | 5/2008 |

(Continued)

OTHER PUBLICATIONS

Chinese Office Action issued Jun. 24, 2014, for corresponding Chinese Application. No. 201080012266.8.

*Primary Examiner* — Yoshitoshi Takeuchi
(74) *Attorney, Agent, or Firm* — Chip Law Group

(57) ABSTRACT

Secondary batteries capable of improving cycle characteristics are provided. The secondary battery includes a cathode, an anode, and an electrolytic solution. A separator provided between the cathode and the anode is impregnated with the electrolytic solution. The electrolytic solution contains a solvent and an electrolyte salt. The solvent contains a cyclic compound having a disulfonic acid anhydride group (—S(=O)2-O—S(=O)2-) and at least one of a nitrile compound. Compared to a case that the solvent does not contain both the cyclic compound having the disulfonic acid anhydride group and succinonitrile or a case that that the solvent contains at least one thereof, chemical stability of the electrolytic solution is improved. Thus, even if charge and discharge are repeated, electrolytic solution decomposition is inhibited.

8 Claims, 8 Drawing Sheets

Related U.S. Application Data continuation of application No. 13/258,109, filed as application No. PCT/JP2010/054634 on Mar. 18, 2010, now Pat. No. 9,083,059.

(51) Int. Cl.
*H01M 4/525* (2010.01)
*H01M 4/38* (2006.01)

(52) U.S. Cl.
CPC ....... *H01M 4/587* (2013.01); *H01M 10/0525* (2013.01); *H01M 10/0567* (2013.01); *H01M 10/0568* (2013.01); *H01M 2300/004* (2013.01); *H01M 2300/0034* (2013.01)

(56) References Cited

U.S. PATENT DOCUMENTS

| | | |
|---|---|---|
| 2007/0224504 A1 | 9/2007 | Kita et al. |
| 2008/0057402 A1 | 3/2008 | Abe et al. |
| 2009/0011333 A1 | 1/2009 | Wakita et al. |
| 2009/0017374 A1 | 1/2009 | Saito et al. |
| 2009/0061303 A1 | 3/2009 | Inagaki et al. |

FOREIGN PATENT DOCUMENTS

| | | |
|---|---|---|
| CN | 101339984 | 1/2009 |
| CN | 101345326 | 1/2009 |
| CN | 101373848 | 2/2009 |
| EP | 2031689 | 3/2009 |
| JP | 2000-268859 | 9/2000 |
| JP | 2002-34324 | 11/2002 |
| JP | 2004-022336 | 1/2004 |
| JP | 2004-179146 | 6/2004 |
| JP | 2004-281368 | 10/2004 |
| JP | 2005-072003 | 3/2005 |
| JP | 2007-242411 | 9/2007 |
| JP | 2008-010414 | 1/2008 |
| JP | 2008-098053 | 4/2008 |
| JP | 2008-218298 | 9/2008 |
| JP | 2008-234988 | 10/2008 |
| JP | 2009-038018 | 2/2009 |

ELECTROLYTE AND SECONDARY BATTERY

CROSS REFERENCE TO RELATED APPLICATIONS

The present application is a continuation of U.S. application Ser. No. 14/794,426 filed on Jul. 8, 2015 which is a Continuation application of U.S. application Ser. No. 13/258,109, filed on Sep. 21, 2011, which is a national stage of International Application No. PCT/JP2010/054634 filed on Mar. 18, 2010, which claims priority to Japanese Patent Application No. 2009-073661 filed on Mar. 25, 2009, the disclosures of each of which are incorporated herein by reference.

BACKGROUND

The present invention relates to an electrolyte containing a solvent and an electrolyte salt and a secondary battery using the same.

In recent years, portable electronic devices such as combination cameras, digital still cameras, mobile phones, and notebook personal computers have been widely used, and it is strongly demanded to reduce their size and weight and to achieve their long life. Accordingly, as a power source for the portable electronic devices, a battery, in particular a small and light-weight secondary batter capable of providing a high energy density has been developed.

Specially, a lithium ion secondary battery using insertion and extraction of lithium ions for charge and discharge reaction, a lithium metal secondary battery using precipitation and dissolution of lithium metal and the like are extremely prospective, since such secondary batteries are able to provide a higher energy density compared to a lead battery and a nickel cadmium battery.

As an electrolyte of the lithium ion secondary battery and the lithium metal secondary battery, combination of an ester carbonate solvent such as ethylene carbonate and diethyl carbonate and an electrolyte salt such as lithium hexafluorophosphate is widely used, since such a combination has high electric conductivity and stable potential.

In addition, regarding electrolytic solution composition, various techniques have been proposed for the purpose of improving battery characteristics such as cycle characteristics and storage characteristics. Specifically, in order to improve cycle characteristics and storage characteristics, a disulfonic acid anhydride (refer to Patent documents 1 to 3), a nitrile compound (refer to Patent document 4), a diisocyanate compound (refer to Patent document 5) and the like are used. Further, in order to improve swollenness characteristics, a fluorinated ether compound and the like are used (refer to Patent document 6). In addition, a dicarboxylic anhydride such as a succinic anhydride (refer to Patent document 7), sultone, a pyrrolidone compound (refer to Patent documents 1 and 2) and the like are used.

CITATION LIST

Patent Documents

Patent document 1: Japanese Unexamined Patent Application Publication No. 2004-022336
Patent document 2: Japanese Unexamined Patent Application Publication No. 2004-281368
Patent document 3: Japanese Unexamined Patent Application Publication No. 2008-098053
Patent document 4: Japanese Unexamined Patent Application Publication No. 2005-072003
Patent document 5: Japanese Unexamined Patent Application Publication No. 2007-242411
Patent document 6: Japanese Unexamined Patent Application Publication No. 2002-343424
Patent document 7: Japanese Unexamined Patent Application Publication No. 2000-268859

SUMMARY

In these years, high performance and multi functions of the portable electronic devices are increasingly developed, and the electric power consumption thereof tends to be increased. Thus, charge and discharge of the secondary battery used as a power source are frequently repeated, and the cycle characteristics tend to be lowered. Accordingly, further improvement of the cycle characteristics of the secondary battery has been aspired.

In view of the foregoing problem, it is an object of the present invention to provide an electrolyte capable of improving cycle characteristics and a secondary battery using the same.

An electrolyte according to an embodiment of the present invention contains a solvent and an electrolyte salt. The solvent contains at least one type of sulfone compounds expressed by Formula (1) and Formula (2) and at least one of a nitrile compound and compounds expressed by Formula (3) to Formula (4). A secondary battery of the present invention includes a cathode, an anode, and an electrolyte containing a solvent and an electrolyte salt, in which the electrolyte has the foregoing composition.

[Chemical formula 1]

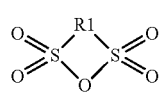

(1)

(R1 is an alkylene group with carbon number from 2 to 4 both inclusive or a halogenated group thereof, an alkenylene group with carbon number from 2 to 4 both inclusive or a halogenated group thereof, an arylene group or a halogenated group thereof, or a derivative thereof.)

[Chemical formula 2]

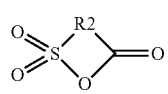

(2)

(R2 is an alkylene group with carbon number from 2 to 4 both inclusive or a halogenated group thereof, an alkenylene group with carbon number from 2 to 4 both inclusive or a halogenated group thereof, an arylene group or a halogenated group thereof, or a derivative thereof.)

[Chemical formula 3]

(3)

(R3 is an organic group with "a" valency containing carbon (C) and at least one element of oxygen (O), nitrogen (N), sulfur (S), silicon (Si), phosphorus (P), boron (B), and halogen. "a" is one of integer numbers from 1 to 3 both inclusive.)

[Chemical formula 4]

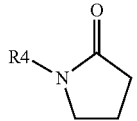

(4)

(R4 is an alkyl group with carbon number from 2 to 10 both inclusive, an alkenyl group with carbon number from 2 to 10 both inclusive, a cycloalkyl group, a cycloalkenyl group, an aromatic ring group, a heterocyclic group, or a derivative thereof.)

According to the electrolyte of the embodiment of the invention, the solvent contains at least one of the sulfone compounds expressed by Formula (1) and Formula (2) and at least one of succinonitrile, 1,6-dicyanohexane, 1,2,3-propane tricarbonitrile, 7,7,8,8-tetracyanoquinodimethane, and the compounds expressed by Formula (3) to Formula (4). Thus, compared to a case that the solvent does not contain both the sulfone compound and the compound such as succinonitrile or a case that that the solvent contains at least one thereof, chemical stability of the electrolyte is improved. Thus, according to the secondary battery using the electrolyte, even if charge and discharge are repeated, electrolyte decomposition reaction is inhibited. Accordingly, cycle characteristics are able to be improved.

Additional features and advantages of the present invention are described in, and will be apparent from, the following Detailed Description and the Figures.

DETAILED DESCRIPTION

Figure 1:
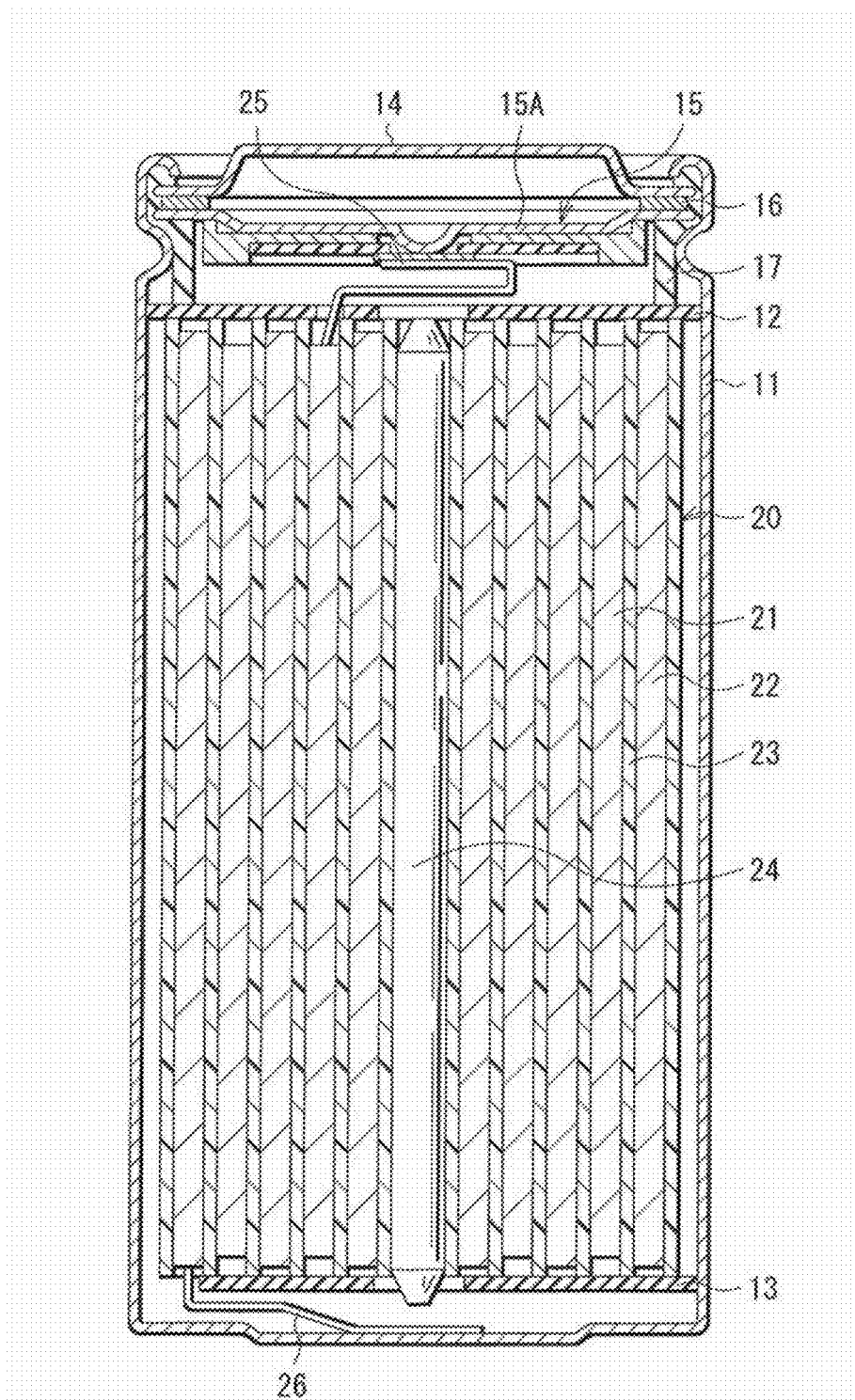
FIG. 1 is a cross sectional view illustrating a structure of a first secondary battery including an electrolyte according to an embodiment of the present invention.

A description will be hereinafter given in detail of an embodiment of the present invention with reference to the drawings. In addition, the description will be given in the following order.

1. Electrolyte
2. Electrochemical device using electrolyte (secondary battery)
   2-1. First secondary battery (lithium ion secondary battery: cylindrical type)
   2-2. Second secondary battery (lithium metal secondary battery: cylindrical type)
   2-3. Third secondary battery (lithium ion secondary battery: laminated film type)

<1. Electrolyte>

An electrolyte according to the embodiment of the present invention is used for, for example, an electrochemical device such as a secondary battery. In the electrolyte, an electrolyte salt is dissolved in a solvent. However, the electrolyte may contain other material such as various additives in addition to the solvent and the electrolyte salt.

[Solvent]

The solvent contains at least one of sulfone compounds expressed by Formula (1) and Formula (2) and at least one of succinonitrile ($NC-CH_2-CH_2-CN$), 1,6-dicyanohexane ($NC-CH_2-(CH_2)_4-CH_2-CN$), 1,2,3-propane tricarbonitrile ($NC-CH_2-CH(CN)-CH_2-CN$), 7,7,8,8-tetracyanoquinodimethane ($(NC)_2C=C_6H_4=C(CN)_2$), and compounds expressed by Formula (3) to Formula (5). Thereby, chemical stability of the electrolyte is improved more than in a case that both the sulfone compound and succinonitrile or the like are not contained or a case that only one thereof is contained. The sulfone compounds expressed by Formula (1) and Formula (2) will be hereinafter collectively referred to as "sulfone compound" according to needs. Similarly, succinonitrile, 1,6-dicyanohexane, 1,2,3-propane tricarbonitrile, and 7,7,8,8-tetracyanoquinodimethane will be collectively referred to as "nitrile compound." and the compounds expressed by Formula (3) will be collectively referred to as "isocyanate compound." Further, the compounds expressed by Formula (4) will be collectively referred to as "pyrrolidone compound." and the compounds expressed by Formula (5) will be collectively referred to as "ether compound."

[Chemical formula 6]

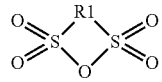

(1)

(R1 is an alkylene group with carbon number from 2 to 4 both inclusive or a halogenated group thereof, an alkenylene group with carbon number from 2 to 4 both inclusive or a halogenated group thereof, an arylene group or a halogenated group thereof, or a derivative thereof.)

[Chemical formula 7]

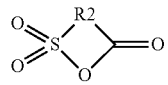

(2)

(R2 is an alkylene group with carbon number from 2 to 4 both inclusive or a halogenated group thereof, an alkenylene group with carbon number from 2 to 4 both inclusive or a halogenated group thereof, an arylene group or a halogenated group thereof, or a derivative thereof.)

[Chemical formula 8]

R3―[NCO]ₐ  (3)

(R3 is an organic group with "a" valency containing carbon and at least one element selected from the group consisting of oxygen, nitrogen, sulfur, silicon, phosphorus, boron, and halogen. "a" is one of integer numbers from 1 to 3 both inclusive.)

[Chemical formula 9]

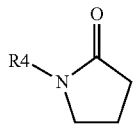
(4)

(R4 is an alkyl group with carbon number from 2 to 10 both inclusive, an alkenyl group with carbon number from 2 to 10 both inclusive, a cycloalkyl group, a cycloalkenyl group, an aromatic ring group, a heterocyclic group, or a derivative thereof.)

[Chemical formula 10]

R5―O―R6  (5)

(R5 and R6 are an alkyl group with carbon number from 1 to 10 both inclusive or a halogenated alkyl group with carbon number from 1 to 10 both inclusive. At least one thereof is the halogenated alkyl group with carbon number from 1 to 10 both inclusive.)

The sulfone compound shown in Formula (1) is a cyclic compound having a disulfonic acid anhydride (—S(=O)₂—O—S(=O)₂—). Regarding R1, the alkylene group and the alkenylene group may be a straight chain or branched group. As "halogenated group," specially, a perfluoro group is preferable. Further, though halogen type is not particularly limited, fluorine is specially preferable, since thereby chemical stability of the sulfone compound is improved. "Halogenated group" means a group obtained by substituting some of hydrogen included in a substituent group such as an alkyl group by halogen. "Halogenated" used for the after-mentioned halogenated alkyl group or the like means the same thing. Further, "derivative" means a group obtained by introducing one or two or more substituent groups to an alkyl group or the like. The substituent group to be introduced may be a hydrocarbon group or a group other than the hydrocarbon group.

Regarding R1, the carbon number of the alkylene group and the alkenylene group is from 2 to 4 both inclusive for the following reason. That is, superior solubility and superior compatibility are thereby obtained, and chemical stability of the sulfone compound is improved. More specifically, in the case where the carbon number is 1, sufficient chemical stability is not able to be obtained. Meanwhile, in the case where the carbon number is 5 or more, sufficient solubility and sufficient compatibility are not able to be obtained.

Examples of the sulfone compound shown in Formula (1) include compounds expressed by Formula (1-1) to Formula (1-22). Such compounds include a geometric isomer. Specially, the compound shown in Formula (1-1) or the compound shown in Formula (1-2) is preferable, since thereby high effect is obtained and such a compound is easily available. It is to be noted that the sulfone compound shown in Formula (1) is not limited to the compounds shown in Formula (1-1) to Formula (1-22), and may be other compound.

[Chemical formula 11]

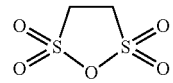
(1-1)

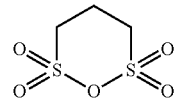
(1-2)

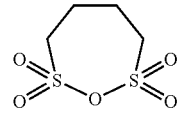
(1-3)

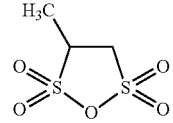
(1-4)

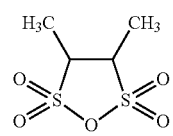
(1-5)

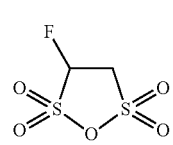
(1-6)

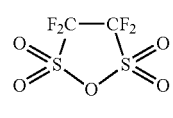
(1-7)

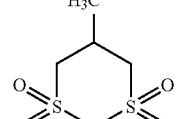
(1-8)

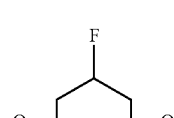
(1-9)

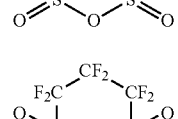
(1-10)

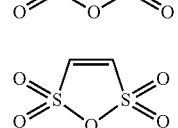
(1-11)

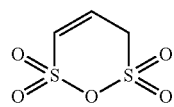
(1-12)

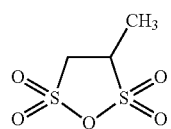
(1-13)

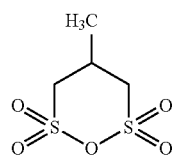
(1-14)

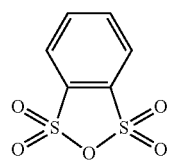
(1-15)

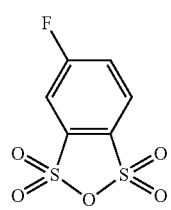
(1-16)

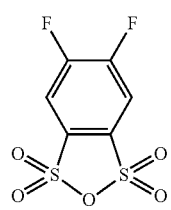
(1-17)

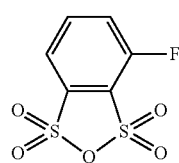
(1-18)

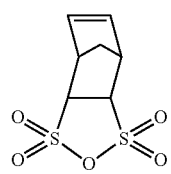
(1-19)

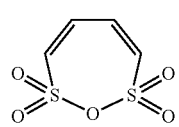
(1-20)

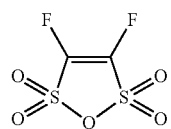
(1-21)

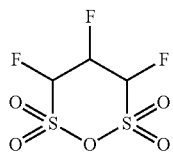
(1-22)

The sulfone compound shown in Formula (2) is a cyclic compound having a sulfonic acid carboxylic acid anhydride (—S(=O)$_2$—O—C(=O)—). Details of the structure and the carbon number of R2 are similar to those described for R1.

Examples of the sulfone compound shown in Formula (2) include compounds expressed by Formula (2-1) to Formula (2-20). Such compounds include a geometric isomer. Specially, the compound shown in Formula (2-1) or the compound shown in Formula (2-2) is preferable, since thereby high effect is obtained and such a compound is easily available. It is to be noted that the sulfone compound shown in Formula (2) is not limited to the compounds shown in Formula (2-1) to Formula (2-20), and may be other compound.

[Chemical formula 12]

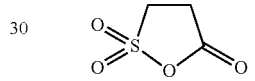
(2-1)

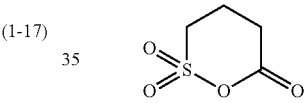
(2-2)

(2-3)

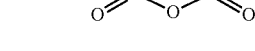
(2-4)

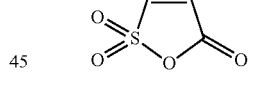
(2-5)

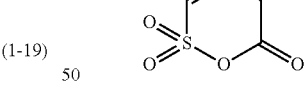
(2-6)

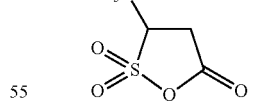
(2-7)

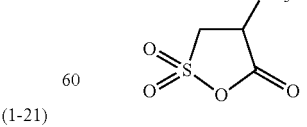
(2-8)

-continued

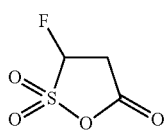
(2-9)

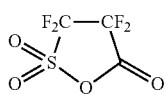
(2-10)

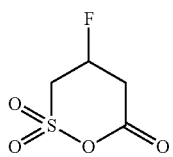
(2-11)

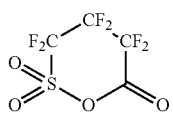
(2-12)

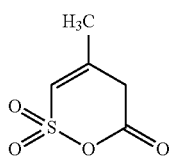
(2-13)

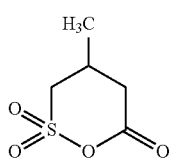
(2-14)

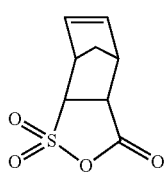
(2-15)

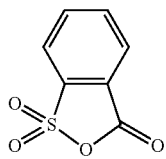
(2-16)

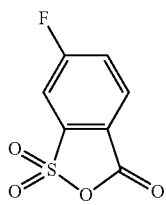
(2-17)

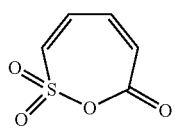
(2-18)

-continued

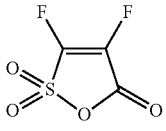
(2-19)

(2-20)

The nitrile compound is the foregoing succinonitrile or the like for the following reason. That is, in the case where the foregoing succinonitrile or the like is used together with the sulfone compound, chemical stability of the electrolyte is more improved than in the case that other compound having a cyano group (—CN) is used.

The isocyanate compound shown in Formula (3) is a compound having one, two, or three isocyanate groups (—N=C=O). The number of isocyanate groups is one, two, or three for the following reason. That is, superior solubility and superior compatibility are thereby obtained, and chemical stability of the isocyanate compound is improved. That is, in the case where the number of isocyanate groups is four or more, sufficient solubility, sufficient compatibility, and sufficient chemical stability are less likely to be obtained.

Regarding R3, the structure, the carbon number and the like are arbitrary as long as R3 is an monovalent/bivalent/trivalent organic group (organic group with "a" valency) containing hydrogen, oxygen or the like described above together with carbon. Regarding R3, examples of the monovalent organic group include a straight chain or branched alkyl group, a cycloalkyl group, an aromatic hydrocarbon group, a group having ether bond (—O—), and a halogenated group thereof. In the case where R3 is the straight chain alkyl group, examples thereof include the following group or the like. That is, a methyl group (—CH₃), an ethyl group expressed by Formula (3-1), an n-propyl group expressed by Formula (3-2), an n-butyl group expressed by Formula (3-3), an n-pentyl group expressed by Formula (3-4), an n-hexyl group expressed by Formula (3-5), an n-heptyl group expressed by Formula (3-6), and an n-octyl group expressed by Formula (3-7). In the case where R3 is the branched alkyl group, examples thereof include a branched alkyl group with carbon number from 3 to 12 both inclusive expressed by Formula (3-8) to Formula (3-28). In the case where R3 is the cycloalkyl group, examples thereof include a cyclohexyl group. In the case where R3 is the monovalent aromatic hydrocarbon group, examples thereof include a phenyl group (—$C_6H_5$) expressed by Formula (3-29) and a group obtained by binding an alkylene group and an aryl group expressed by Formula (3-30) to Formula (3-35). In the case where R3 is the monovalent group having ether bond, examples thereof include a group obtained by binding an alkylene group and an alkyl group with ether bond in between expressed by Formula (3-36) to Formula (3-63).

[Chemical formula 13]

—CH₂—CH₃ (3-1)

-continued

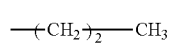 (3-2)

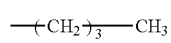 (3-3)

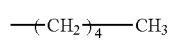 (3-4)

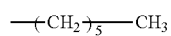 (3-5)

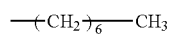 (3-6)

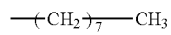 (3-7)

[Chemical formula 14]

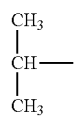 (3-8)

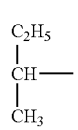 (3-9)

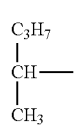 (3-10)

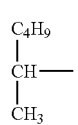 (3-11)

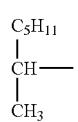 (3-12)

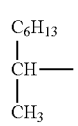 (3-13)

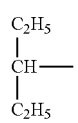 (3-14)

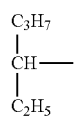 (3-15)

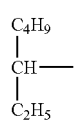 (3-16)

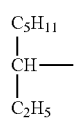 (3-17)

$\begin{array}{c} C_6H_{13} \\ | \\ CH{-\!\!\!-} \\ | \\ C_2H_5 \end{array}$ (3-18)

$\begin{array}{c} C_3H_7 \\ | \\ CH{-\!\!\!-} \\ | \\ C_3H_7 \end{array}$ (3-19)

$\begin{array}{c} C_4H_9 \\ | \\ CH{-\!\!\!-} \\ | \\ C_3H_7 \end{array}$ (3-20)

$\begin{array}{c} C_5H_{11} \\ | \\ CH{-\!\!\!-} \\ | \\ C_3H_7 \end{array}$ (3-21)

$\begin{array}{c} C_6H_{13} \\ | \\ CH{-\!\!\!-} \\ | \\ C_3H_7 \end{array}$ (3-22)

$\begin{array}{c} C_4H_9 \\ | \\ CH{-\!\!\!-} \\ | \\ C_4H_9 \end{array}$ (3-23)

$\begin{array}{c} C_5H_{11} \\ | \\ CH{-\!\!\!-} \\ | \\ C_4H_9 \end{array}$ (3-24)

$\begin{array}{c} C_6H_{13} \\ | \\ CH{-\!\!\!-} \\ | \\ C_4H_9 \end{array}$ (3-25)

$\begin{array}{c} C_5H_{11} \\ | \\ CH{-\!\!\!-} \\ | \\ C_5H_{11} \end{array}$ (3-26)

$\begin{array}{c} C_6H_{13} \\ | \\ CH{-\!\!\!-} \\ | \\ C_5H_{11} \end{array}$ (3-27)

$\begin{array}{c} C_6H_{13} \\ | \\ CH{-\!\!\!-} \\ | \\ C_6H_{13} \end{array}$ (3-28)

[Chemical formula 15]

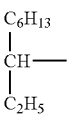 (3-29)

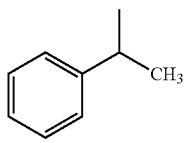 (3-30)
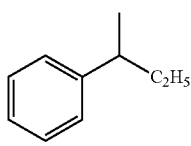 (3-31)
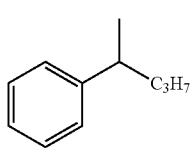 (3-32)
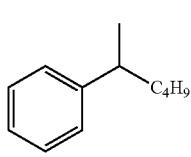 (3-33)
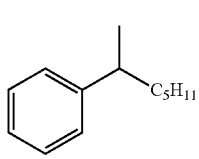 (3-34)
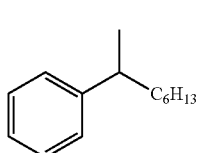 (3-35)
[Chemical formula 16]
 (3-36)
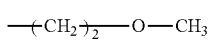 (3-37)
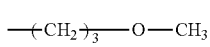 (3-38)
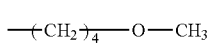 (3-39)
 (3-40)
 (3-41)
 (3-42)
 (3-43)
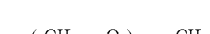 (3-44)
 (3-45)
 (3-46)
 (3-47)
 (3-48)
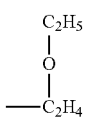 (3-49)
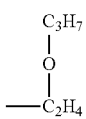 (3-50)
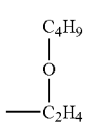 (3-51)
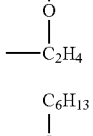 (3-52)
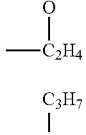 (3-53)
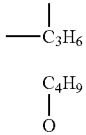 (3-54)
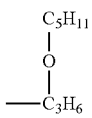 (3-55)
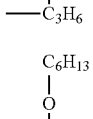 (3-56)
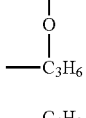 (3-57)
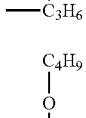 (3-58)
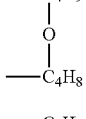 (3-59)
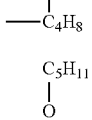 (3-60)
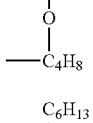 (3-61)
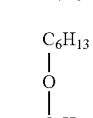
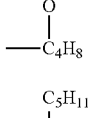
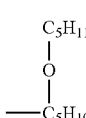
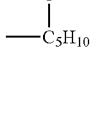

-continued

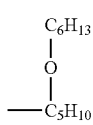   (3-62)

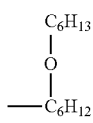   (3-63)

In the case where R3 is the halogenated group of the monovalent organic group, examples thereof include the following groups. That is, a fluoromethyl group, a difluoromethyl group, a trifluoromethyl group, a chain fluorinated alkyl group expressed by Formula (3-64) to Formula (3-79), a branched fluorinated alkyl group expressed by Formula (3-80) to Formula (3-85), and a fluorinated aromatic ring group expressed by Formula (3-86) to Formula (3-92). In this case, though halogen type is arbitrary, halogen is preferably fluorine in order to further improve chemical stability. It is to be noted that in the case where R3 is the monovalent organic group, the monovalent organic group is not limited to the foregoing group, and may be other monovalent organic group. Examples of other monovalent organic group include the following groups. That is, an alkenyl group such as a vinyl group, a 2-methylvinyl group, a 2,2-dimethylvinyl group, a butene-2,4-diyl group, and an aryl group, an alkynyl group such as an ethynyl group, a monovalent heterocyclic group, a halogenated group thereof, and a derivative thereof.

[Chemical formula 17]

—CH$_2$—CF$_3$   (3-64)

—(CH$_2$)$_2$—CF$_3$   (3-65)

—(CH$_2$)$_4$—CF$_3$   (3-66)

—(CH$_2$)$_5$—CF$_3$   (3-67)

—(CH$_2$)$_6$—CF$_3$   (3-68)

—(CH$_2$)$_7$—CF$_3$   (3-69)

—CF$_2$—CF$_3$   (3-70)

—(CF$_2$)$_2$—CF$_3$   (3-71)

—(CF$_2$)$_4$—CF$_3$   (3-72)

—(CF$_2$)$_5$—CF$_3$   (3-73)

—(CF$_2$)$_6$—CF$_3$   (3-74)

—(CF$_2$)$_7$—CF$_3$   (3-75)

—CH$_{2-x10}$F$_{x10}$—CH$_{2-x11}$F$_{x11}$—H   (3-76)

—(CH$_{2-x12}$F$_{x12}$—CH$_{2-x13}$F$_{x13}$)$_2$—H   (3-77)

-continued

—(CH$_{2-x14}$F$_{x14}$—CH$_{2-x15}$F$_{x15}$)$_3$—H   (3-78)

—(CH$_{2-x16}$F$_{x16}$—CH$_{2-x17}$F$_{x17}$)$_4$—H   (3-79)

(x10 to x17 are one of integer numbers from 0 to 2 both inclusive. x10 to x17 may be identical or different from each other. However, x10+x112:1, x12+x132:1, x14+x152:1, and x16+x172:1 are satisfied.)

[Chemical formula 18]

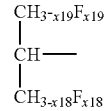   (3-80)

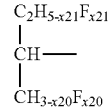   (3-81)

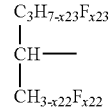   (3-82)

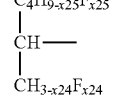   (3-83)

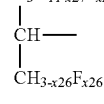   (3-84)

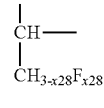   (3-85)

(x18 to x20, x22, x24, x26, and x28 are one of integer numbers from 0 to 3 both inclusive. x21 is one of integer numbers from 0 to 5 both inclusive. x23 is one of integer numbers from 0 to 7 both inclusive. x25 is one of integer numbers from 0 to 9 both inclusive. x27 is one of integer numbers from 0 to 11 both inclusive. x29 is one of integer numbers from 0 to 13 both inclusive. x18 to x29 may be identical or different from each other. x18+x192:1, x20+x212:1, x22+x232:1, x24+x252:1, x26+x272:1, and x28+x292:1 are satisfied.)

[Chemical formula 19]

C$_6$H$_{5-x30}$F$_{x30}$—   (3-86)

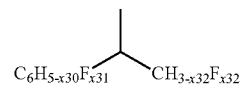   (3-87)

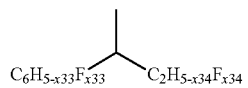
(3-88)

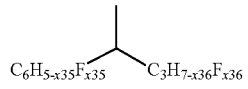
(3-89)

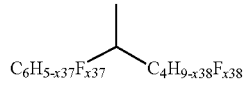
(3-90)

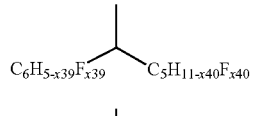
(3-91)

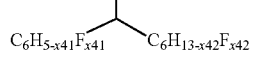
(3-92)

(x30 is one of integer numbers from 1 to 5 both inclusive. x31, x33, x35, x37, x39, and x41 are one of integer numbers from 0 to 5 both inclusive. x32 is one of integer numbers from 0 to 3 both inclusive. x34 is one of integer numbers from 0 to 5 both inclusive. x36 is one of integer numbers from 0 to 7 both inclusive. x38 is one of integer numbers from 0 to 9 both inclusive. x40 is one of integer numbers from 0 to 11 both inclusive. x42 is one of integer numbers from 0 to 13 both inclusive. x30 to x42 may be identical or different from each other. x31+x322:1, x33+x342:1, x35+x362:1, x37+x382:1, x39+x402:1, and x41+x422:1 are satisfied.)

Regarding R3, examples of the divalent organic group include a straight chain or branched alkylene group, a cycloalkylene group, an aromatic hydrocarbon group, a group having ether bond (—O—), and a halogenated group thereof. In the case where R3 is the straight chain alkylene group, examples thereof include a methylene group (—CH$_2$—) and an alkylene group with carbon number from 1 to 8 both inclusive expressed by Formula (3-93) to Formula (3-99). In the case where R3 is the branched alkylene group, examples thereof include an alkylene group with carbon number from 3 to 8 both inclusive expressed by Formula (3-100) to Formula (3-108). In the case where R3 is the cycloalkylene group, examples thereof include a cyclohexylene group. Further, in the case where R3 is the divalent aromatic hydrocarbon group, examples thereof include an arylene group expressed by Formula (3-109) to Formula (3-111) and a group obtained by binding two alkylene groups with an arylene group in between expressed by Formula (3-112) to Formula (3-114). In the case where R3 is the divalent group having ether bond, examples thereof include a divalent group including ether bond and an alkylene group expressed by Formula (3-115) to Formula (3-127). In the case where R3 is the halogenated group, examples thereof include a group including ether bond and a fluorinated alkylene group expressed by Formula (3-128) to Formula (3-136). It is to be noted that regarding R3, the divalent organic group is not limited to the foregoing group, and may be other divalent organic group. Examples of other divalent organic group include a carbonyl group (—C(═O)—) and a group obtained by binding a carbonyl group and an alkylene group.

[Chemical formula 20]

—(CH$_2$)$_2$— (3-93)

—(CH$_2$)$_3$— (3-94)

—(CH$_2$)$_4$— (3-95)

—(CH$_2$)$_5$— (3-96)

—(CH$_2$)$_6$— (3-97)

—(CH$_2$)$_7$— (3-98)

—(CH$_2$)$_8$— (3-99)

[Chemical formula 21]

(3-100)

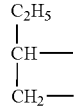
(3-101)

(3-102)

(3-103)

(3-104)

(3-105)

(3-106)

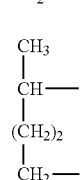
(3-107)

-continued

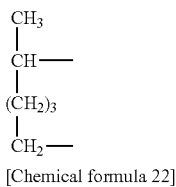

[Chemical formula 22]

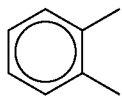

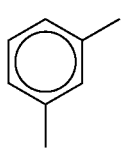

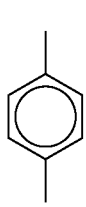

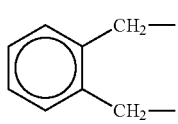

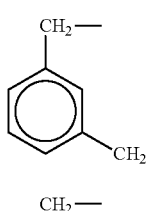

[Chemical formula 23]

(3-105) —CH₂—O—CH₂—

(3-106) —CH₂—(O—CH₂)₂—

(3-107) —CH₂—(O—CH₂)₃—

(3-115) —CH₂—(O—CH₂)₄—

(3-116) —CH₂—(O—CH₂)₅—

(3-117) —CH₂—CH₂—O—CH₂—CH₂—

(3-118) —CH₂—CH₂—(O—CH₂—CH₂)₂—

(3-119) —CH₂—CH₂—(O—CH₂—CH₂)₃—

(3-108) —CH₂—CH₂—(O—CH₂—CH₂)₄—

(3-123) —CH₂—CH₂—(O—CH₂—CH₂)₄—

(3-124) —CH₂—CH₂—(O—CH₂—CH₂)₅—

(3-125) —CH₂—CH₂—CH₂—O—CH₂—CH₂—CH₂—

(3-126) —CH₂—CH₂—CH₂—(O—CH₂—CH₂—CH₂)₂—

(3-127) —CH₂—CH₂—CH₂—(O—CH₂—CH₂—CH₂)₃—

[Chemical formula 24]

(3-128) —CF₂—O—CF₂—

(3-129) —CF₂—(O—CF₂)₂—

(3-130) —CF₂—(O—CF₂)₃—

(3-131) —CF₂—CF₂—O—CF₂—CF₂—

(3-132) —CF₂—CF₂—(O—CF₂—CF₂)₂—

(3-133) —CF₂—CF₂—(O—CF₂—CF₂)₃—

(3-134) —CH₂—CF₂—O—CF₂—CH₂—

(3-135) —CH₂—CF₂—O—CF₂—CF₂—O—CF₂—CH₂—

(3-136) —CH₂—CF₂—(O—CF₂—CF₂)₂—O—CF₂—CH₂—

Examples of the isocyanate compound shown in Formula (3) include a monoisocyanate compound, a diisocyanate compound, and a triisocyanate compound. Examples of the monoisocyanate compound include the following compounds. That is, 1-isocyanatoethane ($C_2H_5$—NCO), 3-isocyanato-1-propene ($CH_2$=CH—$CH_2$—NCO), 2-isocyanatopropane (($H_3C$)$_2$CH—NCO), 1-isocyanatopropane ($H_3C$—$CH_2$—$CH_2$—NCO), 1-isocyanatobutane ($H_3C$—$CH_2$—$CH_2$—$CH_2$—NCO), 2-isocyanato-2-methylpropane (($H_3C$)$_3$C—NCO), 2-isocyanatobutane ($H_3C$—CH(NCO)—$CH_2$—$CH_3$), methylisocyanatoformate (OCN—$CH_2$—O—C(=O)—H), 1-isocyanatopentane ($H_3C$—$CH_2$—$CH_2$—$CH_2$—$CH_2$—NCO), ethylisocyanatoformate (OCN—$CH_2$—$CH_2$—O—C(=O)—H), isocyanatobenzene ($C_6H_5$—NCO), 1-chloro-3-isocyanatopropane (OCN—$CH_2$—$CH_2$—$CH_2$Cl), isocyanatocyclohexane ($C_6H_{11}$—NCO), isocyanatohexane ($C_6H_{13}$—NCO), and 1-isocyanatoheptane ($C_7H_{15}$—NCO). Further, examples of the diisocyanate compound include the following compounds. That is, diisocyanatomethane (OCN—$CH_2$—NCO), 1,3-diisocyanatopropane (OCN—$CH_2$—$CH_2$—$CH_2$—NCO), 1,4-diisocyanatobutane (OCN—$CH_2$—($CH_2$)$_2$—$CH_2$—NCO), 1,6-diisocyanato hexane (OCN—$CH_2$—($CH_2$)$_4$—$CH_2$—NCO), 1,8-diisocyanatooctane (OCN—$CH_2$—($CH_2$)$_6$—$CH_2$—NCO), 1,12-diisocyanatododecane ((OCN—$CH_2$—($CH_2$)$_{10}$—$CH_2$—NCO), carbonyldiisocyanato (OCN—C(=O)—NCO), 1,4-diisocyanatobutane-1,4-dione (OCN—C(=O)—($CH_2$)$_2$—C(=O)—NCO), and 1,5-diisocyanatopentane-1,5-dione (OCN—C(=O)—($CH_2$)$_3$—C(=O)—NCO). Specially, as the isocyanate compound, 1-isocyanatopentane, 1,8-dicyanatooctane, or 1,4-diisocyanatobutane-1,4-dione is preferable, since thereby higher effect is able to be obtained. It is to be noted that the isocyanate compound is not limited to the foregoing compound, and may be other compound.

The pyrrolidone compound expressed by Formula (4) is a compound having a 2-pyrrolidone skeleton. Regarding R4, the carbon number of the alkyl group and the alkenylene group is from 2 to 10 both inclusive for the following reason. That is, favorable solubility and favorable compatibility are thereby obtained, and chemical stability is improved. More specifically, in the case where the carbon number is 1, sufficient chemical stability is not able to be obtained. Meanwhile, in the case where the carbon number is 11 or more, sufficient solubility and sufficient compatibility are not able to be obtained. Regarding R4, examples of the alkyl group include a straight chain or branched alkyl group. Specific examples thereof include the alkyl group shown in the foregoing Formula (3-1) to Formula (3-24). Regarding R4, examples of the alkenyl group include a vinyl group, a 2-methylvinyl group, a 2,2-dimethylvinyl group, a butene-2,4-diyl group, and an aryl group. Regarding R4, examples of the cycloalkyl group include a cyclohexyl group, examples of the cycloalkenyl group include a cyclohexene group, and examples of the aromatic ring group include a phenyl group. Further, regarding R4, the derivative may be, for example, a halogenated group of the foregoing alkyl group or the like. Specifically, the derivative may be the groups shown in the foregoing Formula (3-64) to Formula (3-92). It is to be noted that R4 is not limited to the foregoing group, and may be a derivative other than the halogenated group thereof.

As the pyrrolidone compound shown in Formula (4), N-ethyl-2-pyrrolidone, N-propyl-2-pyrrolidone. N-cyclohexyl-2-pyrrolidone, or N-phenyl-2-pyrrolidone is preferable, since thereby higher effect is able to be obtained. The pyrrolidone compound is not limited to the foregoing compound, and may be other compound.

The ether compound shown in Formula (5) is a compound containing a halogenated alkyl group and ether bond. R5 and R6 may be identical type with each other or different type from each other. The carbon numbers of R5 and R6 are respectively from 1 to 10 both inclusive for the following reason. That is, favorable solubility and favorable compatibility are thereby obtained, and chemical stability is improved. Regarding R5 and R6, examples of the alkyl group include a straight chain or branched alkyl group. Specific examples thereof include the alkyl group shown in the foregoing Formula (3-1) to Formula (3-24) in addition to the methyl group. Further, examples of the halogenated alkyl group include a fluoromethyl group, a difluoromethyl group, a trifluoromethyl group, and the branched fluorinated alkyl group expressed by Formula (3-64) to Formula (3-85) described above. In this case, though halogen type is arbitrary, in particular, fluorine is preferable in order to obtain higher chemical stability.

Examples of the ether compound shown in Formula (5) include $C_4F_9OCH_3$, $C_4F_9OC_2H_5$, $C_6F_{13}OCH_3$, and $C_3HF_6$—$CH(CH_3)$—$OC_3HF_6$. Specially. $C_4F_9OCH_3$ or $C_6F_{13}OCH_3$ is preferable, since thereby higher effect is able to be obtained. It is to be noted that the ether compound is not limited to the foregoing compound, and may be other compound.

Though the content of the sulfone compound in the electrolyte is not particularly limited, the content is preferably 0.01 wt % or more and 5 wt % or less. Further, a content of at least one of the nitrile compound, the isocyanate compound, the pyrrolidone compound, and the ether compound in the electrolyte is not particularly limited. Specially, a content of at least one of the nitrile compound, the isocyanate compound, the pyrrolidone compound, and the ether compound in the electrolyte is preferably 0.01 wt % or more and 20 wt % or less. In particular, in the case where the nitrile compound or the like other than the ether compound is used, the content of the nitrile compound, the isocyanate compound, or the pyrrolidone compound in the electrolyte is preferably 0.01 wt % or more and 5 wt % or less. In the case where the ether compound is used, the content of the ether compound in the electrolyte is preferably 5 wt % or more and 15 wt % or less. In the case where both the sulfone compound and the nitrile compound or the like are used in the foregoing range, chemical stability is particularly improved.

In addition, the solvent may contain other material as long as the solvent contains the foregoing sulfone compound and the foregoing nitrile compound or the like. Such other material is, for example, one or more of the nonaqueous solvents such as an organic solvent described below. It is to be noted that in the after-mentioned nonaqueous solvents, solvents corresponding to the sulfone compound and the nitrile compound or the like are excluded.

Examples of nonaqueous solvents include the following. That is, examples thereof include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide. N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. Superior characteristics are thereby obtained in an electrochemical device using the electrolyte. Such characteristics mean, for example, a battery capacity, cycle characteristics, storage characteristics and the like in the case where the electrolyte is used for a secondary battery.

Specially, at least one kind of ethylene carbonate, propylene carbonate, dimethyl carbonate, diethyl carbonate, and ethyl methyl carbonate is preferable, since thereby superior battery capacity, superior cycle characteristics, superior storage characteristics and the like are obtained. In this case, a combination of a high viscosity (high dielectric constant) solvent (for example, specific inductive £2:30) such as ethylene carbonate and propylene carbonate and a low viscosity solvent (for example, viscosity::1 mPa·s) such as dimethyl carbonate, ethylmethyl carbonate, and diethyl carbonate is more preferable. Thereby, dissociation property of the electrolyte salt and ion mobility are improved.

In particular, the solvent preferably contains at least one of a halogenated chain ester carbonate expressed by Formula (6) and a halogenated cyclic ester carbonate expressed by Formula (7). Thereby, in the case where the solvent is used for an electrochemical device, a stable protective film is formed on the surface of the electrode at the time of electrode reaction, and thus decomposition reaction of the electrolyte is inhibited. "Halogenated chain ester carbonate" is a chain ester carbonate containing halogen as an element.

"Halogenated cyclic ester carbonate" is a cyclic ester carbonate containing halogen as an element. R11 to R16 in Formula (6) may be identical type with each other or different type from each other. The same is applied to R17 to R20 in Formula (7). The content of the halogenated chain ester carbonate and the content of the halogenated cyclic ester carbonate in the solvent are, for example, from 0.01 wt % to 50 wt % both inclusive. However, the type of the halogenated chain ester carbonate or the halogenated cyclic ester carbonate is not necessarily limited to the compounds described below, and may be other compound.

[Chemical formula 25]

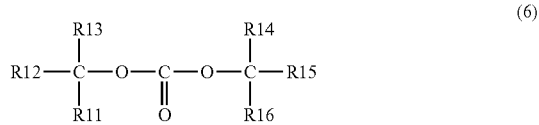

(6)

(R11 to R16 are a hydrogen group, a halogen group, an alkyl group, or a halogenated alkyl group. At least one of R11 to R16 is the halogen group or the halogenated alkyl group.)

[Chemical formula 26]

(7)

(R17 to R20 are a hydrogen group, a halogen group, an alkyl group, or a halogenated alkyl group. At least one of R17 to R20 is the halogen group or the halogenated alkyl group.)

The halogen type is not particularly limited, but specially, fluorine, chlorine, or bromine is preferable, and fluorine is more preferable since thereby higher effect is obtained compared to other halogen. The number of halogen is more preferably two than one, and further may be three or more for the following reason. That is, in the case where the electrolyte is used for an electrochemical device such as a secondary battery, at the time of electrode reaction, an ability to form a protective film on the electrode surface is improved, and a more rigid and stable protective film is formed. Accordingly, decomposition reaction of the electrolyte is more inhibited.

Examples of the halogenated chain ester carbonate include fluoromethyl methyl carbonate, bis(fluoromethyl) carbonate, and difluoromethyl methyl carbonate. Examples of the halogenated cyclic ester carbonates include compounds expressed by Formula (7-1) to Formula (7-21). That is, examples thereof include 4-fluoro-1,3-dioxolane-2-one of Formula (7-1), 4-chloro-1,3-dioxolane-2-one of Formula (7-2), 4,5-difluoro-1,3-dioxolane-2-one of Formula (7-3), tetrafluoro-1,3-dioxolane-2-one of Formula (74), 4-chloro-5-fluoro-1,3-dioxolane-2-one of Formula (7-5), 4,5-dichloro-1,3-dioxolane-2-one of Formula (7-6), tetrachloro-1,3-dioxolane 2-one of Formula (7-7), 4,5-bis trifluoro methyl-1,3-dioxolane-2-one of Formula (7-8), 4-trifluoromethyl-1,3-dioxolane-2-one of Formula (7-9), 4,5-difluoro-4,5-dimethyl-1,3-dioxolane-2-one of Formula (7-10), 4,4-difluoro-5-methyl-1,3-dioxolane-2-one of Formula (7-11), 4-ethyl-5,5-difluoro-1,3-dioxolane-2-one of Formula (7-12), 4-fluoro-5-trifluoromethyl-1,3-dioxolane-2-one of Formula (7-13), 4-methyl-5-trifluoro-methyl-1,3-dioxolane-2-one of Formula (7-14), 4-fluoro-4,5-dimethyl-1,3-dioxolane-2-one of Formula (7-15), 5-(1,1-difluoroethyl)-4,4-difluoro 1,3-dioxolane-2-one of Formula (7-16), 4,5-dichloro-4,5-dimethyl-1,3-dioxolane-2-one of Formula (7-17), 4-ethyl-5-fluoro-1,3-dioxolane-2-one of Formula (7-18), 4-ethyl-4,5-difluoro-1,3-dioxolane-2-one of Formula (7-19), 4-ethyl-4,5,5-trifluoro-1,3-dioxolane-2-one of Formula (7-20), and 4-fluoro-4-methyl-1,3-dioxolane-2-one of Formula (7-21). The geometric isomer is included in the halogenated cyclic ester carbonate. Specially, 4-fluoro-1,3-dioxolane-2-one shown in Formula (7-1) or 4,5-difluoro-1,3-dioxolane-2-one shown in Formula (7-3) is preferable, and 4,5-difluoro-1,3-dioxolane-2-one is more preferable. In particular, as 4,5-difluoro-1,3-dioxolane-2-one, a trans isomer is more preferable than a cis isomer, since the trans isomer is easily available and provides high effect.

[Chemical formula 27]

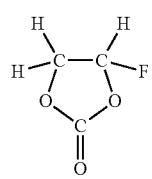

(7-1)

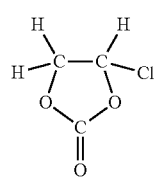

(7-2)

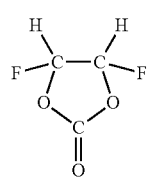

(7-3)

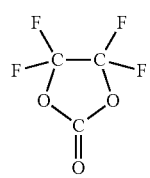

(7-4)

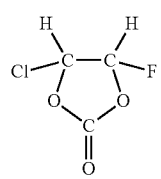

(7-5)

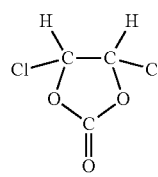

(7-6)

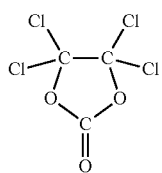 (7-7)

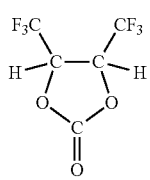 (7-8)

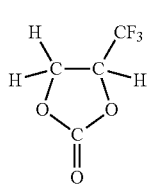 (7-9)

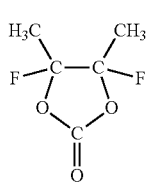 (7-10)

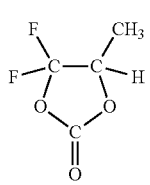 (7-11)

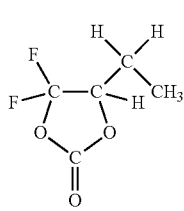 (7-12)

[Chemical formula 28]

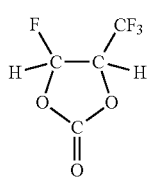 (7-13)

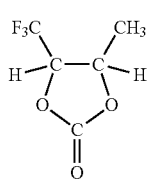 (7-14)

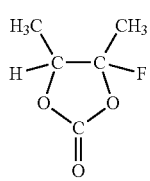 (7-15)

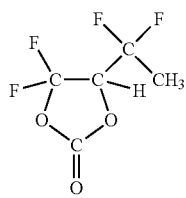 (7-16)

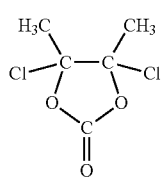 (7-17)

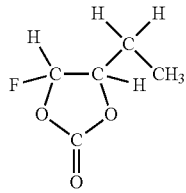 (7-18)

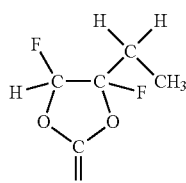 (7-19)

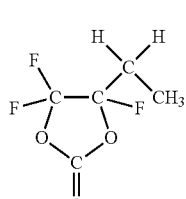 (7-20)

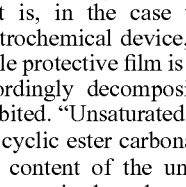 (7-21)

Further, the solvent preferably contains at least one of unsaturated carbon bond cyclic ester carbonates expressed by Formula (8) to Formula (10) for the following reason. That is, in the case where the solvent is used for an electrochemical device, at the time of electrode reaction, a stable protective film is formed on the electrode surface, and accordingly decomposition reaction of the electrolyte is inhibited. "Unsaturated carbon bond cyclic ester carbonate" is a cyclic ester carbonate having unsaturated carbon bond. The content of the unsaturated carbon bond cyclic ester carbonate in the solvent is, for example, from 0.01 wt % to 10 wt % both inclusive. The type of the unsaturated carbon bond cyclic ester carbonate is not limited to types described below, and may be other type.

[Chemical formula 29]

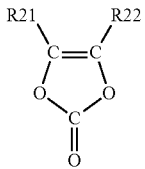

(8)

(R21 and R22 are a hydrogen group or an alkyl group.)

[Chemical formula 30]

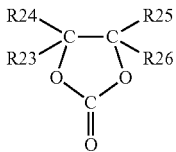

(9)

(R23 to R26 are a hydrogen group, an alkyl group, a vinyl group, or an aryl group. At least one of R23 to R26 is the vinyl group or the aryl group.)

[Chemical formula 31]

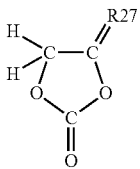

(10)

(R27 is an alkylene group.)

The unsaturated carbon bond cyclic ester carbonate shown in Formula (8) is a vinylene carbonate compound. Examples of the vinylene carbonate compound include the following compounds. That is, vinylene carbonate, methylvinylene carbonate, ethylvinylene carbonate, 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The unsaturated carbon bond cyclic ester carbonate shown in Formula (9) is a vinylethylene carbonate compound. Examples of the vinylethylene carbonate compound include the following compounds. That is, vinylethylene carbonate, 4-methyl-4-vinyl-1,3-dioxolane-2-one, 4-ethyl-4-vinyl-1,3-dioxolane-2-one. 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The unsaturated carbon bond cyclic ester carbonate shown in Formula (10) is a methylene ethylene carbonate compound. Examples of the methylene ethylene carbonate compound include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate compound may have one methylene group (compound shown in Formula (10)), or may have two methylene groups.

In addition, the unsaturated carbon bond cyclic ester carbonate may be catechol carbonate having a benzene ring or the like, in addition to the compounds shown in Formula (8) to Formula (10).

Moreover, the solvent preferably contains sultone (cyclic sulfonic ester), since thereby chemical stability of the electrolyte is more improved. Examples of sultone include propane sultone and propene sultone. The sultone content in the solvent is, for example, from 0.5 wt % to 5 wt % both inclusive. The sultone type is not necessarily limited to the foregoing type, and may be other type.

Further, the solvent preferably contains an acid anhydride, since thereby chemical stability of the electrolyte is more improved. Examples of the acid anhydride include carboxylic anhydride such as succinic anhydride, glutaric anhydride, and maleic anhydride. The content of the acid anhydride in the solvent is, for example, from 0.5 wt % to 5 wt % both inclusive. However, the acid anhydride type is not necessarily limited to the foregoing type, and may be other type.

The inherent viscosity of the solvent is, for example, preferably 10.0 mPa s or less at 25 deg C., since thereby dissociation property of the electrolyte salt and ion mobility are able to be secured. In addition, the inherent viscosity in a state that the electrolyte salt is dissolved in the solvent (that is, inherent viscosity of the electrolytic solution) is also preferably 10.0 mPa·s or less at 25 deg C. for a similar reason.

[Electrolyte Salt]

The electrolyte salt contains, for example, any one or more of light metal salts such as a lithium salt. However, the electrolyte salt may contain, for example, a salt other than a light metal salt.

Examples of lithium salts include the following. That is, examples thereof include lithium hexafluorophosphate, lithium tetrafluoroborate, lithium perchlorate, and lithium hexafluoroarsenate. Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride (LiCl), lithium bromide (LiBr), lithium monofluorophosphate ($LiPFO_3$), and lithium difluorophosphate ($LiPF_2O_2$). Thereby, superior characteristics are obtained in an electrochemical device using the electrolyte. The type of electrolyte salt is not necessarily limited to the foregoing type, but may be other type.

Specially, at least one of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained. In particular, both lithium hexafluorophosphate and lithium tetrafluoroborate are preferably used, since thereby high effect is able to be obtained.

In particular, the electrolyte salt preferably contains at least one kind of the compounds expressed by Formula (11) to Formula (13), since thereby higher effect is able to be obtained. It is to be noted that R33 in Formula (11) may be identical or different. The same is applied to R41 to R43 in Formula (12) and R51 and R52 in Formula (13).

[Chemical formula 32]

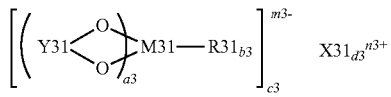

(11)

(X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —OC—R32-CO—, —OC—C(R33)$_2$—, or —OC—CO—. However. R32 is an alkylene group, a halogenated alkylene group, an arylene group, or a halogenated arylene group. R33 is an alkyl group, a halogenated alkyl group, an aryl group, or a halogenated aryl group. In addition, a3 is one of integer numbers 1 to 4, b3 is 0, 2, or 4, c3, d3, m3, and n3 are one of integer numbers 1 to 3.)

[Chemical formula 33]

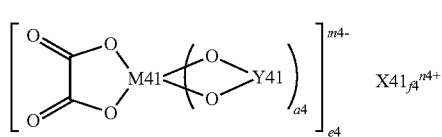

(12)

(X41 is a Group 1 element or a Group 2 element in the long period periodic table. M41 is a transition metal element, a Group 13 element, a Group 14 element, or a Group 15 element in the long period periodic table. Y41 is —OC—(C(R41)$_2$)$_{b4}$—CO—, —(R43)$_2$C—(C(R42)$_2$)$_{c4}$—CO—, —(R43)$_2$C—(C(R42)$_2$)$_{c4}$—C(R43)$_2$—, —(R43)$_2$C—(C(R42)$_2$)$_{c4}$—SO$_2$—, —O$_2$S—(C(R42)$_2$)$_{d4}$—SO$_2$—, or —OC—(C(R42)$_2$)$_{d4}$—SO$_2$—. However, R41 and R43 are a hydrogen group, an alkyl group, a halogen group, or a halogenated alkyl group. At least one of R41/R43 is respectively the halogen group or the halogenated alkyl group. R42 is a hydrogen group, an alkyl group, a halogen group, or a halogenated alkyl group. In addition, a4, e4, and n4 are 1 or 2, b4 and d4 are one of integer numbers 1 to 4, c4 is one of integer numbers 0 to 4, f4 and m4 are one of integer numbers 1 to 3.)

[Chemical formula 34]

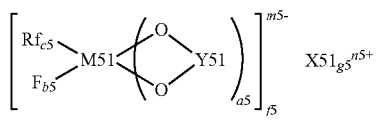

(13)

(X51 is a Group 1 element or a Group 2 element in the long period periodic table. M51 is a transition metal element, a Group 13 element, a Group 14 element, or a Group 15 element in the long period periodic table. Rf is a fluorinated alkyl group with carbon number from 1 to 10 both inclusive or a fluorinated aryl group with carbon number from 1 to 10 both inclusive. Y51 is —OC—(C(R51)$_2$)$_{d5}$—CO—, —(R52)$_2$C—(C(R51)$_2$)$_{d5}$—CO—, —(R52)$_2$C—(C(R51)$_2$)$_{d5}$—C(R52)$_2$—, —(R52)$_2$C—(C(R51)$_2$)$_{d5}$—SO$_2$—, —O$_2$S—(C(R51)$_2$)$_{e5}$—SO$_2$—, or —OC—(C(R51)$_2$)$_{e5}$—SO$_2$—. However, R51 is a hydrogen group, an alkyl group, a halogen group, or a halogenated alkyl group. R52 is a hydrogen group, an alkyl group, a halogen group, or a halogenated alkyl group, and at least one thereof is the halogen group or the halogenated alkyl group. In addition, a5, f5, and n5 are 1 or 2, b5, c5, and e5 are one of integer numbers 1 to 4. d5 is one of integer numbers 0 to 4. g5 and m5 are one of integer numbers 1 to 3.)

It is to be noted that Group 1 element in the long period periodic table represents hydrogen (H), lithium (Li), sodium (Na), potassium (K), rubidium (Rb), cesium (Cs), and francium (Fr). Group 2 element represents beryllium (Be), magnesium (Mg), calcium (Ca), strontium (Sr), barium (Ba), and radium (Ra). Group 13 element represents boron, aluminum (Al), gallium (Ga), indium (In), and thallium (Tl). Group 14 element represents carbon, silicon, germanium (Ge), tin (Sn), and lead (Pb). Group 15 element represents nitrogen, phosphorus, arsenic (As), antimony (Sb), and bismuth (Bi).

Examples of the compound shown in Formula (11) include compounds expressed by Formula (11-1) to Formula (11-6). Examples of the compound shown in Formula (12) include compounds expressed by Formula (12-1) to Formula (12-8). Examples of the compound shown in Formula (13) include a compound expressed by Formula (13-1).

[Chemical formula 35]

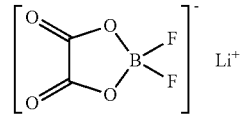

(11-1)

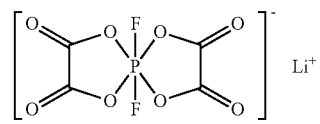

(11-2)

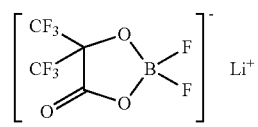

(11-3)

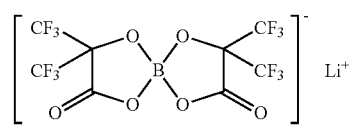

(11-4)

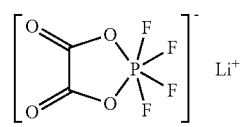

(11-5)

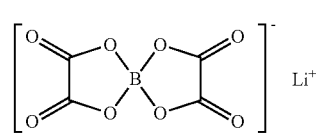

(11-6)

[Chemical formula 36]

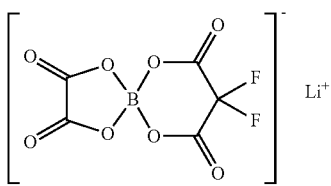 (12-1)

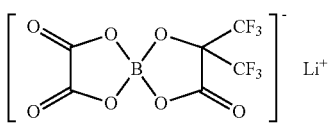 (12-2)

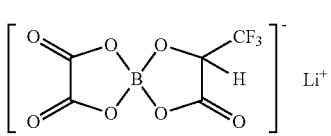 (12-3)

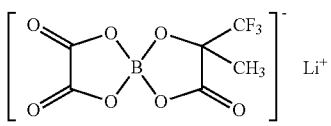 (12-4)

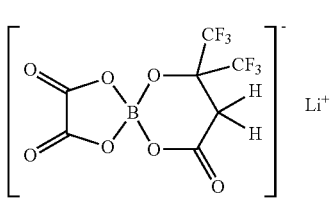 (12-5)

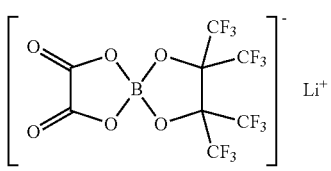 (12-6)

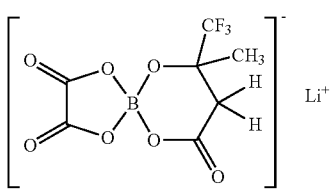 (12-7)

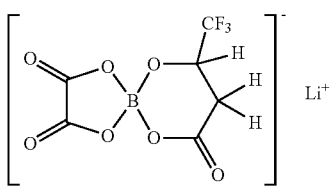 (12-8)

[Chemical formula 37]

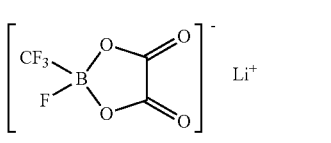 (13-1)

Further, the electrolyte salt preferably contains at least one of compounds expressed by Formula (14) to Formula (16), since thereby higher effect is able to be obtained, m and n in Formula (14) may be the same value or a value different from each other. The same is applied to p, q, and r in Formula (16). However, the type of the electrolyte salt is not necessarily limited to the type described below, and may be other type.

$$LiN(C_mF_{2m+1}SO_2)(C_nF_{2n+1}SO_2) \quad (14)$$

(m and n are an integer number equal to or greater than 1.)

[Chemical formula 38]

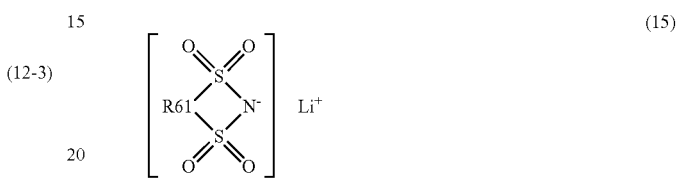 (15)

(R61 is a straight chain or branched perfluoro alkylene group with carbon number from 2 to 4 both inclusive.)

$$LiC(C_pF_{2p+1}SO_2)(C_qF_{2q+1}SO_2)(C_rF_{2r+1}SO_2) \quad (16)$$

(p, q, and r are an integer number of 1 or more.)

The compound shown in Formula (14) is a chain imide compound. Examples of the compound include the following compounds. That is, examples thereof include lithium bis(trifluoromethanesulfonyl)imide ($LiN(CF_3SO_2)_2$) and lithium bis(pentafluoroethanesulfonyl)imide ($LiN(C_2F_5SO_2)_2$). Further examples thereof include lithium (trifluoromethanesulfonyl)(pentafluoroethanesulfonyl)imide ($LiN(CF_3SO_2)(C_2F_5SO_2)$). Further examples thereof include lithium (trifluoromethanesulfonyl)(heptafluoropropanesulfonyl)imide ($LiN(CF_3SO_2)(C_3F_7SO_2)$). Further examples thereof include lithium (trifluoromethanesulfonyl)(nonafluorobutanesulfonyl)imide ($LiN(CF_3SO_2)(C_4F_9SO_2)$).

The compound shown in Formula (15) is a cyclic imide compound. Examples of the compound include compounds expressed by Formula (15-1) to Formula (15-4). That is, examples thereof include lithium 1,2-perfluoroethanedisulfonyl imide of Formula (15-1) or lithium 1,3-perfluoropropanedisulfonyl imide of Formula (15-2), lithium 1,3-perfluorobutanedisulfonyl imide of Formula (15-3), and lithium 1,4-perfluorobutanedisulfonyl imide of Formula (15-4).

[Chemical formula 39]

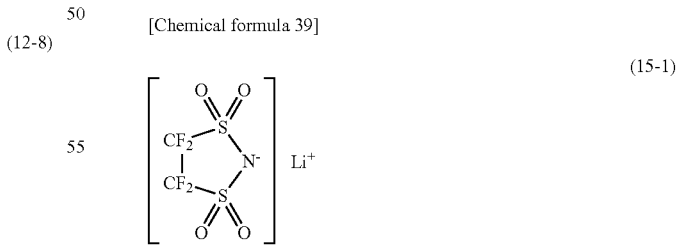 (15-1)

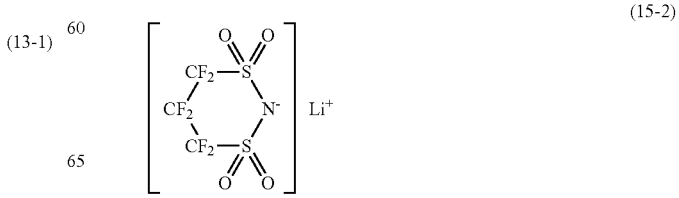 (15-2)

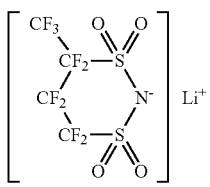

(15-3)

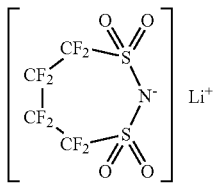

(15-4)

The compound shown in Formula (16) is a chain methyde compound. Examples of the compound include lithium tris(trifluoromethanesulfonyl)methyde (LiC(CF$_3$SO$_2$)$_3$).

The content of the electrolyte salt to the solvent is preferably from 0.3 mol/kg to 3.0 mol/kg both inclusive, since thereby high ion conductivity is obtained.

In the electrolyte, the solvent contains at least one kind of the sulfone compounds and at least one of the nitrile compound, the isocyanate compound, the pyrrolidone compound, and the ether compound.

A description will be given of a case that an electrolyte containing either the sulfone compound or the nitrile compound or the like is used as a solvent for an electrochemical device. If only the sulfone compound is used out of the sulfone compound and the nitrile compound or the like, decomposition reaction of the electrolyte at the time of electrode reaction is slightly inhibited, but is not sufficiently inhibited. Meanwhile, if only the nitrile compound or the like is used, decomposition reaction of the electrolyte at the time of electrode reaction, in particular, at the time of repeated electrode reaction is improved. That is, in the case where only the sulfone compound is added to the electrolyte, sufficient chemical stability is not able to be obtained. Meanwhile, in the case where only the succinonitrile or the like is added to the electrolyte, chemical stability is significantly lowered.

However, in using combination of the sulfone compound and the nitrile compound or the like that are not able to provide sufficient chemical stability if being used singly, due to synergetic effect thereof, electrolyte decomposition inhibition effect at the time of electrode reaction is significantly demonstrated. That is, according to the electrolyte in this embodiment, since combination of the sulfone compound and the nitrile compound or the like is used, chemical stability of the electrolyte is more improved than in a case that both thereof are not contained or a case that only one thereof is contained. Thereby, the electrolyte according to this embodiment is able to contribute to improve performance of an electrochemical device using the electrolyte containing the sulfone compound and the nitrile compound or the like.

In particular, in the case where the solvent contains at least one kind of the halogenated chain ester carbonate, the halogenated cyclic ester carbonate, the unsaturated carbon bond cyclic ester carbonate, sultone, and the acid anhydride, higher effect is able to be obtained. Further, in the case where the electrolyte salt contains at least one kind of lithium hexafluorophosphate, lithium tetrafluoroborate, lithium perchlorate, lithium hexafluoroarsenate, and the compounds shown in Formula (11) to Formula (16), higher effect is able to be obtained.

<2. Electrochemical Device (Secondary Battery) Using Electrolyte>

Next, a description will be given of usage examples of the foregoing electrolyte. In the description, a secondary battery will be taken as an example of electrochemical devices. The foregoing electrolyte is used as follows.

<2-1. First Secondary Battery>

Figure 2:
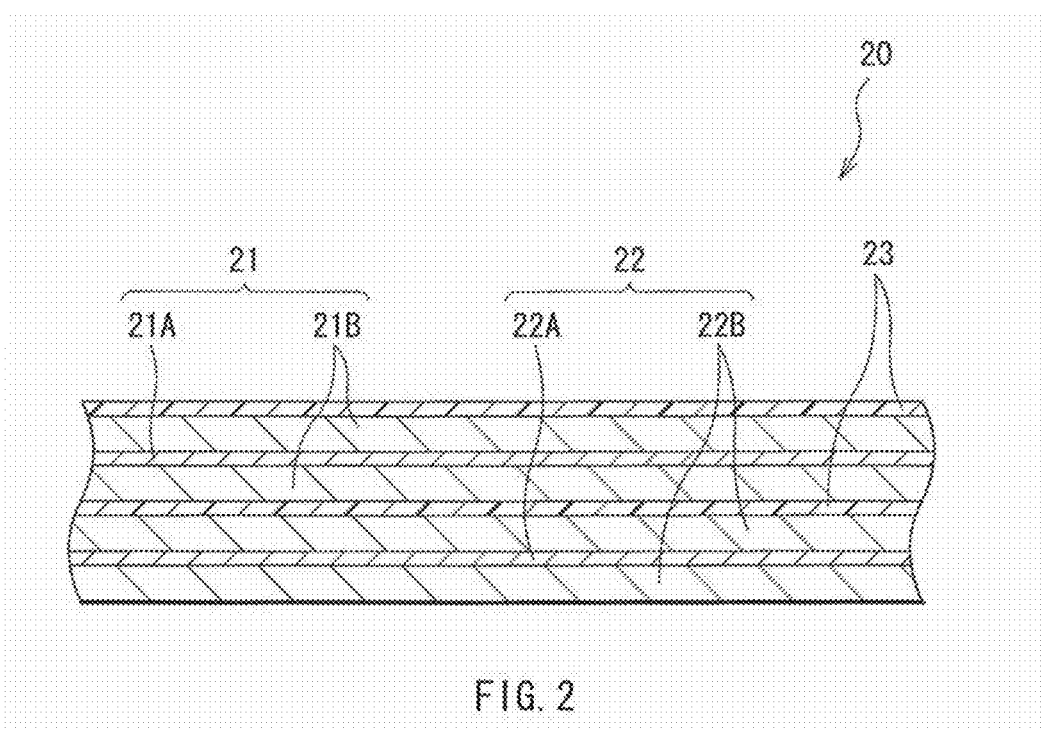
FIG. 2 is a cross sectional view illustrating an enlarged part of a spirally wound electrode body illustrated in FIG. 1.

FIG. 1 and FIG. 2 illustrate a cross sectional structure of a first secondary battery. FIG. 2 illustrates an enlarged part of a spirally wound electrode body 20 illustrated in FIG. 1. The secondary battery herein described is, for example, a lithium ion secondary battery in which the anode capacity is expressed by insertion and extraction of lithium ion as an electrode reactant.

[Whole Structure of Secondary Battery]

The secondary battery mainly contains the spirally wound electrode body 20 and a pair of insulating plates 12 and 13 inside a battery can 11 in the shape of an approximately hollow cylinder. The battery structure using such a battery can 11 is called cylindrical type.

The battery can 11 has a hollow structure in which one end of the battery can 11 is closed and the other end of the battery can 11 is opened. The battery can 11 is made of iron (Fe), aluminum (Al), an alloy thereof or the like. In addition, in the case where the battery can 11 is made of iron, for example, plating of nickel (Ni) or the like may be provided on the surface of the battery can 11. The pair of insulating plates 12 and 13 is arranged to sandwich the spirally wound electrode body 20 in between from the upper and the lower sides, and to extend perpendicularly to the spirally wound periphery face.

At the open end of the battery can 11, a battery cover 14, a safety valve mechanism 15, and a PTC (Positive Temperature Coefficient) device 16 are attached by being caulked with a gasket 17. Inside of the battery can 11 is hermetically sealed. The battery cover 14 is made of, for example, a material similar to that of the battery can 11. The safety valve mechanism 15 and the PTC device 16 are provided inside of the battery cover 14. The safety valve mechanism 15 is electrically connected to the battery cover 14 through the PTC device 16. In the safety valve mechanism 15, in the case where the internal pressure becomes a certain level or more by internal short circuit, external heating or the like, a disk plate 15A flips to cut the electric connection between the battery cover 14 and the spirally wound electrode body 20. As temperature rises, the PTC device 16 increases the resistance (limits a current) to prevent abnormal heat generation resulting from a large current. The gasket 17 is made of, for example, an insulating material. The surface of the gasket 17 is coated with, for example, asphalt.

In the spirally wound electrode body 20, a cathode 21 and an anode 22 are layered with a separator 23 in between and spirally wound. A center pin 24 may be inserted in the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is electrically connected to the battery cover 14 by, for example, being welded to the safety valve mechanism 15. The anode lead 26 is, for example, welded and thereby electrically connected to the battery can 11.

[Cathode]

In the cathode 21, for example, a cathode active material layer 21B is provided on both faces of a cathode current collector 21A. However, the cathode active material layer 21B may be provided only on a single face of the cathode current collector 21A.

The cathode current collector 21A is made of, for example, aluminum, nickel, stainless (SUS) or the like.

The cathode active material layer 21B contains, as a cathode active material, one or more kinds of cathode materials capable of inserting and extracting lithium ions. According to needs, the cathode active material layer 21B may contain other material such as a cathode binder and a cathode electrical conductor.

As the cathode material, a lithium-containing compound is preferable, since thereby a high energy density is able to be obtained. Examples of the lithium-containing compound include a composite oxide containing lithium and a transition metal element as a constituent element and a phosphate compound containing lithium and a transition metal element as a constituent element. Specially, a compound containing at least one of cobalt (Co), nickel, manganese (Mn), and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more kinds of transition metal elements. In addition, values of x and y vary according to the charge and discharge state, and are generally in the range of $0.05::x::1.10$ and $0.05::y::1.10$.

Examples of the composite oxide containing lithium and a transition metal element include a lithium-cobalt composite oxide ($Li_xCoO_2$), a lithium-nickel composite oxide ($Li_xNiO_2$), and a lithium-nickel-based composite oxide expressed by Formula (17). Further, examples of the phosphate compound containing lithium and a transition metal element include lithium-iron phosphate compound ($LiFePO_4$) and a lithium-iron-manganese phosphate compound ($LiFe_{1-u}Mn_uPO_4$ (u<1)), since thereby a high battery capacity is obtained and superior cycle characteristics are obtained.

$$LiNi_{1-x}M_xO_2 \quad (17)$$

(M is at least one kind of cobalt, manganese, iron, aluminum, vanadium (V), tin, magnesium, titanium (Ti), strontium, calcium, zirconium (Zr), molybdenum (Mo), technetium (Tc), ruthenium (Ru), tantalum (Ta), tungsten (W), rhenium (Re), ytterbium (Yb), copper (Cu), zinc (Zn), barium, boron, chromium (Cr), silicon, gallium, phosphorus, antimony, and niobium (Nb), x is in the range of 0.005<x<0.5.)

In addition, examples of cathode material include an oxide, a disulfide, a chalcogenide, and a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

It is needless to say that the cathode material may be a material other than the foregoing compounds. Further, two or more kinds of the foregoing cathode materials may be used by mixture arbitrary.

Examples of cathode binders include a synthetic rubber such as styrene butadiene rubber, fluorinated rubber, and ethylene propylene diene; and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. Such a carbon material may be used singly, or a plurality thereof may be used by mixture. In addition, the cathode electrical conductor may be a metal material, a conductive polymer or the like as long as the material has the electric conductivity.

[Anode]

In the anode 22, for example, an anode active material layer 22B is provided on both faces of an anode current collector 22A. However, the anode active material layer 22B may be provided only on a single face of the anode current collector 22A.

The anode current collector 22A is made of, for example, copper, nickel, stainless or the like. The surface of the anode current collector 22A is preferably roughened. Thereby, due to the so-called anchor effect, the contact characteristics between the anode current collector 22A and the anode active material layer 22B are improved. In this case, it is enough that at least the surface of the anode current collector 22A in the region opposed to the anode active material layer 22B is roughened. Examples of roughening methods include a method of forming fine particles by electrolytic treatment. The electrolytic treatment is a method of providing concavity and convexity by forming fine particles on the surface of the anode current collector 22A by using electrolytic method in an electrolytic bath. A copper foil formed by electrolytic method including the copper foil roughened by the foregoing electrolytic treatment is generally called "electrolytic copper foil."

The anode active material layer 22B contains one or more kinds of anode materials capable of inserting and extracting lithium ions as an anode active material, and may also contain other material such as an anode binder and an anode electrical conductor according to needs. It is to be noted that details of the anode binder and the anode electrical conductor are, for example, respectively similar to those of the cathode binder and the cathode electrical conductor. In the anode active material layer 22B, the chargeable capacity of the anode material is preferably larger than the discharge capacity of the cathode 21 in order to prevent unintentional precipitation of lithium metal at the time of charge and discharge, for example.

Examples of anode materials include a carbon material. In the carbon material, crystal structure change associated with insertion and extraction of lithium ions is extremely small. Thus, the carbon material provides a high energy density and superior cycle characteristics, and functions as an anode electrical conductor as well. Examples of carbon materials include graphitizable carbon, non-graphitizable carbon in which the spacing of (002) plane is 0.37 nm or more, and graphite in which the spacing of (002) plane is 0.34 nm or less. More specifically, examples of carbon materials include pyrolytic carbon, coke, glassy carbon fiber, an organic polymer compound fired body, activated carbon, and carbon black. Of the foregoing, the coke includes pitch coke, needle coke, and petroleum coke. The organic polymer compound fired body is obtained by firing and carbonizing a phenol resin, a furan resin or the like at appropriate temperature. In addition, the shape of the carbon material may be any of a fibrous shape, a spherical shape, a granular shape, and a scale-like shape.

Moreover, examples of anode materials include a material (metal material) containing at least one kind of metal elements and metalloid elements as a constituent element. By using such an anode material, a high energy density is able to be obtained. Such a material may be a simple substance, an alloy, or a compound of a metal element or a metalloid element, may be two or more kinds thereof, or may have one or more kinds of phases thereof at least in part. It is to be noted that in the present invention, "alloy" includes an alloy containing one or more kinds of metal elements and one or more kinds of metalloid elements, in addition to an alloy composed of two or more kinds of metal elements. Further, "alloy" may contain a nonmetallic element. The texture thereof includes a solid solution, a eutectic crystal (eutectic mixture), an intermetallic compound, and a texture in which two or more thereof coexist.

The foregoing metal element or the foregoing metalloid element is a metal element or a metalloid element capable of forming an alloy with lithium. Specifically, the foregoing metal element or the foregoing metalloid element is at least one kind of the following elements. That is, the foregoing metal element or the foregoing metalloid element is magnesium, boron, aluminum, gallium, indium, silicon, germanium, tin, lead, bismuth, cadmium (Cd), silver (Ag), zinc, hafnium (Hf), zirconium, yttrium, palladium (Pd), and platinum (Pt). Specially, at least one of silicon and tin is preferable. Silicon and tin have superior ability to insert and extract lithium ion, and thus are able to provide a high energy density.

A material containing at least one of silicon and tin may be, for example, a simple substance, an alloy, or a compound of silicon or tin; two or more kinds thereof; or a material having one or more kinds of phases thereof at least in part.

Examples of alloys of silicon include an alloy containing at least one of the following elements as a constituent element other than silicon. Such an element other than silicon is tin, nickel, copper, iron, cobalt, manganese, zinc, indium, silver, titanium, germanium, bismuth, antimony, and chromium. Examples of compounds of silicon include a compound containing oxygen or carbon as a constituent element other than silicon. In addition, the compounds of silicon may contain, for example, one or more kinds of the elements described for the alloys of silicon as an element other than silicon.

Examples of an alloy or a compound of silicon include the followings. That is, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$.

Examples of alloys of tin include an alloy containing at least one kind of the following elements as an element other than tin. Such an element is silicon, nickel, copper, iron, cobalt, manganese, zinc, indium, silver, titanium, germanium, bismuth, antimony, or chromium. Examples of compounds of tin include a compound containing oxygen or carbon. In addition, the compounds of tin may contain one or more kinds of elements described for the alloys of tin as a constituent element other than tin. Examples of alloys or compounds of tin include $SnO_w$ ($0<w\leq2$), $SnSiO_3$, $LiSnO$, and $Mg_2Sn$.

In particular, as a material containing silicon, for example, the simple substance of silicon is preferable, since a high battery capacity, superior cycle characteristics and the like are thereby obtained. It is to be noted that "simple substance" only means a general simple substance (may contain a slight amount of impurity), but does not necessarily mean a substance with purity of 100%.

Further, as a material containing tin, for example, a material containing a second constituent element and a third constituent element in addition to tin as a first constituent element is preferable. The second constituent element is, for example, at least one of the following elements. That is, cobalt, iron, magnesium, titanium, vanadium, chromium, manganese, nickel, copper, zinc, gallium, zirconium, niobium, molybdenum, silver, indium, cerium (Ce), hafnium, tantalum, tungsten, bismuth, and silicon. The third constituent element is, for example, at least one kind of boron, carbon, aluminum, and phosphorus. In the case where the second constituent element and the third constituent element are contained, a high battery capacity, superior cycle characteristics and the like are able to be obtained.

Specially, a material containing tin, cobalt, and carbon (SnCoC-containing material) is preferable. As the composition of the SnCoC-containing material, for example, the carbon content is from 9.9 mass % to 29.7 mass t % both inclusive, and the ratio of tin and cobalt contents (Co/(Sn+Co)) is from 20 mass % to 70 mass % both inclusive, since a high energy density is obtained in such a composition range.

The SnCoC-containing material preferably has a phase containing tin, cobalt, and carbon. Such a phase preferably has a low crystalline structure or an amorphous structure. The phase is a reaction phase capable of being reacted with lithium. Due to existence of the reaction phase, superior characteristics are able to be obtained. The half-width of the diffraction peak obtained by X-ray diffraction of the phase is preferably 1.0 deg or more based on diffraction angle of 28 in the case where CuKa ray is used as a specific X ray, and the insertion rate is 1 deg/min. Thereby, lithium ions are more smoothly inserted and extracted, and reactivity with the electrolyte is decreased. In addition, the SnCoC-containing material has a phase containing a simple substance or part of the respective elements in addition to the low crystalline or amorphous phase in some cases.

Whether or not the diffraction peak obtained by X-ray diffraction corresponds to the reaction phase capable of being reacted with lithium is able to be easily determined by comparison between X-ray diffraction charts before and after electrochemical reaction with lithium. For example, in the case where the position of the diffraction peak after electrochemical reaction with lithium is changed from the position of the diffraction peak before electrochemical reaction with lithium, the obtained diffraction peak corresponds to the reaction phase capable of being reacted with lithium. In this case, for example, the diffraction peak of the low crystalline or amorphous reaction phase is shown in the range of 28=from 20 to 50 deg both inclusive. Such a reaction phase contains, for example, the foregoing respective constituent elements, and the low crystalline or amorphous structure may result from existence of carbon.

In the SnCoC-containing material, at least part of carbon as a constituent element is preferably bonded to a metal element or a metalloid element as other constituent element, since thereby aggregation or crystallization of tin or the like is inhibited. The bonding state of elements is able to be checked by, for example, X-ray Photoelectron Spectroscopy (XPS). In a commercially available apparatus, for example, as a soft X ray, Al-Ka ray, Mg-Ka ray or the like is used. In the case where at least part of carbon is bonded to a metal element, a metalloid element or the like, the peak of a synthetic wave of 1s orbit of carbon (C1s) is shown in a region lower than 284.5 eV. In addition, in the apparatus, energy calibration is made so that the peak of 4f orbit of gold atom (Au4f) is obtained at 84.0 eV. At this time, in general, since surface contamination carbon exists on the material surface, the peak of C1s of the surface contamination carbon is regarded as 284.8 eV, which is used as the energy reference. In XPS measurement, the waveform of the peak of C1s is obtained as a form including the peak of the surface contamination carbon and the peak of carbon in the SnCoC-containing material. Thus, for example, analysis is made by using commercially available software to isolate both peaks from each other. In the waveform analysis, the position of a main peak existing on the lowest bound energy side is the energy reference (284.8 eV).

In addition, the SnCoC-containing material may further contain other element according to needs. Examples of other elements include at least one kind of silicon, iron, nickel, chromium, indium, niobium, germanium, titanium, molybdenum, aluminum, phosphorus, gallium, and bismuth.

In addition to the SnCoC-containing material, a material containing tin, cobalt, iron, and carbon (SnCoFeC-containing material) is also preferable. The composition of the SnCoFeC-containing material is able to be arbitrary set. For example, a composition in which the iron content is set small is as follows. That is, the carbon content is from 9.9 mass % to 29.7 mass % both inclusive, the iron content is from 0.3 mass % to 5.9 mass % both inclusive, and the ratio of contents of tin and cobalt (Co/(Sn+Co)) is from 30 mass % to 70 mass % both inclusive. Further, for example, a composition in which the iron content is set large is as follows. That is, the carbon content is from 11.9 mass % to 29.7 mass % both inclusive, the ratio of contents of tin, cobalt, and iron ((Co+Fe)/(Sn+Co+Fe)) is from 26.4 mass % to 48.5 mass % both inclusive, and the ratio of contents of cobalt and iron (Co/(Co+Fe)) is from 9.9 mass % to 79.5 mass % both inclusive. In such a composition range, a high energy density is able to be obtained. The physical property (half-width or the like) of the SnCoFeC-containing material is similar to that of the foregoing SnCoC-containing material.

Further, examples of other anode materials include a metal oxide and a polymer compound. The metal oxide is, for example, iron oxide, ruthenium oxide, molybdenum oxide or the like. The polymer compound is, for example, polyacetylene, polyaniline, polypyrrole or the like.

It is needless to say that the anode material may be a material other than the foregoing materials. Further, two or more of the foregoing anode active materials may be used by mixture arbitrary.

The anode active material layer 22B is formed by, for example, coating method, vapor-phase deposition method, liquid-phase deposition method, spraying method, firing method (sintering method), or a combination of two or more kinds of these methods. Coating method is a method in which, for example, after a particulate anode active material is mixed with an anode binder or the like, the mixture is dispersed in a solvent, and the anode current collector is coated with the resultant. Examples of vapor-phase deposition methods include physical deposition method and chemical deposition method. Specifically, examples thereof include vacuum evaporation method, sputtering method, ion plating method, laser ablation method, thermal CVD (Chemical Vapor Deposition) method, and plasma CVD method.

Examples of liquid-phase deposition methods include electrolytic plating method and electroless plating method. Spraying method is a method in which the anode active material is sprayed in a fused state or a semi-fused state. Firing method is, for example, a method in which after the anode current collector is coated by a procedure similar to that of coating method, heat treatment is provided at temperature higher than the melting point of the anode binder or the like. Examples of firing methods include a known technique such as atmosphere firing method, reactive firing method, and hot press firing method.

The anode active material is composed of, for example, a plurality of particles. In this case, the anode active materiel layer 22B contains a plurality of particulate anode active materials (hereinafter referred to as "anode active material particles"). The anode active material particles in the case where coating method or the like is used as a method of forming the anode active materiel layer 22B is particulate anode active material itself used for preparing coating-use slurry. Meanwhile, the anode active material particles in the case where vapor-phase deposition method, spraying method or the like is used as a method of forming the anode active materiel layer 22B is an anode active material that becomes in a state of particles as a result of being deposited on the anode current collector 22A due to evaporation, melting or the like.

In the case where the anode active material particles are formed by using a deposition method such as vapor-phase deposition method, the anode active material particles may have a single layer structure formed by a single deposition step or may have a multilayer structure formed by a plurality of deposition steps. However, in the case where evaporation method or the like associated with high heat is used at the time of deposition, the anode active material particles preferably have a multilayer structure. In this case, the deposition step of the anode material is divided into several steps (a plurality of thin layers of the anode material are sequentially formed and deposited). Thus, time that the anode current collector 22A is exposed at high heat is shortened compared to a case that the deposition is performed in a single deposition step. Thereby, the anode current collector 22A is less likely to be subject to thermal damage.

The anode active material particles are preferably grown, for example, in the thickness direction of the anode active material layer 22B from the surface of the anode current collector 22A, and the anode active material particles are preferably linked to the anode current collector 22A at the root thereof. Thereby, expansion and shrinkage of the anode active material layer 22B are inhibited at the time of charge and discharge. Further, the anode active material particles are preferably formed by vapor-phase deposition method, liquid-phase deposition method, firing method or the like, and at least part of the interface with the anode current collector 22A is preferably alloyed. In this case, at the interface therebetween, the constituent element of the anode current collector 22A may be diffused in the anode active material particles; or the constituent element of the anode active material particles may be diffused in the anode current collector 22A; or the respective constituent elements may be diffused in each other.

In particular, the anode active material layer 22B preferably contains an oxide-containing film to cover the surface of the anode active material particles (region to be contacted with the electrolyte if the oxide-containing film is not provided) according to needs. In this case, the oxide-containing film functions as a protective film for the electrolyte, and accordingly decomposition reaction of the electrolyte is inhibited at the time of charge and discharge. Thereby, cycle characteristics, storage characteristics and the like are improved. In addition, the oxide-containing film may cover the entire surface of the anode active material particles, or may cover only part thereof. Specially, the oxide-containing film preferably covers the entire surface of the anode active material particles, since thereby decomposition reaction of the electrolyte is more inhibited.

The oxide-containing film contains, for example, at least one kind of a silicon oxide, a germanium oxide, and a tin oxide. Specially, the oxide-containing film preferably contains the silicon oxide, since thereby the oxide-containing film easily covers the entire surface of the anode active material particles, and superior protective action is able to be thereby obtained. It is needless to say that the oxide-containing film may contain an oxide other than the foregoing oxides.

The oxide-containing film is formed by, for example, vapor-phase deposition method, liquid-phase deposition method or the like. Specially, the oxide-containing film is preferably formed by liquid-phase deposition method, since thereby the oxide-containing film easily covers a wide range of the surface of the anode active material particles. Examples of liquid-phase deposition methods include liquid-phase precipitation method, sol gel method, coating method, and dip coating method. Specially, liquid-phase precipitation method, sol gel method, or dip coating method is preferable, and liquid-phase precipitation method is more preferable, since thereby higher effect is obtained. It is to be noted that the oxide-containing film may be formed by a single formation method of the foregoing formation methods, or may be formed by two or more formation methods thereof.

Further, the anode active material layer 22B preferably contains a metal material containing a metal element not being alloyed with lithium as a constituent element (hereinafter simply referred to as "metal material") in a gap inside the anode active material layer 22B according to needs. Thereby, the plurality of anode active materials are bound to each other with the metal material in between. In addition, since the void ratio in the anode active material layer 22B is decreased, expansion and shrinkage of the anode active material layer 22B are inhibited. Thereby, cycle characteristics, storage characteristics and the like are improved. For the details of "gap inside the anode active material layer 22B," a description will be given later (refer to FIGS. 5A, 5B and 6A, 6B).

Examples of the foregoing metal elements include at least one kind selected from the group consisting of iron, cobalt, nickel, zinc, and copper. Specially, cobalt is preferable, since thereby the metal material easily intrudes into the gap inside the anode active material layer 22B, and superior binding characteristics are obtained. It is needless to say that the metal element may be a metal element other than the foregoing metal elements. However, "metal material" herein is a comprehensive term, including not only a simple substance but also an alloy and a metal compound.

The metal material is formed by, for example, vapor-phase deposition method, liquid-phase deposition method or the like. Specially, the metal material is preferably formed by liquid-phase deposition method, since thereby the metal material easily intrudes into the gap inside the anode active material layer 22B. Examples of liquid-phase deposition methods include electrolytic plating method and electroless plating method. Specially, electrolytic plating method is preferable, since thereby the metal material more easily intrudes into the foregoing gap, and the formation time thereof is shortened. In addition, the metal material may be formed by a single formation method out of the foregoing formation methods, or may be formed by two or more formation methods thereof.

In addition, the anode active material layer 22B may contain only one of the oxide-containing film and the metal material, or may contain both thereof. However, in order to further improve cycle characteristics and the like, the anode active material layer 22B preferably contains both thereof. In the case where the anode active material layer 22B contains only one thereof, in order to further improve cycle characteristics and the like, the anode active material layer 22B preferably contains the oxide-containing film. In addition, in the case where the anode active material layer 22B contains both the oxide-containing film and the metal material, any thereof may be formed firstly. However, in order to further improve cycle characteristics and the like, the oxide-containing film is preferably formed first.

A description will be given of a detailed structure of the anode 22 with reference to FIG. 3 to FIG. 6B.

Figure 3:
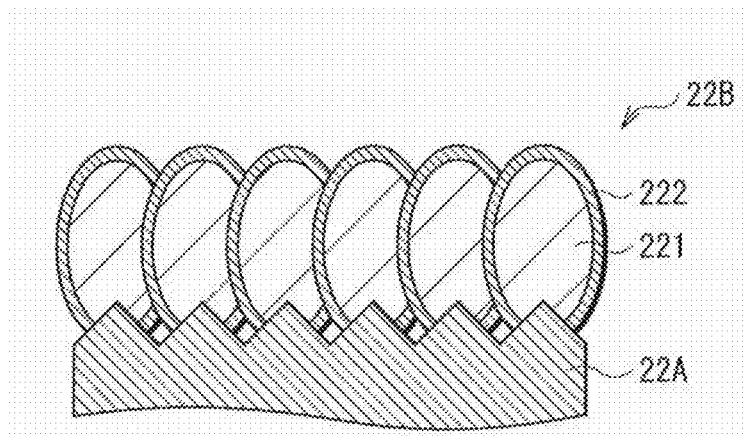
FIG. 3 is a cross sectional view schematically illustrating a structure of the anode illustrated in FIG. 2.
Figure 4:
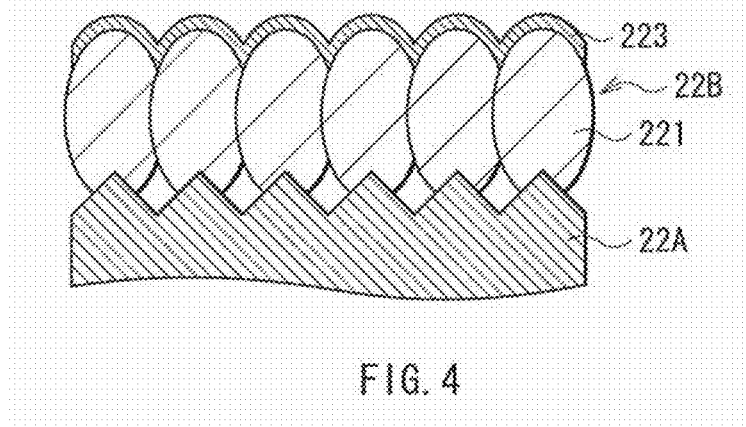
FIG. 4 is a cross sectional view schematically illustrating another structure of the anode illustrated in FIG. 2.

First, a description will be given of a case that the anode active material layer 22B contains the plurality of anode active material particles and the oxide-containing film. FIG. 3 and FIG. 4 schematically illustrate a cross sectional structure of the anode 22. In this case, a case that the anode active material particles have a single layer structure is illustrated.

In the case illustrated in FIG. 3, for example, if the anode material is deposited on the anode current collector 22A by vapor-phase deposition method such as evaporation method, a plurality of anode active material particles 221 are formed on the anode current collector 22A. In this case, if the surface of the anode current collector 22A is roughened and a plurality of projection sections (for example, fine particles formed by electrolytic treatment) exist on the surface, the anode active material particles 221 are grown for every projection section in the thickness direction. Thus, the plurality of anode active material particles 221 are arranged on the anode current collector 22A, and are linked to the anode current collector 22A at the root thereof. After that, for example, an oxide-containing film 222 is formed on the surface of the anode active material particles 221 by liquid-phase deposition method such as liquid-phase precipitation method. The oxide-containing film 222 covers almost entire surface of the anode active material particles 221. In this case, a wide range from the top of the anode active material particles 221 to the root thereof is covered. Such a wide range covering state is characteristic obtained in the case where the oxide-containing film 222 is formed by liquid-phase deposition method. That is, in the case where the oxide containing film 222 is formed by liquid-phase deposition method, covering action is applied not only to the top of the anode active material particles 221 but also to the root thereof, and thus the oxide-containing film 222 covers a portion from the top of the anode active material particles 221 to the root thereof.

Meanwhile, in the case illustrated in FIG. 4, for example, after the plurality of anode active material particles 221 are formed by vapor-phase deposition method, an oxide-containing film 223 is formed similarly by vapor-phase deposition method. The oxide-containing film 223 covers only part (the top) of the anode active material particles 221. Such a small range covering state is characteristic obtained in the case where the oxide-containing film 223 is formed by vapor-phase deposition method. That is, in the case where the oxide containing film 223 is formed by using vapor-phase deposition method, covering action is applied to the top of the anode active material particles 221 but not applied to the root thereof, and thus the oxide-containing film 223 does not cover the root thereof.

In addition, FIG. 3 illustrates the case that the anode active material layer 22B is formed by vapor-phase deposition method. However, the same result is also applied if the anode active material layer 22B is formed by other formation method such as coating method and sintering method.

That is, the oxide-containing film 222 is formed to cover almost entire surface of the plurality of anode active material particles.

Figure 5A:
FIG. 5A and FIG. 5B illustrates an SEM photograph illustrating a cross sectional structure of the anode illustrated in FIG. 2 and a schematic view thereof.
Figure 5B:
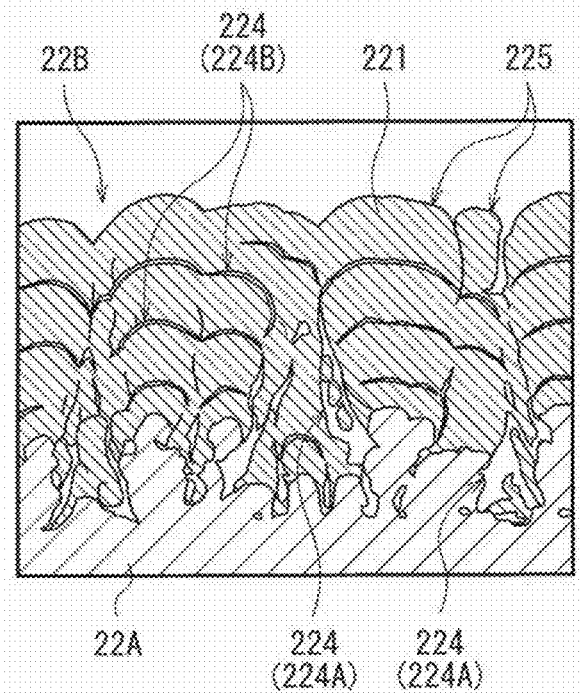
Figure 6A:
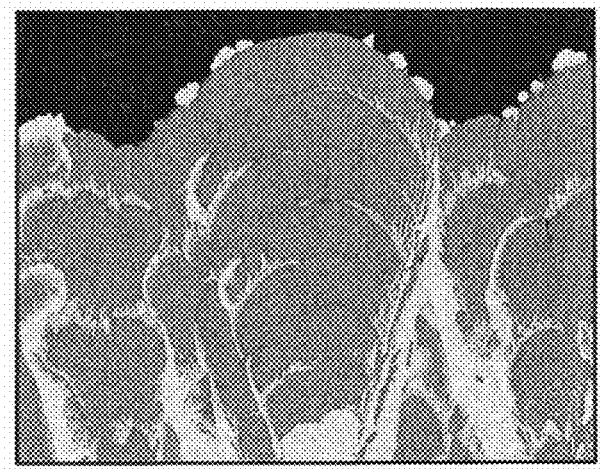
FIG. 6A and FIG. 6B illustrates an SEM photograph illustrating another cross sectional structure of the anode illustrated in FIG. 2 and a schematic view thereof.
Figure 6B:
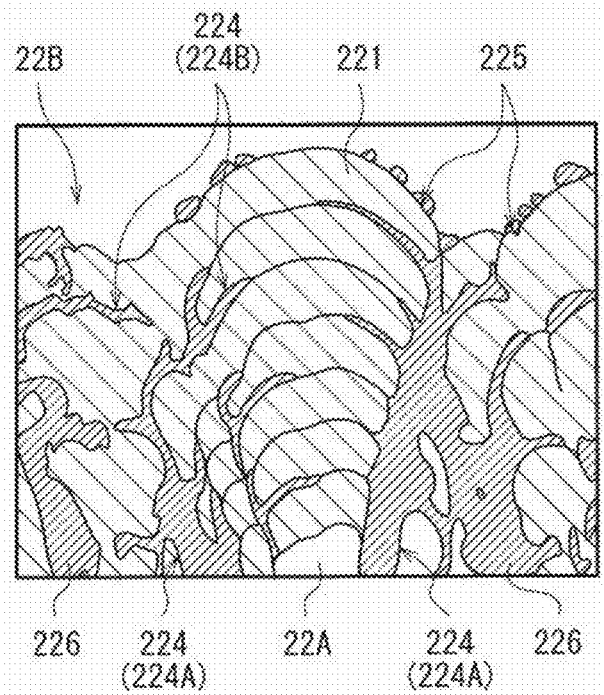

Next, a description will be given of a case that the anode active material layer 22B contains the metal material together with the plurality of anode active material particles. FIGS. 5A, 5B and 6A, 6B illustrate an enlarged cross sectional structure of the anode 22. In FIGS. 5A and 6A illustrates a Scanning Electron Microscope (SEM) photograph (secondary electron image), and FIGS. 5B and 6B illustrates a schematic drawing of the SEM image illustrated in FIGS. 5A and 6A. In this case, FIGS. 5A, 5B and 6A, 6B illustrate a case that the plurality of anode active material particles 221 have a multilayer structure.

As illustrated in FIG. 5B, in the case where the anode active material particles 221 have the multilayer structure, a plurality of gaps 224 are generated in the anode active material layer 22B due to the arrangement structure, the multilayer structure, and the surface structure of the anode active material particles 221. The gap 224 mainly includes two types of gaps 224A and 224B categorized according to the cause of generation. The gap 224A is a gap generated between the anode active material particles 221. Meanwhile, the gap 224B is a gap generated between each layer in the anode active material particles 221. However, the gap 224 generated by other generation cause may exist.

In addition, on the exposed face (outermost surface) of the anode active material particle 221, a void 225 is generated in some cases. As a fibrous minute projection section (not illustrated) is formed on the surface of the anode active material particles 221, the void 225 is generated between the projection sections. The void 225 may be generated entirely over the exposed face of the anode active material particles 221, or may be generated in only part thereof. However, since the fibrous projection section is generated on the surface of the anode active material particles 221 every time the anode active material particle 221 is formed, the void 225 is generated between each layer in addition to on the exposed face of the anode active material particles 221 in some cases.

As illustrated in FIG. 6B, the anode active material layer 22B has a metal material 226 in the gaps 224A and 224B. In this case, though only one of the gaps 224A and 224B may have the metal material 226, both the gaps 224A and 224B preferably have the metal material 226, since thereby higher effect is obtained.

The metal material 226 intrudes into the gap 224A between the anode active material particles 221. More specifically, in the case where the anode active material particles 221 are formed by vapor-phase deposition method or the like, the anode active material particles 221 are grown for every projection section existing on the surface of the anode current collector 22A as described above, and thus the gap 224A is generated between the anode active material particles 221. The gap 224A causes lowering of the binding characteristics of the anode active material layer 22B. Therefore, to improve the binding characteristics, the metal material 226 fills in the gap 224A. In this case, it is enough that part of the gap 224A is filled therewith, but the larger filling amount is preferable, since thereby the binding characteristics of the anode active material layer 22B are more improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material layer 22B as the gap 224A does. Therefore, to improve the binding characteristics, the metal material 226 fills in the gap 224B. In this case, it is enough that part of the gap 224B is filled therewith, but the larger filling amount is preferable, since thereby the binding characteristics of the anode active material layer 22B are more improved.

In addition, to prevent the fibrous minute projection section (not illustrated) generated on the exposed face of the uppermost layer of the anode active material particles 221 from adversely affecting the performance of the secondary battery, the anode active material layer 22B may have the metal material 226 in the void 225. More specifically, in the case where the anode active material particles 221 are formed by vapor-phase deposition method or the like, the fibrous minute projection sections are generated on the surface thereof, and thus the void 225 is generated between the projection sections. The void 225 causes increase of the surface area of the anode active material particles 221, and accordingly the amount of an irreversible coat formed on the surface is also increased, possibly resulting in lowering of progression of charge and discharge reaction. Therefore, to inhibit the lowering of progression of the charge and discharge reaction, the void 225 is filled with the metal material 226. In this case, it is enough at minimum that part of the void 225 is filled therewith, but the larger filling amount is preferable, since thereby lowering of progression of the charge and discharge reaction is more inhibited. In FIG. 6B, the metal material 226 is scattered about the surface of the uppermost layer of the anode active material particles 221, which means that the foregoing minute projection section exists in the location where the metal material 226 is scattered. It is needless to say that the metal material 226 is not necessarily scattered about the surface of the anode active material particles 221, but may cover the entire surface thereof.

In particular, the metal material 226 that intrudes into the gap 224B has a function to fill in the void 225 in each layer. More specifically, in the case where the anode material is deposited several times, the minute projection section is generated on the surface of the anode active material particles 221 for every deposition. Therefore, the metal material 226 fills in not only the gap 224B in each layer, but also the void 225 in each layer.

It is to be noted that in FIGS. 5A, 5B and 6A, 6B, the description has been given of the case that the anode active material particles 221 have the multilayer structure, and both gaps 224A and 224B exist in the anode active material layer 22B. Thus, the anode active material layer 22B has the metal material 226 in the gaps 224A and 224B. Meanwhile, in the case where the anode active material particles 221 have a single layer structure, and only the gap 224A exists in the anode active material layer 22B, the anode active material layer 22B has the metal material 226 only in the gap 224A. It is needless to say that the void 225 is generated in both cases, and thus in any case, the metal material 226 is included in the void 225.

[Separator]

The separator 23 separates the cathode 21 from the anode 22, and passes lithium ions while preventing current short circuit resulting from contact of both electrodes. The separator 23 is impregnated with the foregoing electrolyte as a liquid electrolyte (electrolytic solution). The separator 23 is made of, for example, a porous film composed of a synthetic resin or ceramics. The separator 23 may be a laminated body composed of two or more kinds of porous films. The synthetic resin is, for example, polytetrafluoroethylene, polypropylene, polyethylene or the like.

[Operation of Secondary Battery]

In the secondary battery, at the time of charge, for example, lithium ions are extracted from the cathode 21, and are inserted in the anode 22 through the electrolytic solution with which the separator 23 is impregnated. Meanwhile, at the time of discharge, for example, lithium ions are extracted from the anode 22, and are inserted in the cathode 21 through the electrolytic solution with which the separator 23 is impregnated.

[Method of Manufacturing Secondary Battery]

The secondary battery is manufactured, for example, by the following procedure.

First, the cathode 21 is formed. First, a cathode active material is mixed with a cathode binder, a cathode electrical conductor or the like according to needs to prepare a cathode mixture, which is subsequently dispersed in an organic solvent to obtain paste cathode mixture slurry. Subsequently, both faces of the cathode current collector 21A are uniformly coated with the cathode mixture slurry, which is dried to form the cathode active material layer 21B. Finally, the cathode active material layer 21B is compression-molded by using a rolling press machine or the like while being heated if necessary. In this case, the resultant may be compression-molded over several times.

Next, the anode 22 is formed by a procedure similar to that of the foregoing cathode 21. In this case, an anode active material is mixed with an anode binder, an anode electrical conductor or the like according to needs to prepare an anode mixture, which is subsequently dispersed in an organic solvent to form paste anode mixture slurry. After that, both faces of the anode current collector 22A are uniformly coated with the anode mixture slurry to form the anode active material layer 22B. After that, the anode active material layer 22B is compression-molded.

In addition, the anode 22 may be formed by a procedure different from that of the cathode 21. In this case, first, the anode material is deposited on both faces of the anode current collector 22A by using vapor-phase deposition method such as evaporation method to form a plurality of anode active material particles. After that, according to needs, an oxide-containing film is formed by using liquid-phase deposition method such as liquid-phase precipitation method, or a metal material is formed by using liquid-phase deposition method such as electrolytic plating method, or both the oxide-containing film and the metal material are formed to form the anode active material layer 22B.

Finally, the secondary battery is assembled by using the cathode 21 and the anode 22. First, the cathode lead 25 is attached to the cathode current collector 21A by welding or the like, and the anode lead 26 is attached to the anode current collector 22A by welding or the like. Subsequently, the cathode 21 and the anode 22 are layered with the separator 23 in between and spirally wound, and thereby the spirally wound electrode body 20 is formed. After that, the center pin 24 is inserted in the center of the spirally wound electrode body 20. Subsequently, the spirally wound electrode body 20 is sandwiched between the pair of insulating plates 12 and 13, and is contained in the battery can 11. In this case, the end of the cathode lead 25 is attached to the safety valve mechanism 15 by welding or the like, and the end of the anode lead 26 is attached to the battery can 11 by welding or the like. Subsequently, the electrolytic solution is injected into the battery can 11 and the separator 23 is impregnated with the electrolytic solution. Finally, at the open end of the battery can 11, the battery cover 14, safety valve mechanism 15, and the PTC device 16 are fixed by being caulked with the gasket 17. The secondary battery illustrated in FIG. 1 to FIG. 6B is thereby completed.

According to the first secondary battery, in the case where the capacity of the anode 22 is expressed by insertion and extraction of lithium ion, the foregoing electrolyte (electrolytic solution) is included. Thus, decomposition reaction of the electrolytic solution at the time of charge and discharge is inhibited, and accordingly cycle characteristics are able to be improved. In addition, even if being exposed under high temperature environment in charged state, the foregoing electrolytic solution is hardly decomposed, and thus gasification of decomposed electrolytic solution is inhibited. Accordingly, operation time of the safety valve due to pressure increase inside the secondary battery under high temperature environment is increased, and accordingly safety is able to be improved.

In particular, in the case where the metal material advantageous to realizing a high capacity as an anode active material of the anode 22 is used, cycle characteristics are improved. Thus, higher effect is able to be obtained than in a case that a carbon material or the like is used.

Other effect for the first secondary battery is similar to that of the foregoing electrolyte.

2-2. Second Secondary Battery>

[Structure of Secondary Battery]

A second secondary battery is a lithium metal secondary battery in which the anode capacity is expressed by precipitation and dissolution of lithium metal. The secondary battery has a structure similar to that of the first secondary battery, except that the anode active material layer 22B is composed of lithium metal, and is manufactured by a procedure similar to that of the first secondary battery.

In the secondary battery, lithium metal is used as an anode active material, and thereby a higher energy density is able to be obtained. It is possible that the anode active material layer 22B already exists at the time of assembling, or the anode active material layer 22B does not exist at the time of assembling and is to be composed of lithium metal to be precipitated at the time of charge. Further, it is possible that the anode active material layer 22B is used as a current collector as well, and the anode current collector 22A is omitted.

[Operation of Secondary Battery]

In the secondary battery, when charged, for example, lithium ions are extracted from the cathode 21, and are precipitated as lithium metal on the surface of the anode current collector 22A through the electrolytic solution with which the separator 23 is impregnated. Meanwhile, when discharged, for example, lithium metal is eluted as lithium ions from the anode active material layer 22B, and is inserted in the cathode 21 through the electrolytic solution with which the separator 23 is impregnated.

According to the second secondary battery, in the case where the capacity of the anode 22 is expressed by precipitation and dissolution of lithium metal, the foregoing electrolyte (electrolytic solution) is included. Thus, cycle characteristics are able to be improved by an action similar to that of the first secondary battery. Other effect of the secondary battery is similar to that of the first secondary battery.

<2-3. Third Secondary Battery>

Figure 7:
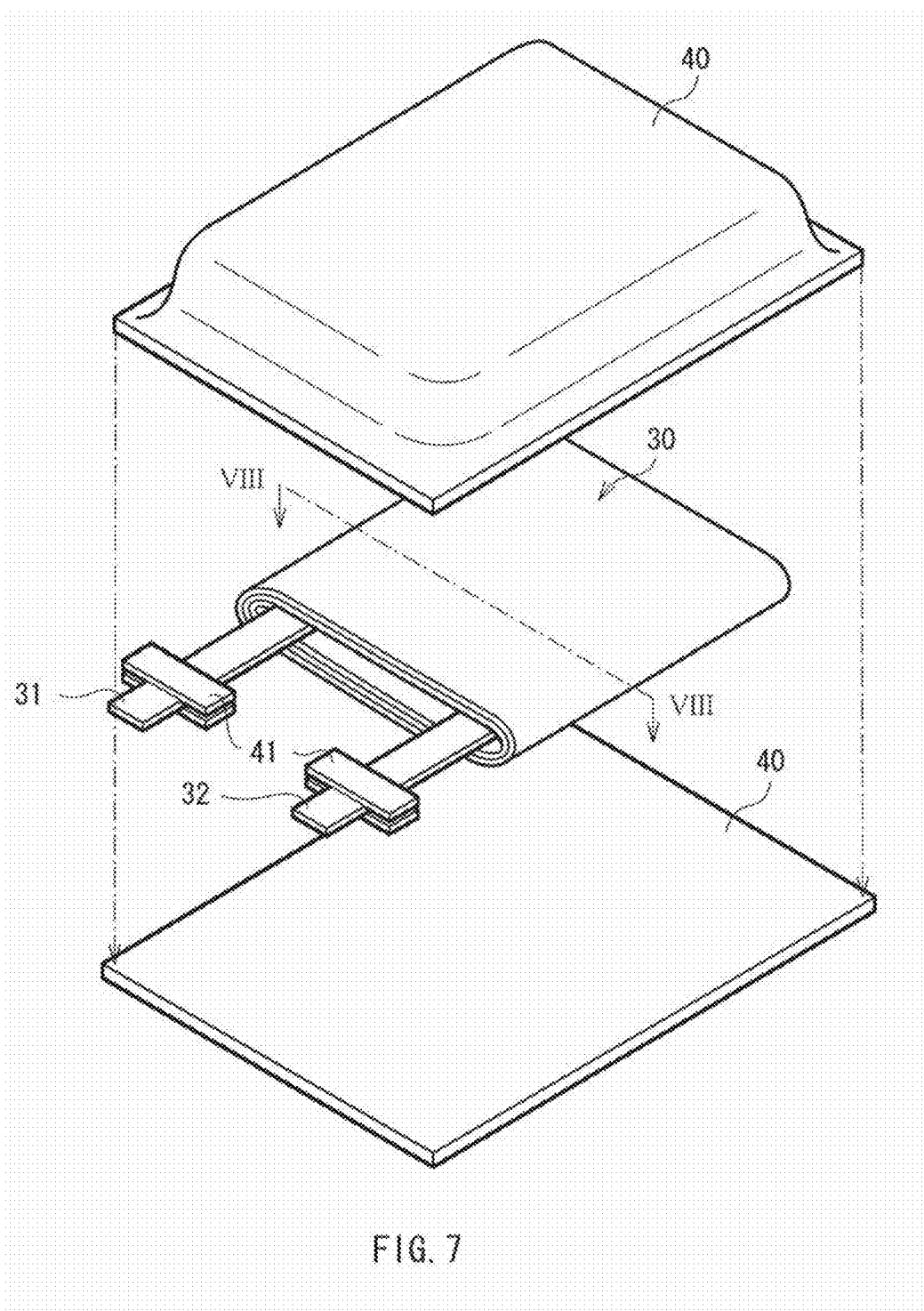
FIG. 7 is a perspective view illustrating a structure of a third secondary battery including the electrolyte according to the embodiment of the present invention.
Figure 8:
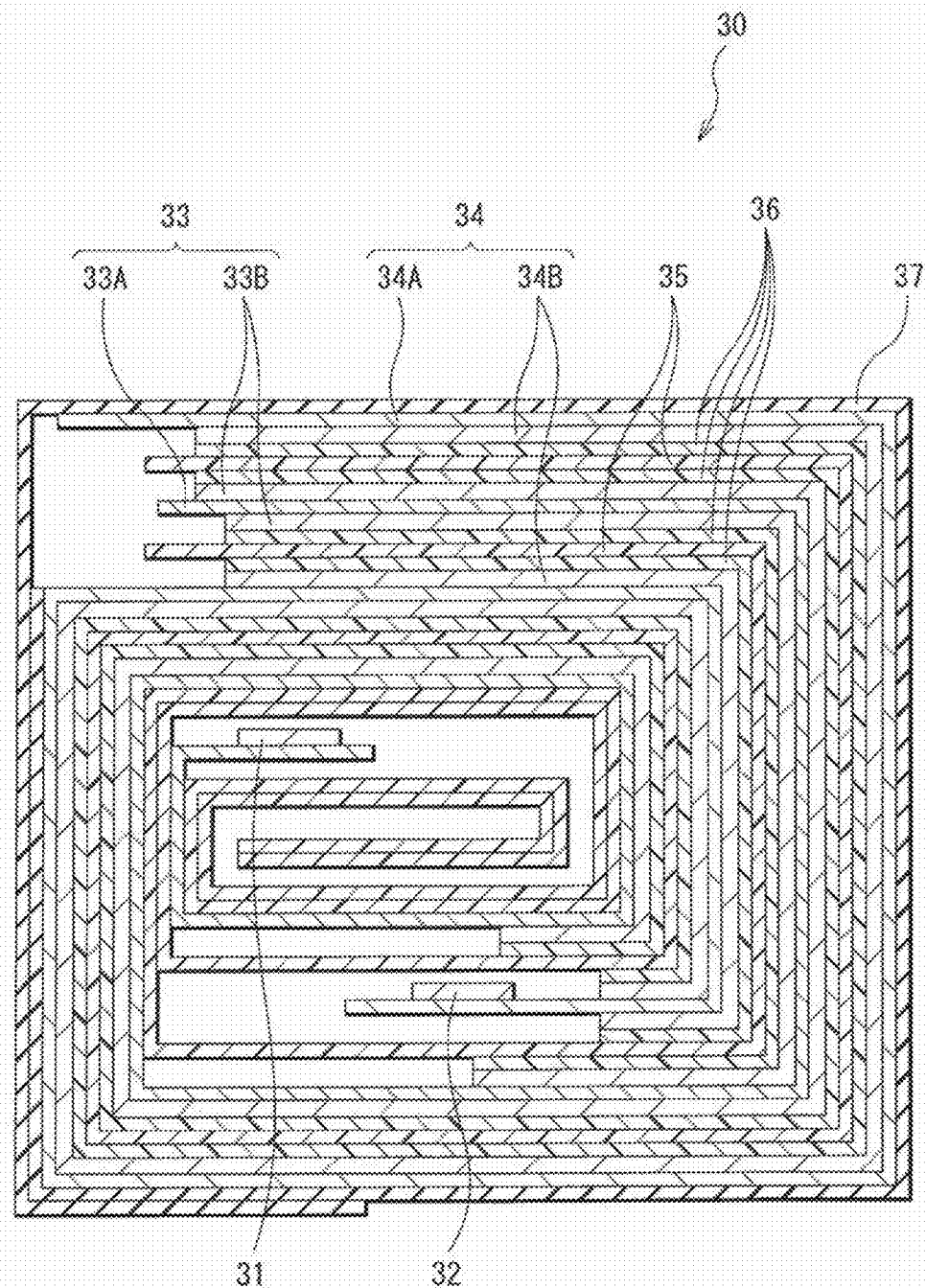
FIG. 8 is a cross sectional view taken along line VIII-VIII of a spirally wound electrode body illustrated in FIG. 7.

FIG. 7 illustrates an exploded perspective structure of a third secondary battery. FIG. 8 illustrates an enlarged cross section taken along line VIII-VIII of a spirally wound electrode body 30 illustrated in FIG. 7.

[Whole Structure of Secondary Battery]

The secondary battery is a lithium ion secondary battery as in the first secondary battery. In the secondary battery, the spirally wound electrode body 30 on which a cathode lead 31 and an anode lead 32 are attached is contained in a film package member 40 mainly. The battery structure using such a package member 40 is called the laminated film type.

The cathode lead 31 and the anode lead 32 are respectively led out from inside to outside of the package member 40 in the same direction, for example. However, arrangement positions of the cathode lead 31 and the anode lead 32 with respect to the spirally wound electrode body 30, derivation directions thereof and the like are not particularly limited. The cathode lead 31 is made of, for example, aluminum or the like, and the anode lead 32 is made of, for example, copper, nickel, stainless or the like. These materials are in the shape of, for example, a thin plate or mesh.

[Package Member]

The package member 40 is made of a laminated film in which, for example, a fusion bonding layer, a metal layer, and a surface protective layer are layered in this order. In this case, for example, the respective outer edges of the fusion bonding layer of two films are bonded to each other by fusion bonding, an adhesive or the like so that the fusion bonding layer and the spirally wound electrode body 30 are opposed to each other. Examples of the fusion bonding layer include a film made of polyethylene, polypropylene or the like. Examples of the metal layer include an aluminum foil. Examples of the surface protective layer include a film made of nylon, polyethylene terephthalate or the like.

Specially, as the package member 40, an aluminum laminated film in which a polyethylene film, an aluminum foil, and a nylon film are layered in this order is preferable. However, the package member 40 may be made of a laminated film having other laminated structure, a polymer film such as polypropylene, or a metal film, instead of the aluminum laminated film.

An adhesive film 41 to protect from entering of outside air is inserted between the package member 40 and the cathode lead 31, the anode lead 32. The adhesive film 41 is made of a material having contact characteristics with respect to the cathode lead 31 and the anode lead 32. Examples of such a material include, for example, a polyolefin resin such as polyethylene, polypropylene, modified polyethylene, and modified polypropylene.

[Cathode, Anode, and Separator]

In the spirally wound electrode body 30, a cathode 33 and an anode 34 are layered with a separator 35 and an electrolyte layer 36 in between and spirally wound. The outermost periphery thereof is protected by a protective tape 37. The cathode 33 has a structure in which, for example, a cathode active material layer 33B is provided on both faces of a cathode current collector 33A. The structures of the cathode current collector 33A and the cathode active material layer 33B are respectively similar to those of the cathode current collector 21A and the cathode active material layer 21B in the first secondary battery. The anode 34 has a structure in which, for example, an anode active material layer 34B is provided on both faces of an anode current collector 34A. The structures of the anode current collector 34A and the anode active material layer 34B are respectively similar to the structures of the anode current collector 22A and the anode active material layer 22B in the first secondary battery.

In addition, the structure of the separator 35 is similar to the structure of the separator 23 in the first secondary battery.

[Electrolyte Layer]

In the electrolyte layer 36, an electrolytic solution is held by a polymer compound and other material such as various additives may be contained according to needs. The electrolyte layer 36 is a so-called gel electrolyte. The gel electrolyte is preferable, since high ion conductivity (for example, 1 mS/cm or more at room temperature) is obtained and liquid leakage of the electrolytic solution is prevented.

Examples of the polymer compound include at least one of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further, examples thereof include a copolymer of vinylidene fluoride and hexafluoropropylene. One of these polymer compounds may be used singly, or a plurality thereof may be used by mixture. Specially, polyvinylidene fluoride or the copolymer of vinylidene fluoride and hexafluoropropylene is preferable, since such a polymer compound is electrochemically stable.

The composition of the electrolytic solution is similar to the composition of the electrolytic solution in the first secondary battery. However, in the electrolyte layer 36 as the gel electrolyte, a solvent of the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

In addition, instead of the gel electrolyte layer 36 in which the electrolytic solution is held by the polymer compound, the electrolytic solution may be directly used. In this case, the separator 35 is impregnated with the electrolytic solution.

[Operation of Secondary Battery]

In the secondary battery, at the time of charge, for example, lithium ions are extracted from the cathode 33, and are inserted in the anode 34 through the electrolyte layer 36. Meanwhile, at the time of discharge, for example, lithium ions are extracted from the anode 34, and are inserted in the cathode 33 through the electrolyte layer 36.

[Manufacturing Method of Secondary Battery]

The secondary battery including the gel electrolyte layer 36 is manufactured, for example, by the following three procedures.

In the first manufacturing method, first, the cathode 33 and the anode 34 are formed by a procedure similar to that of the cathode 21 and the anode 22 in the first secondary battery. Specifically, the cathode 33 is formed by forming the cathode active material layer 33B on both faces of the cathode current collector 33A, and the anode 34 is formed by forming the anode active material layer 34B on both faces of the anode current collector 34A. Subsequently, a precursor solution containing an electrolytic solution, a polymer compound, and a solvent is prepared. After the cathode 33 and the anode 34 are coated with the precursor solution, the solvent is volatilized to form the gel electrolyte layer 36. Subsequently, the cathode lead 31 is attached to the cathode current collector 33A by welding or the like, and the anode lead 32 is attached to the anode current collector 34A by welding or the like. Subsequently, the cathode 33 and the anode 34 provided with the electrolyte layer 36 are layered with the separator 35 in between and spirally wound to obtain a laminated body. After that, a protective tape 37 is adhered to the outermost periphery thereof to form the spirally wound electrode body 30. Finally, after the spirally wound electrode body 30 is sandwiched between two pieces of film-like package members 40, outer edges of the package members 40 are bonded by thermal fusion bonding or the like to enclose the spirally wound electrode body 30. At this time, the adhesive films 41 are inserted between the cathode lead 31, the anode lead 32 and the package member 40. Thereby, the secondary battery illustrated in FIG. 7 and FIG. 8 is completed.

In the second manufacturing method, first, the cathode lead 31 is attached to the cathode 33, and the anode lead 32 is attached to the anode 34. Subsequently, the cathode 33 and the anode 34 are layered with the separator 35 in between and spirally wound. After that, the protective tape 37 is adhered to the outermost periphery thereof, and thereby a spirally wound body as a precursor of the spirally wound electrode body 30 is formed. Subsequently, after the spirally wound body is sandwiched between two pieces of the film-like package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte layer 36 is formed. Accordingly, the secondary battery is completed.

In the third manufacturing method, the spirally wound body is formed and contained in the pouch-like package member 40 in the same manner as that of the foregoing second manufacturing method, except that the separator 35 with both faces coated with a polymer compound is used firstly. Examples of the polymer compound with which the separator 35 is coated include a polymer containing vinylidene fluoride as a component (a homopolymer, a copolymer, a multicomponent copolymer or the like). Specific examples thereof include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. In addition, as a polymer compound, in addition to the foregoing polymer containing vinylidene fluoride as a component, another one or more kinds of polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the polymer compound is impregnated with the electrolytic solution, and the polymer compound is gelated to form the electrolyte layer 36. Accordingly, the secondary battery is completed.

In the third manufacturing method, the battery swollenness is inhibited more than in the first manufacturing method. Further, in the third manufacturing method, the monomer, the solvent and the like as a raw material of the polymer compound are hardly left in the electrolyte layer 36 compared to in the second manufacturing method. In addition, the formation step of the polymer compound is favorably controlled. Thus, sufficient contact characteristics are obtained between the cathode 33/the anode 34/the separator 35 and the electrolyte layer 36.

According to the third secondary battery, in the case where the capacity of the anode 34 is expressed by insertion and extraction of lithium ions, the electrolyte layer 36 contains the foregoing electrolyte (electrolytic solution). Thus, cycle characteristics are able to be improved by an action similar to that of the first secondary battery. Other effect of the secondary battery is similar to that of the first secondary battery. It is to be noted that the structure of the third secondary battery is not limited to the structure similar to that of the first secondary battery, and may be a structure similar to that of the second secondary battery. In the latter case, similar effect is able to be also obtained.

EXAMPLES

Specific examples of the present invention will be described in detail.

Examples 1-1 to 1-32

The cylindrical type lithium ion secondary batteries illustrated in FIG. 1 and FIG. 2 were fabricated by the following procedure.

First, the cathode 21 was formed. In this case, first, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium-cobalt composite oxide ($LiCoO_2$) was obtained. Subsequently, 91 parts by mass of $LiCoO_2$ as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone to obtain paste cathode mixture slurry. Subsequently, both faces of the cathode current collector 21A were uniformly coated with the cathode mixture slurry by using a coating device, which was dried to form the cathode active material layer 21B. As the cathode current collector 21A, a strip-shaped aluminum foil (thickness: 12 μm) was used. Finally, the cathode active material layer 21B was compression-molded by using a roll pressing machine.

Next, the anode 22 was formed. In this case, first, 97 parts by mass of artificial graphite as an anode active material and 3 parts by mass of polyvinylidene fluoride as an anode binder were mixed to obtain an anode mixture. Subsequently, the anode mixture was dispersed in N-methyl-2-pyrrolidone to obtain paste anode mixture slurry. Subsequently, both faces of the anode current collector 22A were uniformly coated with the anode mixture slurry by using a coating device, which was dried to form the anode active material layer 22B. As the anode current collector 22A, a strip-shaped electrolytic copper foil (thickness: 15 μm) was used. Finally, the anode active material layer 22B (single face thickness: 70 μm) was compression-molded by using a roll pressing machine.

Next, an electrolytic solution as a liquid electrolyte was prepared. In this case, first, as a solvent, ethylene carbonate (EC) and dimethyl carbonate (DMC) were mixed at a weight ratio of EC:DMC=30:70. Subsequently, lithium hexafluorophosphate ($LiPF_6$) as an electrolyte salt was added and dissolved into the mixed solvent so that the content of lithium hexafluorophosphate was 1.2 mol/kg. Finally, a sulfone compound and a nitrile compound or the like were added and were subsequently mixed. At this time, as the sulfone compound, the compound shown in Formula (1-1) or the compound shown in Formula (1-2) was used. Further, as the nitrile compound, succinonitrile (SCN), 1,6-dicyanohexane (DCNH), 1,2,3-propane tricarbonitrile (PTCN), or 7,7,8,8-tetracyanoquinodimethane (TCNQ) was used. As the isocyanate compound, 1-isocyanato pentane (NCOP), 1,8-dicyanato octane (DNCO), or 1,4-diisocyanato butane-1,4-dione (DNCOB) was used. As the pyrrolidone compound, N-ethyl-2-pyrrolidone (NEP), N-propyl-2-pyrrolidone (NPP), N-cyclohexyl-2-pyrrolidone (NCHP), or N-phenyl-2-pyrrolidone (NPhP) was used. As the ether compound, NOVEC HFE7100 (manufactured by 3M Company) as $C_4F_9OCH_3$ or NOVEC HFE7300 (manufactured by 3M Company) as $C_6F_{13}OCH_3$ was used. The content of the sulfone compound and the content of the nitrile compound or the like (except for the ether compound) in the electrolytic solution of respective examples (weight %:wt %) were as illustrated in Table 1 and Table 2. However, in Examples 1-12, 1-13, 1-25, 1-26, and 1-30 to 1-32 using the ether compound, the electrolytic solution was prepared in the same manner as the foregoing manner, except that a mixed solvent obtained by mixing EC, DMC, and the ether compound at a weight ratio of EC:DMC:ether compound=30:60:10.

Finally, the secondary battery was assembled by using the cathode 21, the anode 22, and the electrolytic solution. In this case, first, the cathode lead 25 was welded to the cathode current collector 21A, and the anode lead 26 was welded to the anode current collector 22A. Subsequently, the cathode 21 and the anode 22 were layered with the separator 23 in between and spirally wound to form the spirally wound electrode body 20. After that, the center pin 24 was inserted in the center of the spirally wound electrode body 20. As the separator 23, a microporous polypropylene film (thickness: 25 μm) was used. Subsequently, while the spirally wound electrode body 20 was sandwiched between the pair of insulating plates 12 and 13, the spirally wound electrode body 20 was contained in the battery can 11 made of iron plated with nickel. At this time, the cathode lead 25 was welded to the safety valve mechanism 15, and the anode lead 26 was welded to the battery can 11. Subsequently, with the use of depressurization method, the electrolytic solution was injected into the battery can 11, and the separator 23 was impregnated with the electrolytic solution. Finally, at the open end of the battery can 11, the battery cover 14, safety valve mechanism 15, and the PTC device 16 were fixed by being caulked with the gasket 17. The cylindrical type secondary battery was thereby completed. In forming the secondary battery, lithium metal was prevented from being precipitated on the anode 22 at the full charged state by adjusting the thickness of the cathode active material layer 21B.

Examples 1-33 to 1-48

A procedure similar to that of Examples 1-1 to 1-32 was executed, except that combination of the sulfone compound and the nitrile compound or the like was not used as illustrated in Table 2. However, in Examples 1-47 and 1-48 in which the ether compound was used, a mixed solvent obtained by mixing EC, DMC, and the ether compound at a weight ratio of EC:DMC:ether compound=30:60:10 was used.

Cycle characteristics and safety respectively at 23 deg C. and 45 deg C. for the secondary batteries of Examples 1-1 to 1-48 were examined. The results illustrated in Table 1 and Table 2 were obtained.

In examining cycle characteristics at 23 deg C., first, 2 cycles of charge and discharge were performed in the atmosphere at 23 deg C., and the discharge capacity at the second cycle was measured. Subsequently, the secondary battery was charged and discharged repeatedly in the same atmosphere until the total number of cycles became 200 cycles, and thereby the discharge capacity at the 200th cycle was measured. Finally, the cycle discharge capacity retention ratio (%)=(discharge capacity at the 200th cycle/discharge capacity at the second cycle)*100 was calculated. At the time of charge, constant current and constant voltage charge was performed at a constant current density of 1 mA/cm until the upper voltage of 4.2 V, and charge was performed at a constant voltage of 4.2 V until a current density of 0.02 mA/cm$^2$. At the time of discharge, constant current discharge was performed at a constant current density of 1 mA/cm$^2$ until the final voltage of 3.0 V.

In examining cycle characteristics at 45 deg C., the cycle discharge capacity retention ratio was calculated in the same manner as that of cycle characteristics at 23 deg C., except that atmosphere at the time of charge and discharge was 45 deg C.

In examining safety, safety valve operation time was measured. In this case, first, 2 cycles of charge and discharge were performed in the atmosphere at 23 deg C. Subsequently, the battery that had been charged again was stored in a constant temperature bath at 95 deg C., and time until safety valve mechanism 15 of the secondary battery stared operation was measured. The charge and discharge conditions were similar to those in the case of examining cycle characteristics.

It is to be noted that the procedures and the conditions in examining cycle characteristics at 23 deg C. and at 45 deg C. and safety as described above were similarly applied to the following examples.

TABLE 1

Anode active material: artificial graphite
Solvent: EC + DMC
Electrolyte salt: LiPF$_6$

| | Sulfone compound | | Other solvent Nitrile compound or the like | | | Cycle discharge capacity retention ratio (%) | | Safety valve operation time |
|---|---|---|---|---|---|---|---|---|
| | Type | Content (wt %) | Type | Content (wt %) | Ether compound | 23 deg C. | 45 deg C. | (time) |
| Example 1-1 | Formula (1-1) | 1 | SCN | 0.1 | — | 83 | 85 | 81 |
| Example 1-2 | | | DCNH | 0.1 | | 79 | 83 | 77 |
| Example 1-3 | | | PTCN | 0.1 | | 83 | 83 | 78 |
| Example 1-4 | | | TCNQ | 0.1 | | 82 | 81 | 77 |
| Example 1-5 | | | NCOP | 0.1 | | 79 | 84 | 75 |
| Example 1-6 | | | DNCO | 0.5 | | 82 | 85 | 81 |

TABLE 1-continued

Anode active material: artificial graphite
Solvent: EC + DMC
Electrolyte salt: LiPF$_6$

| | Sulfone compound | | Nitrile compound or the like | | | Cycle discharge capacity retention ratio (%) | | Safety valve operation time |
|---|---|---|---|---|---|---|---|---|
| | Type | Content (wt %) | Type | Content (wt %) | Ether compound | 23 deg C. | 45 deg C. | (time) |
| Example 1-7 | | | DNCOB | 0.5 | | 81 | 85 | 78 |
| Example 1-8 | | | NEP | 0.5 | | 81 | 82 | 80 |
| Example 1-9 | | | NEP | 0.5 | | 80 | 82 | 80 |
| Example 1-10 | | | NCHP | 0.5 | | 79 | 85 | 79 |
| Example 1-11 | | | NPhP | 0.5 | | 78 | 85 | 80 |
| Example 1-12 | | | — | — | C$_4$F$_9$OCH$_3$ | 78 | 84 | 81 |
| Example 1-13 | | | — | — | C$_6$F$_{13}$OCH$_3$ | 77 | 84 | 80 |
| Example 1-14 | Formula (1-2) | 1 | SCN | 0.1 | — | 85 | 88 | 80 |
| Example 1-15 | | | DCNH | 0.1 | | 82 | 81 | 77 |
| Example 1-16 | | | PTCN | 0.1 | | 80 | 83 | 77 |
| Example 1-17 | | | TCNQ | 0.1 | | 83 | 83 | 78 |
| Example 1-18 | | | NCOP | 0.1 | | 80 | 83 | 76 |
| Example 1-19 | | | DNCO | 0.5 | | 83 | 85 | 81 |
| Example 1-20 | | | DNCOB | 0.5 | | 84 | 85 | 79 |
| Example 1-21 | | | NEP | 0.5 | | 84 | 88 | 82 |
| Example 1-22 | | | NPP | 0.5 | | 82 | 86 | 81 |
| Example 1-23 | | | NCHP | 0.5 | | 80 | 85 | 80 |
| Example 1-24 | | | NPhP | 0.5 | | 79 | 85 | 80 |
| Example 1-25 | | | — | — | C$_4$F$_9$OCH$_3$ | 80 | 86 | 81 |
| Example 1-26 | | | — | — | C$_6$F$_{13}$OCH$_3$ | 80 | 84 | 80 |

TABLE 2

Anode active material: artificial graphite
Solvent: EC + DMC
Electrolyte salt: LiPF$_6$

| | Sulfone compound | | Nitrile compound or the like | | | Cycle discharge capacity retention ratio (%) | | Safety valve operation time |
|---|---|---|---|---|---|---|---|---|
| | Type | Content (wt %) | Type | Content (wt %) | Ether compound | 23 deg C. | 45 deg C. | (time) |
| Example 1-27 | Formula (1-2) | 1 | SCN + DNCO | 0.1 + 0.5 | — | 86 | 89 | 85 |
| Example 1-28 | | | SCN + NEP | 0.1 + 0.5 | | 86 | 90 | 84 |
| Example 1-29 | | | DNCO + NEP | 0.5 + 0.5 | | 86 | 86 | 85 |
| Example 1-30 | | | SCN | 0.1 | C$_4$F$_9$OCH$_3$ | 86 | 90 | 83 |
| Example 1-31 | | | DNCO | 0.5 | | 88 | 91 | 83 |
| Example 1-32 | | | NEP | 0.5 | | 86 | 90 | 83 |
| Example 1-33 | — | — | — | — | — | 61 | 63 | 54 |
| Example 1-34 | Formula (1-1) | 1 | — | — | — | 71 | 75 | 55 |
| Example 1-35 | Formula (1-2) | 1 | | | | 72 | 76 | 56 |
| Example 1-36 | — | — | SCN | 0.1 | | 50 | 53 | 62 |
| Example 1-37 | | | DCNH | 0.1 | | 45 | 46 | 59 |
| Example 1-38 | | | PTCN | 0.1 | | 48 | 49 | 60 |
| Example 1-39 | | | TCNQ | 0.1 | | 46 | 49 | 58 |
| Example 1-40 | | | NCOP | 0.1 | | 55 | 59 | 59 |
| Example 1-41 | | | DNCO | 0.5 | | 45 | 47 | 61 |
| Example 1-42 | | | DNCOB | 0.5 | | 58 | 60 | 58 |
| Example 1-43 | | | NEP | 0.5 | | 53 | 55 | 62 |
| Example 1-44 | | | NPP | 0.5 | | 50 | 52 | 61 |
| Example 1-45 | | | NCHP | 0.5 | | 52 | 56 | 61 |
| Example 1-46 | | | NPhP | 0.5 | | 50 | 52 | 60 |
| Example 1-47 | | | — | — | C$_4$F$_9$OCH$_3$ | 44 | 50 | 62 |
| Example 1-48 | | | — | — | C$_6$F$_{13}$OCH$_3$ | 47 | 52 | 61 |

As illustrated in Table 1 and Table 2, in the secondary battery using artificial graphite as an anode active material, the following result was obtained. That is, in Examples 1-1 to 1-32 in which the combination of the sulfone compound and the nitrile compound or the like was used, the cycle discharge capacity retention ratios at 23 deg C. and 45 deg C. were higher and safety valve operation time was longer than in Examples 1-33 to 1-48 in which the combination of the sulfone compound and the nitrile compound or the like was not used.

The foregoing results showed the following fact in the electrolyte of the secondary battery. In the case where only the sulfone compound was used out of the sulfone compound and the nitrile compound or the like, electrolyte decomposition reaction at the time of repeated charge and discharge at 23 deg C. and 45 deg C. (at the time of charge and discharge at 23 deg C. and 45 deg C.) was slightly inhibited, but was not sufficiently inhibited. Meanwhile, if only the nitrile compound or the like was used, electrolyte decomposition reaction at the time of repeated charge and discharge at 23 deg C. and 45 deg C. was improved. However, in using the combination of the sulfone compound and the nitrile compound or the like that are not able to sufficiently inhibit electrolyte decomposition reaction at the time of charge and discharge at 23 deg C. and 45 deg C., due to synergetic effect thereof, electrolyte decomposition inhibition effect was significantly demonstrated. In addition, in using the combination of the sulfone compound and the nitrile compound or the like, electrolyte decomposition reaction in the case where the battery was stored at 95 deg C. in a state of being charged was more significantly inhibited due to synergetic effect. That is, in the case where both the sulfone compound and the nitrile compound or the like were used, chemical stability of the electrolyte was more improved than in the case that both thereof were not used or the case that only one thereof was used.

Further, the cycle discharge capacity retention ratio at 23 deg C. and 45 deg C. and safety valve operation time became favorable without depending on the type of the sulfone compound and the type of the nitrile compound or the like. Specially, in the case where the plurality of kinds of nitrile compounds were used together with the sulfone compound, the cycle discharge capacity retention ratio at 23 deg C. and 45 deg C. and safety valve operation time became more favorable than in the case that one kind of nitrile compound was used (refer to Examples 1-14 to 1-32).

Accordingly, in the secondary battery using the artificial graphite as an anode active material, the following was confirmed. That is, in the case where the solvent of the electrolyte contained at least one kind of the sulfone compounds and at least one kind of the nitrile compound, the isocyanate compound, the pyrrolidone compound, and the ether compound, cycle characteristics and safety were improved.

Examples 2-1 to 2-28

A procedure similar to that of Examples 1-1 to 1-13 and 1-34 was executed, except that the compound shown in Formula (2-1) or the compound shown in Formula (2-2) was used instead of the compound shown in Formula (1-1) as the sulfone compound as illustrated in Table 3. For the secondary batteries of Examples 2-1 to 2-28, cycle characteristics at 23 deg C. and 45 deg C. and safety were examined. The results illustrated in Table 3 were obtained.

TABLE 3

Anode active material: artificial graphite
Solvent EC + DMC
Electrolyte salt: $LiPF_6$

| | Other solvent | | | | | Cycle discharge capacity retention ratio (%) | | Safety valve operation time (time) |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | |
| Example 2-1 | Formula (2-1) | 1 | SCN | 0.1 | — | 81 | 83 | 79 |
| Example 2-2 | | | DCNH | 0.1 | | 79 | 80 | 74 |
| Example 2-3 | | | PTCN | 0.1 | | 78 | 80 | 76 |
| Example 2-4 | | | TCNQ | 0.1 | | 78 | 80 | 75 |
| Example 2-5 | | | NCOP | 0.1 | | 79 | 82 | 76 |
| Example 2-6 | | | DNCO | 0.5 | | 80 | 83 | 78 |
| Example 2-7 | | | DNCOB | 0.5 | | 80 | 84 | 77 |
| Example 2-8 | | | NEP | 0.5 | | 79 | 82 | 78 |
| Example 2-9 | | | NPP | 0.5 | | 79 | 82 | 77 |
| Example 2-10 | | | NCHP | 0.5 | | 78 | 80 | 75 |
| Example 2-11 | | | NPhP | 0.5 | | 77 | 80 | 79 |
| Example 2-12 | | | — | | $C_4F_9OCH_3$ | 80 | 84 | 81 |
| Example 2-13 | | | — | | $C_6F_{13}OCH_3$ | 79 | 83 | 80 |
| Example 2-14 | Formula (2-2) | 1 | SCN | 0.1 | — | 79 | 83 | 79 |
| Example 2-15 | | | DCNH | 0.1 | | 77 | 79 | 77 |
| Example 2-16 | | | PTCN | 0.1 | | 77 | 80 | 75 |
| Example 2-17 | | | TCNQ | 0.1 | | 75 | 78 | 77 |
| Example 2-18 | | | NCOP | 0.1 | | 76 | 80 | 74 |
| Example 2-19 | | | DNCO | 0.5 | | 79 | 85 | 74 |
| Example 2-20 | | | DNCOB | 0.5 | | 80 | 82 | 78 |
| Example 2-21 | | | NEP | 0.5 | | 78 | 84 | 79 |
| Example 2-22 | | | NPP | 0.5 | | 77 | 81 | 79 |
| Example 2-23 | | | NCHP | 0.5 | | 77 | 81 | 77 |
| Example 2-24 | | | NPhP | 0.5 | | 78 | 83 | 79 |
| Example 2-25 | | | — | | $C_4F_9OCH_3$ | 78 | 82 | 75 |

TABLE 3-continued

Anode active material: artificial graphite
Solvent EC + DMC
Electrolyte salt: LiPF$_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 2-26 | — | | — | | C$_6$F$_{13}$OCH$_3$ | 77 | 80 | 76 |
| Example 2-27 | Formula (2-1) | 1 | — | | | 71 | 74 | 54 |
| Example 2-28 | Formula (2-2) | 1 | | | | 70 | 74 | 53 |

As illustrated in Table 3, in the secondary battery using the artificial graphite as an anode active material, results similar to the results of Table 1 and Table 2 were obtained even if the type of the sulfone compound was changed. That is, in Examples 2-1 to 2-26 in which the combination of the sulfone compound and the nitrile compound or the like was used, the discharge capacity retention ratios at 23 deg C. and 45 deg C. were higher and safety valve operation time was longer than in Examples 1-33 to 1-49, 2-27, and 2-28 in which the combination of the sulfone compound and the nitrile compound or the like was not used. Accordingly, it was confirmed that in the secondary battery using the artificial graphite as an anode active material, in the case where the solvent of the electrolyte contained the sulfone compound and the nitrile compound or the like, cycle characteristics and safety were improved.

Examples 3-1 to 3-9

A procedure similar to that of Examples 1-14, 1-19, 1-21, 1-25, 2-1, 2-6, 2-8, 2-12, and 1-33 was executed, except that the composition of the solvent was changed as illustrated in Table 4. In this case, as a solvent, 4-fluoro-1,3-dioxolane-2-one (FEC) as a halogenated cyclic ester carbonate shown in Formula (7) was further used. However, in Examples 3-1 to 3-3, 3-5 to 3-7, and 3-9 in which the ether compound was not used, a mixed solvent was prepared so that the composition of EC, DMC, and FEC was 27:70:3 at a weight ratio (EC:DMC:FEC). Further, in Examples 3-4 and 3-8 in which the ether compound was used, a mixed solvent was prepared so that the composition of EC, DMC, the ether compound and FEC was 27:60:10:3 at a weight ratio (EC:DMC:ether compound:FEC). For the secondary batteries of Examples 3-1 to 3-9, cycle characteristics respectively at 23 deg C. and 45 deg C. and safety were examined. The results illustrated in Table 4 were obtained.

TABLE 4

Anode active material: artificial graphite
Solvent: EC + DMC + FEC
Electrolyte salt: LiPF$_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 3-1 | Formula (1-2) | 1 | SCN | 0.1 | — | 93 | 95 | 83 |
| Example 3-2 | | | DNCO | 0.5 | | 92 | 94 | 84 |
| Example 3-3 | | | NEP | 0.5 | | 91 | 95 | 85 |
| Example 3-4 | | | — | | C$_4$F$_9$OCH$_3$ | 89 | 94 | 83 |
| Example 3-5 | Formula (2-1) | 1 | SCN | 0.1 | — | 90 | 94 | 81 |
| Example 3-6 | | | DNCO | 0.5 | | 91 | 93 | 81 |
| Example 3-7 | | | NEP | 0.5 | | 90 | 91 | 83 |
| Example 3-8 | | | — | | C$_4$F$_9$OCH$_3$ | 88 | 94 | 82 |
| Example 3-9 | — | | — | | — | 70 | 73 | 53 |

As illustrated in Table 4, in the secondary battery using the artificial graphite as an anode active material, results similar to the results shown in Table 1 to Table 3 were obtained even if FEC was added to the electrolyte. That is, in Examples 3-1 to 3-8 in which the combination of the sulfone compound and the nitrile compound or the like was used, the cycle discharge capacity retention ratios at 23 deg C. and 45 deg C. were higher and safety valve operation time was longer than in Example 3-9 in which the combination of the sulfone compound and the nitrile compound or the like was not used. In this case, in Examples 3-1 to 3-8, the cycle discharge capacity retention ratios at 23 deg C. and 45 deg C. were higher and safety valve operation time was longer than in Examples 1-14, 1-19, 1-21, 1-25, 2-1, 2-6, 2-8, and 2-12 in which FEC was not used. Accordingly, it was confirmed that in the secondary battery using the artificial graphite as an anode active material, in the case where the solvent of the electrolytic solution contained the sulfone compound and the nitrile compound or the like, cycle characteristics and safety were improved even if the composition of the solvent was changed. In this case, in particular, it was confirmed that in the case where the solvent contained the halogenated cyclic ester carbonate shown in Formula (7), cycle characteristics and safety were more improved.

Examples 4-1 to 4-20

A procedure similar to that of Examples 1-14, 1-19, 1-21, 1-25, and 1-33 was executed, except that the composition of the solvent was changed as illustrated in Table 5. In this case, as a solvent, trans-4,5-difluoro-1,3-dioxolane-2-one (tDFEC) as the halogenated cyclic ester carbonate shown in Formula (7) or vinylene carbonate (VC) as the unsaturated carbon bond cyclic ester carbonate shown in Formula (8) was used. Further, propene sultone (PRS) as sultone or succinic anhydride (SCAH) as an acid anhydride was used. The content of tDFEC and the like in the solvent was 1 wt %. For the secondary batteries of Examples 4-1 to 4-20, cycle characteristics respectively at 23 deg C. and 45 deg C. and safety were examined. The results illustrated in Table 5 were obtained.

safety valve operation time was longer than in Examples 4-17 to 4-20 in which the combination of the sulfone compound and the nitrile compound or the like was not used. In this case, in Examples 4-1 to 4-16 in which tDFEC or the like was used, the cycle discharge capacity retention ratios at 23 deg C. and 45 deg C. and safety valve operation time were significantly higher than in Examples 1-14, 1-19, 1-21, and 1-25 in which tDFEC or the like was not used. Accordingly, it was confirmed that in the secondary battery using the artificial graphite as an anode active material, in the case where the solvent of the electrolyte contained the sulfone compound and the nitrile compound or the like, cycle characteristics and safety were improved even if the composition of the solvent was changed. In this case, in particular, it was confirmed that in the case where the solvent of the electrolytic solution
contained at least one kind of the halogenated cyclic ester carbonate shown in Formula (7), the unsaturated carbon bond cyclic ester carbonate shown in Formula (8), sultone, and the acid anhydride, cycle characteristics and safety were more improved.

Examples 5-1 to 5-15

A procedure similar to that of Examples 1-14, 1-19, 1-21, 1-25, and 1-33 was executed, except that the type of electrolyte salt was changed as illustrated in Table 6 and Table 7. In this case, lithium tetrafluoroborate ($LiBF_4$), the com-

TABLE 5

Anode active material: artificial graphite
Solvent: EC + DMC
Electrolyte salt: $LiPF_6$

| | | Other solvent | | | | | | Safety |
| | | Sulfone compound | | Nitrile compound or the like | | | Cycle discharge capacity retention ratio (%) | | valve operation time |
| | Solvent | Type | Content (wt %) | Type | Content (wt %) | Ether compound | 23 deg C. | 45 deg C. | (time) |
|---|---|---|---|---|---|---|---|---|---|
| Example 4-1 | tDFEC | Formula (1-2) | 1 | SCN | 0.1 | — | 91 | 93 | 86 |
| Example 4-2 | VC | | | | | | 90 | 92 | 87 |
| Example 4-3 | PRS | | | | | | 89 | 91 | 87 |
| Example 4-4 | SCAH | | | | | | 89 | 90 | 86 |
| Example 4-5 | tDFEC | Formula (1-2) | 1 | DNCO | 0.5 | — | 90 | 92 | 86 |
| Example 4-6 | VC | | | | | | 89 | 91 | 86 |
| Example 4-7 | PRS | | | | | | 88 | 88 | 85 |
| Example 4-8 | SCAH | | | | | | 90 | 88 | 86 |
| Example 4-9 | tDFEC | Formula (1-2) | 1 | NEP | 0.5 | — | 91 | 93 | 87 |
| Example 4-10 | VC | | | | | | 90 | 91 | 85 |
| Example 4-11 | PRS | | | | | | 89 | 90 | 85 |
| Example 4-12 | SCAH | | | | | | 90 | 92 | 86 |
| Example 4-13 | tDFEC | Formula (1-2) | 1 | — | — | $C_4F_9OCH_3$ | 90 | 92 | 86 |
| Example 4-14 | VC | | | | | | 89 | 91 | 85 |
| Example 4-15 | PRS | | | | | | 89 | 90 | 89 |
| Example 4-16 | SCAH | | | | | | 88 | 91 | 86 |
| Example 4-17 | tDFEC | — | | — | — | — | 71 | 73 | 53 |
| Example 4-18 | VC | | | | | | 66 | 72 | 55 |
| Example 4-19 | PRS | | | | | | 63 | 66 | 56 |
| Example 4-20 | SCAH | | | | | | 67 | 71 | 54 |

As illustrated in Table 5, in the secondary battery using the artificial graphite as an anode active material, results similar to the results shown in Table 1 and Table 2 were obtained even if tDFEC or the like was added to the electrolyte. That is, in Examples 4-1 to 4-16 in which the combination of the sulfone compound and the nitrile compound or the like was used, the cycle discharge capacity retention ratios at 23 deg C. and 45 deg C. were higher and pound shown in Formula (11-6) as the compound shown in Formula (11), or lithium bis(trifluoromethanesulfonyl)imide (LiTFSI) as the compound shown in Formula (14) was used. At this time, the content of $LiPF_6$ to the mixed solvent was 1.1 mol/kg, and the content of $LiBF_4$ or the like to the mixed solvent was 0.1 mol/kg. For the secondary batteries of Examples 5-1 to 5-15, cycle characteristics respectively at 23 deg C. and 45 deg C., safety, and storage characteristics at 80 deg C. were examined. The results illustrated in Table 6 and Table 7 were obtained. In Table 6 and Table 7, the storage characteristics results for the secondary batteries of Examples 1-14, 1-19, 1-21, 1-25, and 1-33 were also shown.

In examining the storage characteristics, first, 2 cycles of charge and discharge were performed in the atmosphere at 23 deg C., and the discharge capacity before storage was measured. Subsequently, after the battery that had been charged again was stored in a constant temperature bath at 80 deg C. for 10 days, discharge was performed in the atmosphere at 23 deg C., and the discharge capacity after storage was measured. Finally, the storage discharge capacity retention ratio (%)=(discharge capacity after storage/discharge capacity before storage)*100 was calculated. The charge and discharge conditions were similar to those in the case of examining cycle characteristics.

Table 3 were obtained even if $LiBF_4$ or the like was added to the electrolyte. That is, in Examples 5-1 to 5-12 in which the combination of the sulfone compound and the nitrile compound or the like was used, the cycle discharge capacity retention ratios at 23 deg C. and 45 deg C. were higher and safety valve operation time was longer than in Examples 5-13 to 5-15 in which the combination of the sulfone compound and the nitrile compound or the like was not used. Further, in this case, in Examples 5-1 to 5-12, the storage discharge capacity retention ratios were higher than those in Examples 5-13 to 5-15. In particular, in Examples 5-1 to 5-12 in which $LiBF_4$ or the like was added to the electrolyte, safety valve operation time was longer and the storage discharge capacity retention ratios were significantly higher than in Examples 1-14, 1-19, 1-21, and 1-25 in which $LiBF_4$ or the like was not added to the electrolyte. Accordingly, it

TABLE 6

Anode active material: artificial graphite; Solvent: EC + DMC; Electrolyte salt: $LiPF_6$

| | Other solvent | | | | | Cycle discharge capacity retention ratio (%) | | Safety valve operation time | Storage discharge capacity retention ratio |
| | Sulfone compound | | Nitrile compound or the like | | | | | | |
| | Type | Content (wt %) | Type | Content (wt %) | Ether compound | Electrolyte salt | 23 deg C. | 45 deg C. | (time) | (%) |
|---|---|---|---|---|---|---|---|---|---|---|
| Example 1-14 | Formula (1-2) | 1 | SCN | 0.1 | — | — | 85 | 88 | 80 | 75 |
| Example 5-1 | | | | | | $LiBF_4$ | 86 | 88 | 92 | 80 |
| Example 5-2 | | | | | | Formula (11-6) | 85 | 89 | 91 | 81 |
| Example 5-3 | | | | | | LiTFSI | 86 | 88 | 92 | 80 |
| Example 1-19 | Formula (1-2) | 1 | DNCO | 0.5 | — | — | 83 | 85 | 81 | 76 |
| Example 5-4 | | | | | | $LiBF_4$ | 85 | 86 | 89 | 81 |
| Example 5-5 | | | | | | Formula (11-6) | 84 | 85 | 91 | 82 |
| Example 5-6 | | | | | | LiTFSI | 83 | 86 | 90 | 80 |
| Example 1-21 | Formula (1-2) | 1 | NEP | 0.5 | — | — | 84 | 88 | 82 | 76 |
| Example 5-7 | | | | | | $LiBF_4$ | 85 | 88 | 88 | 80 |
| Example 5-8 | | | | | | Formula (11-6) | 85 | 88 | 89 | 80 |
| Example 5-9 | | | | | | LiTFSI | 84 | 89 | 89 | 82 |
| Example 1-25 | Formula (1-2) | 1 | — | — | $C_4F_9OCH_3$ | — | 80 | 86 | 81 | 77 |
| Example 5-10 | | | | | | $LiBF_4$ | 81 | 87 | 87 | 82 |
| Example 5-11 | | | | | | Formula (11-6) | 81 | 86 | 87 | 80 |
| Example 5-12 | | | | | | LiTFSI | 80 | 87 | 88 | 81 |

TABLE 7

Anode active material: artificial graphite; Solvent: EC + DMC; Electrolyte salt: $LiPF_6$

| | Other solvent | | | | | Cycle discharge capacity retention ratio (%) | | Safety valve operation time | Storage discharge capacity retention ratio |
| | Sulfone compound | | Nitrile compound or the like | | | | | | |
| | Type | Content (wt %) | Type | Content (wt %) | Ether compound | Electrolyte salt | 23 deg C. | 45 deg C. | (time) | (%) |
|---|---|---|---|---|---|---|---|---|---|---|
| Example 1-33 | — | — | — | — | — | — | 61 | 63 | 54 | 60 |
| Example 5-13 | | | | | | $LiBF_4$ | 57 | 60 | 60 | 68 |
| Example 5-14 | | | | | | Formula (11-6) | 59 | 62 | 62 | 67 |
| Example 5-15 | | | | | | LiTFSI | 60 | 63 | 58 | 69 |

As illustrated in Table 6 and Table 7, in the secondary battery using the artificial graphite as an anode active material, results similar to the results shown in Table 1 and was confirmed that in the secondary battery using the artificial graphite as an anode active material, in the case where the solvent of the electrolytic solution contained the sulfone compound and the nitrile compound or the like, cycle characteristics and safety were improved even if the composition of the electrolyte salt was changed. In this case, in particular, it was confirmed that in the case where the electrolyte salt contained at least one kind of LiBF$_4$, the compound shown in Formula (11), and the compound shown in Formula (14), safety and storage characteristics together with cycle characteristics were improved.

Examples 6-1 to 6-48

A procedure similar to that of Examples 1-1 to 1-48 was executed, except that the anode 22 was formed by using silicon as an anode active material and diethyl carbonate (DEC) was used instead of DMC as a solvent as illustrated in Table 8 and Table 9. In forming the anode 22, silicon was deposited on the surface of the anode current collector 22A made of an electrolytic copper foil (thickness: 15 μm) by using evaporation method (electron beam evaporation method), and thereby the anode active material layer 22B containing a plurality of anode active material particles was formed. In this case, the total thickness of the anode active material layer 22B was 6 μm. For the secondary batteries of Examples 6-1 to 6-49, cycle characteristics respectively at 23 deg C. and 45 deg C. and safety were examined. The results illustrated in Table 8 and Table 9 were obtained.

TABLE 8

Anode active material: silicon
Solvent: EC + DEC
Electrolyte salt: LiPF$_6$

| | Sulfone compound | | Nitrile compound or the like | | Ether compound | Cycle discharge capacity retention ratio (%) | | Safety valve operation time |
|---|---|---|---|---|---|---|---|---|
| | Type | Content (wt %) | Type | Content (wt %) | | 23 deg C. | 45 deg C. | (time) |
| Example 6-1 | Formula (1-1) | 1 | SCN | 0.1 | — | 61 | 64 | 60 |
| Example 6-2 | | | DCNH | 0.1 | | 58 | 62 | 59 |
| Example 6-3 | | | PTCN | 0.1 | | 57 | 60 | 58 |
| Example 6-4 | | | TCNQ | 0.1 | | 55 | 61 | 59 |
| Example 6-5 | | | NCOP | 0.1 | | 59 | 61 | 59 |
| Example 6-6 | | | DNCO | 0.5 | | 61 | 62 | 61 |
| Example 6-7 | | | DNCOB | 0.5 | | 60 | 61 | 60 |
| Example 6-8 | | | NEP | 0.5 | | 59 | 62 | 62 |
| Example 6-9 | | | NPP | 0.5 | | 59 | 60 | 59 |
| Example 6-10 | | | NCHP | 0.5 | | 59 | 61 | 58 |
| Example 6-11 | | | NPhP | 0.5 | | 57 | 60 | 60 |
| Example 6-12 | | | — | — | C$_4$F$_9$OCH$_3$ | 59 | 61 | 61 |
| Example 6-13 | | | — | — | C$_6$F$_{13}$OCH$_3$ | 57 | 61 | 60 |
| Example 6-14 | Formula (1-2) | 1 | SCN | 0.1 | — | 58 | 61 | 62 |
| Example 6-15 | | | DCNH | 0.1 | | 55 | 61 | 77 |
| Example 6-16 | | | PTCN | 0.1 | | 58 | 59 | 58 |
| Example 6-17 | | | TCNQ | 0.1 | | 57 | 60 | 78 |
| Example 6-18 | | | NCOP | 0.1 | | 58 | 60 | 60 |
| Example 6-19 | | | DNCO | 0.5 | | 56 | 60 | 63 |
| Example 6-20 | | | DNCOB | 0.5 | | 59 | 60 | 59 |
| Example 6-21 | | | NEP | 0.5 | | 60 | 63 | 64 |
| Example 6-22 | | | NPP | 0.5 | | 57 | 61 | 58 |
| Example 6-23 | | | NCHP | 0.5 | | 58 | 60 | 57 |
| Example 6-24 | | | NPhP | 0.5 | | 56 | 59 | 59 |
| Example 6-25 | | | — | — | C$_4$F$_9$OCH$_3$ | 58 | 60 | 61 |
| Example 6-26 | | | — | — | C$_6$F$_{13}$OCH$_3$ | 60 | 61 | 60 |

TABLE 9

Anode active material: silicon
Solvent: EC + DEC
Electrolyte salt: LiPF$_6$

| | Sulfone compound | | Nitrile compound or the like | | Ether compound | Cycle discharge capacity retention ratio (%) | | Safety valve operation time |
|---|---|---|---|---|---|---|---|---|
| | Type | Content (wt %) | Type | Content (wt %) | | 23 deg C. | 45 deg C. | (time) |
| Example 6-27 | Formula (1-2) | 1 | SCN + DNCO | 0.1 + 0.5 | — | 67 | 68 | 69 |
| Example 6-28 | | | SCN + NEP | 0.1 + 0.5 | | 68 | 68 | 68 |
| Example 6-29 | | | DNCO + NEP | 0.5 + 0.5 | | 68 | 69 | 68 |
| Example 6-30 | | | SCN | 0.1 | C$_4$F$_9$OCH$_3$ | 67 | 68 | 69 |
| Example 6-31 | | | DNCO | 0.5 | | 66 | 67 | 69 |
| Example 6-32 | | | NEP | 0.5 | | 67 | 69 | 67 |

TABLE 9-continued

Anode active material: silicon
Solvent: EC + DEC
Electrolyte salt: $LiPF_6$

| | Other solvent | | | | | | Safety | |
|---|---|---|---|---|---|---|---|---|
| | Sulfone compound | | Nitrile compound or the like | | | Cycle discharge capacity retention ratio (%) | | valve operation time |
| | Type | Content (wt %) | Type | Content (wt %) | Ether compound | 23 deg C. | 45 deg C. | (time) |
| Example 6-33 | — | — | — | — | — | 30 | 32 | 25 |
| Example 6-34 | Formula (1-1) | 1 | — | — | — | 35 | 39 | 30 |
| Example 6-35 | Formula (1-2) | 1 | | | | 32 | 35 | 26 |
| Example 6-36 | — | — | SCN | 0.1 | | 20 | 21 | 40 |
| Example 6-37 | | | DCNH | 0.1 | | 14 | 16 | 42 |
| Example 6-38 | | | PTCN | 0.1 | | 15 | 14 | 40 |
| Example 6-39 | | | TCNQ | 0.1 | | 15 | 15 | 38 |
| Example 6-40 | | | NCOP | 0.1 | | 18 | 19 | 41 |
| Example 6-41 | | | DNCO | 0.5 | | 22 | 23 | 42 |
| Example 6-42 | | | DNCOB | 0.5 | | 19 | 17 | 40 |
| Example 6-43 | | | NEP | 0.5 | | 19 | 20 | 41 |
| Example 6-44 | | | NPP | 0.5 | | 19 | 19 | 40 |
| Example 6-45 | | | NCHP | 0.5 | | 19 | 18 | 40 |
| Example 6-46 | | | NPhP | 0.5 | | 18 | 19 | 41 |
| Example 6-47 | | | — | — | $C_4F_9OCH_3$ | 10 | 11 | 40 |
| Example 6-48 | | | — | — | $C_6F_{13}OCH_3$ | 11 | 11 | 41 |

As illustrated in Table 8 and Table 9, in the case of using silicon as an anode active material, results similar to the results shown in Table 1 and Table 2 were obtained as well. That is, in Examples 6-1 to 6-32 in which the combination of the sulfone compound and the nitrile compound or the like was used, the cycle discharge capacity retention ratios at 23 deg C. and 45 deg C. were higher and safety valve operation time was longer than in Examples 6-33 to 6-48 in which the combination of the sulfone compound and the nitrile compound or the like was not used. Further, in this case, the cycle discharge capacity retention ratio and safety valve operation time at 23 deg C. and 45 deg C. became favorable without depending on the type of the sulfone compound and the type of the nitrile compound or the like. Specially, in the case where the plurality of kinds of nitrile compounds were used together with the sulfone compound (Examples 6-27 to 6-32), the cycle discharge capacity retention ratio at 23 deg C. and 45 deg C. and safety valve operation time became more favorable than in the case that one kind of nitrile compounds was used (Examples 6-14 to 6-26). Accordingly, it was confirmed that in the secondary battery using silicon as an anode active material, in the case where the solvent of the electrolyte contained the sulfone compound and the nitrile compound or the like, cycle characteristics and safety were improved as well.

Examples 7-1 to 7-28

A procedure similar to that of Examples 2-1 to 2-28 was executed, except that silicon was used as an anode active material and diethyl carbonate (DEC) was used instead of DMC as a solvent as in Examples 6-1 to 6-48 as illustrated in Table 10. For the secondary batteries of Examples 7-1 to 7-28, cycle characteristics at 23 deg C. and 45 deg C. and safety valve operation time were examined. The results illustrated in Table 10 were obtained.

TABLE 10

Anode active material: silicon
Solvent: EC + DEC
Electrolyte salt: $LiPF_6$

| | Other solvent | | | | | | Safety | |
|---|---|---|---|---|---|---|---|---|
| | Sulfone compound | | Nitrile compound or the like | | | Cycle discharge capacity retention ratio (%) | | valve operation time |
| | Type | Content (wt %) | Type | Content (wt %) | Ether compound | 23 deg C. | 45 deg C. | (time) |
| Example 7-1 | Formula (2-1) | 1 | SCN | 0.1 | — | 64 | 67 | 62 |
| Example 7-2 | | | DCNH | 0.1 | | 61 | 63 | 59 |
| Example 7-3 | | | PTCN | 0.1 | | 61 | 65 | 61 |
| Example 7-4 | | | TCNQ | 0.1 | | 60 | 62 | 60 |
| Example 7-5 | | | NCOP | 0.1 | | 62 | 64 | 61 |
| Example 7-6 | | | DNCO | 0.5 | | 63 | 65 | 63 |

TABLE 10-continued

Anode active material: silicon
Solvent: EC + DEC
Electrolyte salt: $LiPF_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 7-7 | | | DNCOB | 0.5 | | 63 | 64 | 62 |
| Example 7-8 | | | NEP | 0.5 | | 62 | 65 | 64 |
| Example 7-9 | | | NPP | 0.5 | | 62 | 63 | 62 |
| Example 7-10 | | | NCHP | 0.5 | | 62 | 64 | 61 |
| Example 7-11 | | | NPhP | 0.5 | | 60 | 63 | 62 |
| Example 7-12 | | | — | — | $C_4F_9OCH_3$ | 62 | 64 | 61 |
| Example 7-13 | | | — | — | $C_6F_{13}OCH_3$ | 60 | 64 | 62 |
| Example 7-14 | Formula (2-2) | 1 | SCN | 0.1 | — | 63 | 66 | 61 |
| Example 7-15 | | | DCNH | 0.1 | | 59 | 59 | 60 |
| Example 7-16 | | | PTCN | 0.1 | | 60 | 64 | 60 |
| Example 7-17 | | | TCNQ | 0.1 | | 58 | 59 | 61 |
| Example 7-18 | | | NCOP | 0.1 | | 61 | 63 | 61 |
| Example 7-19 | | | DNCO | 0.5 | | 62 | 64 | 62 |
| Example 7-20 | | | DNCOB | 0.5 | | 62 | 63 | 61 |
| Example 7-21 | | | NEP | 0.5 | | 61 | 64 | 63 |
| Example 7-22 | | | NPP | 0.5 | | 61 | 62 | 61 |
| Example 7-23 | | | NCHP | 0.5 | | 61 | 63 | 61 |
| Example 7-24 | | | NPhP | 0.5 | | 59 | 62 | 60 |
| Example 7-25 | | | — | — | $C_4F_9OCH_3$ | 61 | 63 | 60 |
| Example 7-26 | | | — | — | $C_6F_{13}OCH_3$ | 59 | 63 | 61 |
| Example 7-27 | Formula (2-1) | 1 | — | — | — | 37 | 40 | 32 |
| Example 7-28 | Formula (2-2) | 1 | | | | 33 | 38 | 31 |

As illustrated in Table 10, in the secondary battery using silicon as an anode active material, results similar to the results shown in Table 8 and Table 9 were obtained as well even if the type of sulfone compound was changed. That is, in Examples 7-1 to 7-26 in which the combination of the sulfone compound and the nitrile compound or the like was used, the cycle discharge capacity retention ratios at 23 deg C. and 45 deg C. were higher and safety valve operation time was longer than in Examples 6-33 to 6-48, 7-27, and 7-28 in which the combination of the sulfone compound and the nitrile compound or the like was not used. Accordingly, it was confirmed that in the secondary battery using silicon as an anode active material, in the case where the solvent of the electrolyte contained the sulfone compound and the nitrile compound or the like, cycle characteristics and safety were improved as well.

Examples 8-1 to 8-9

A procedure similar to that of Examples 3-1 to 3-9 was executed, except that silicon was used as an anode active material and diethyl carbonate (DEC) was used instead of DMC as a solvent as in Examples 6-1 to 6-48 as illustrated in Table 11. For the secondary batteries of Examples 8-1 to 8-9, cycle characteristics respectively at 23 deg C. and 45 deg C. and safety were examined. The results illustrated in Table 11 were obtained.

TABLE 11

Anode active material: silicon
Solvent: EC + DEC + FEC
Electrolyte salt: $LiPF_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 8-1 | Formula (1-2) | 1 | SCN | 0.1 | — | 70 | 74 | 81 |
| Example 8-2 | | | DNCO | 0.5 | | 71 | 73 | 81 |
| Example 8-3 | | | NEP | 0.5 | | 70 | 71 | 83 |
| Example 8-4 | | | — | — | $C_4F_9OCH_3$ | 68 | 74 | 82 |

TABLE 11-continued

Anode active material: silicon
Solvent: EC + DEC + FEC
Electrolyte salt: $LiPF_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 8-5 | Formula (2-1) | 1 | SCN | 0.1 | — | 73 | 75 | 83 |
| Example 8-6 | | | DNCO | 0.5 | | 72 | 74 | 84 |
| Example 8-7 | | | NEP | 0.5 | | 71 | 75 | 85 |
| Example 8-8 | | | — | — | $C_4F_9OCH_3$ | 69 | 74 | 83 |
| Example 8-9 | — | | — | — | — | 44 | 47 | 29 |

As illustrated in Table 11, in the secondary battery using silicon as an anode active material, results similar to the results shown in Table 6 and Table 7 were obtained even if FEC was added to the electrolyte. That is, in Examples 8-1 to 8-8 in which the combination of the sulfone compound and the nitrile compound or the like was used, the discharge capacity retention ratios at 23 deg C. and 45 deg C. were higher and safety valve operation time was longer than in Example 8-9 in which the combination of the sulfone compound and the nitrile compound or the like was not used. In this case, in Examples 8-1 to 8-8, the cycle discharge capacity retention ratios at 23 deg C. and 45 deg C. were higher and safety valve operation time was longer than in Examples 6-14, 6-19, 6-21, 6-25, 7-1, 7-6, 7-8, and 7-12 in which FEC was not used. Accordingly, it was confirmed that in the secondary battery using silicon as an anode active material, in the case where the solvent of the electrolytic solution contained the sulfone compound and the nitrile compound or the like, cycle characteristics and safety were improved even if the composition of the solvent was changed. In this case, in particular, it was confirmed that in the case where the solvent contained the halogenated cyclic ester carbonate shown in Formula (7), cycle characteristics and safety were more improved.

Examples 9-1 to 9-20

A procedure similar to that of Examples 4-1 to 4-20 was executed, except that silicon was used as an anode active material and diethyl carbonate (DEC) was used instead of DMC as a solvent as in Examples 6-1 to 6-48 as illustrated in Table 12. For the secondary batteries of Examples 9-1 to 9-20, cycle characteristics respectively at 23 deg C. and 45 deg C. and safety were examined. The results illustrated in Table 12 were obtained.

TABLE 12

Anode active material: silicon
Solvent: EC + DEC
Electrolyte salt: $LiPF_6$

| | | Other solvent | | | | | Cycle discharge capacity retention ratio (%) | | Safety valve operation time |
|---|---|---|---|---|---|---|---|---|---|
| | | Sulfone compound | | Nitrile compound or the like | | | | | |
| | Solvent | Type | Content (wt %) | Type | Content (wt %) | Ether compound | 23 deg C. | 45 deg C. | (time) |
| Example 9-1 | tDFEC | Formula (1-2) | 1 | SCN | 0.1 | — | 72 | 74 | 80 |
| Example 9-2 | VC | | | | | | 66 | 70 | 83 |
| Example 9-3 | PRS | | | | | | 68 | 70 | 82 |
| Example 9-4 | SCAH | | | | | | 67 | 71 | 84 |
| Example 9-5 | tDFEC | Formula (1-2) | 1 | DNCO | 0.5 | — | 71 | 73 | 80 |
| Example 9-6 | VC | | | | | | 65 | 68 | 84 |
| Example 9-7 | PRS | | | | | | 67 | 70 | 81 |
| Example 9-8 | SCAH | | | | | | 65 | 68 | 84 |
| Example 9-9 | tDFEC | Formula (1-2) | 1 | NEP | 0.5 | — | 70 | 73 | 81 |
| Example 9-10 | VC | | | | | | 64 | 66 | 84 |
| Example 9-11 | PRS | | | | | | 67 | 71 | 81 |
| Example 9-12 | SCAH | | | | | | 66 | 68 | 85 |
| Example 9-13 | tDFEC | Formula (1-2) | 1 | — | — | $C_4F_9OCH_3$ | 67 | 72 | 80 |
| Example 9-14 | VC | | | | | | 65 | 67 | 83 |
| Example 9-15 | PRS | | | | | | 68 | 70 | 81 |
| Example 9-16 | SCAH | | | | | | 66 | 68 | 84 |
| Example 9-17 | tDFEC | — | | — | — | — | 46 | 48 | 28 |
| Example 9-18 | VC | | | | | | 40 | 42 | 26 |
| Example 9-19 | PRS | | | | | | 42 | 43 | 29 |
| Example 9-20 | SCAH | | | | | | 41 | 43 | 27 |

As illustrated in Table 12, in the secondary battery using silicon as an anode active material, results similar to the results shown in Table 6 and Table 7 were obtained even if tDFEC or the like was added to the electrolyte. That is, in Examples 9-1 to 9-16 in which the combination of the sulfone compound and the nitrile compound or the like was used, the cycle discharge capacity retention ratios at 23 deg C. and 45 deg C. were higher and safety valve operation time was longer than in Examples 9-1 to 9-20 in which the combination of the sulfone compound and the nitrile compound or the like was not used. In this case, in Examples 9-1 to 9-16 in which tDFEC or the like was used, the discharge capacity retention ratios at 23 deg C. and 45 deg C. and safety valve operation time were significantly higher than in Examples 6-14, 6-19, 6-21, and 6-25 in which tDFEC or the like was not used. Accordingly, it was confirmed that in the secondary battery using silicon as an anode active material, in the case where the solvent of the electrolyte contained the sulfone compound and the nitrile compound or the like, cycle characteristics and safety were improved even if the composition of the solvent was changed. In this case, in particular, it was confirmed that in the case where the solvent of the electrolytic solution contained at least one kind of the halogenated cyclic ester carbonate shown in Formula (7), the unsaturated carbon bond cyclic ester carbonate shown in Formula (8), sultone, and the acid anhydride, cycle characteristics and safety were more improved.

Examples 10-1 to 10-15

A procedure similar to that of Examples 5-1 to 5-15 was executed, except that silicon was used as an anode active material and diethyl carbonate (DEC) was used instead of DMC as a solvent as in Examples 6-1 to 6-48 as illustrated in Table 13 and Table 14. For the secondary batteries of Examples 10-1 to 10-15, cycle characteristics respectively at 23 deg C. and 45 deg C., safety, and storage characteristics were examined. The results illustrated in Table 13 and Table 14 were obtained. In Table 13 and Table 14, the storage characteristics results for the secondary batteries of Examples 6-14, 6-19, 6-21, 6-25, and 6-33 were also shown.

TABLE 13

Anode active material: silicon; Solvent: EC + DEC; Electrolyte salt: $LiPF_6$

| | Sulfone compound | | Nitrile compound or the like | | Other solvent Ether compound | Electrolyte salt | Cycle discharge capacity retention ratio (%) | | Safety valve operation time (time) | Storage discharge capacity retention ratio (%) |
|---|---|---|---|---|---|---|---|---|---|---|
| | Type | Content (wt %) | Type | Content (wt %) | | | 23 deg C. | 45 deg C. | | |
| Example 6-14 | Formula (1-2) | 1 | SCN | 0.1 | — | — | 58 | 61 | 62 | 59 |
| Example 10-1 | | | | | | $LiBF_4$ | 60 | 63 | 70 | 79 |
| Example 10-2 | | | | | | Formula (11-6) | 61 | 64 | 71 | 76 |
| Example 10-3 | | | | | | LiTFSI | 60 | 63 | 72 | 73 |
| Example 6-19 | Formula (1-2) | 1 | DNCO | 0.5 | — | — | 56 | 60 | 63 | 60 |
| Example 10-4 | | | | | | $LiBF_4$ | 57 | 62 | 69 | 70 |
| Example 10-5 | | | | | | Formula (11-6) | 58 | 62 | 72 | 79 |
| Example 10-6 | | | | | | LiTFSI | 61 | 63 | 70 | 73 |
| Example 6-21 | Formula (1-2) | 1 | NEP | 0.5 | — | — | 60 | 63 | 64 | 60 |
| Example 10-7 | | | | | | $LiBF_4$ | 62 | 65 | 69 | 69 |
| Example 10-8 | | | | | | Formula (11-6) | 62 | 64 | 68 | 72 |
| Example 10-9 | | | | | | LiTFSI | 61 | 64 | 70 | 79 |
| Example 6-25 | Formula (1-2) | 1 | — | — | $C_4F_9OCH_3$ | — | 58 | 60 | 61 | 57 |
| Example 10-10 | | | | | | $LiBF_4$ | 59 | 64 | 69 | 68 |
| Example 10-11 | | | | | | Formula (11-6) | 60 | 61 | 68 | 70 |
| Example 10-12 | | | | | | LiTFSI | 62 | 63 | 71 | 78 |

TABLE 14

Anode active material: silicon; Solvent: EC + DEC; Electrolyte salt: $LiPF_6$

| | Sulfone compound | | Nitrile compound or the like | | Other solvent Ether compound | Electrolyte salt | Cycle discharge capacity retention ratio (%) | | Safety valve operation time (time) | Storage discharge capacity retention ratio (%) |
|---|---|---|---|---|---|---|---|---|---|---|
| | Type | Content (wt %) | Type | Content (wt %) | | | 23 deg C. | 45 deg C. | | |
| Example 6-33 | — | — | — | — | — | — | 30 | 32 | 25 | 40 |
| Example 10-13 | | | | | | $LiBF_4$ | 28 | 31 | 28 | 51 |

TABLE 14-continued

Anode active material: silicon; Solvent: EC + DEC; Electrolyte salt: LiPF$_6$

| | Other solvent | | | | | Cycle discharge capacity retention ratio (%) | | Safety valve operation time (time) | Storage discharge capacity retention ratio (%) |
|---|---|---|---|---|---|---|---|---|---|
| | Sulfone compound | | Nitrile compound or the like | | Ether compound | Electrolyte salt | | | |
| | Type | Content (wt %) | Type | Content (wt %) | | | 23 deg C. | 45 deg C. | | |
| Example 10-14 | | | | | | Formula (11-6) | 31 | 32 | 29 | 50 |
| Example 10-15 | | | | | | LiTFSI | 30 | 31 | 27 | 48 |

As illustrated in Table 13 and Table 14, in the secondary battery using silicon as an anode active material, results similar to the results shown in Table 6 and Table 7 were obtained even if LiBF$_4$ or the like was added to the electrolyte. That is, in Examples 10-1 to 10-12 in which the combination of the sulfone compound and the nitrile compound or the like was used, the cycle discharge capacity retention ratios at 23 deg C. and 45 deg C. were higher and safety valve operation time was longer than in Examples 10-13 to 10-15 in which the combination of the sulfone compound and the nitrile compound or the like was not used. Further, in this case, in Examples 10-1 to 10-12, the storage discharge capacity retention ratios were higher than those in Examples 10-13 to 10-15. In particular, in Examples 10-1 to 10-12 in which LiBF$_4$ or the like was added to the electrolyte, the cycle discharge capacity retention ratios at 23 deg C. and 45 deg C., safety valve operation time, and the storage discharge capacity retention ratios were significantly higher than those in Examples 6-14, 6-19, 6-21, and 6-25 in which LiBF$_4$ or the like was not added to the electrolyte. Accordingly, it was confirmed that in the secondary battery using silicon as an anode active material, in the case where the solvent of the electrolyte contained the sulfone compound and the nitrile compound or the like, cycle characteristics and safety were improved even if the composition of the electrolyte salt was changed. In this case, in particular, it was confirmed that in the case where the electrolyte salt contained at least one kind of LiBF$_4$, the compound shown in Formula (11), and the compound shown in Formula (14), safety and storage characteristics together with cycle characteristics were more improved.

Examples 11-1 to 11-15

A procedure similar to that of Examples 1-14, 1-19, 1-21, 1-25, 2-1, 2-6, 2-8, 2-12, 1-33, 1-35, 2-27, 1-36, 1-41, 1-43, and 1-47 was executed, except that the anode 22 was formed by using the SnCoC-containing material as an anode active material.

In forming the anode 22, first, cobalt powder and tin powder were alloyed to obtain cobalt tin alloy powder. After that, the resultant was added with carbon powder and dry-mixed. Subsequently, 10 g of the foregoing mixture and about 400 g of a corundum being 9 mm in diameter were set in a reaction container of a planetary ball mill (manufactured by Ito Seisakusho Co.). Subsequently, inside of the reaction container was substituted with argon atmosphere. After that, 10 minute operation at 250 rpm and 10 minute break were repeated until the total operation time reached 20 hours. Subsequently, the reaction container was cooled down to room temperature and the SnCoC-containing material was taken out. After that, the resultant was screened through a 280 mesh sieve to remove coarse grain.

Figure 9:
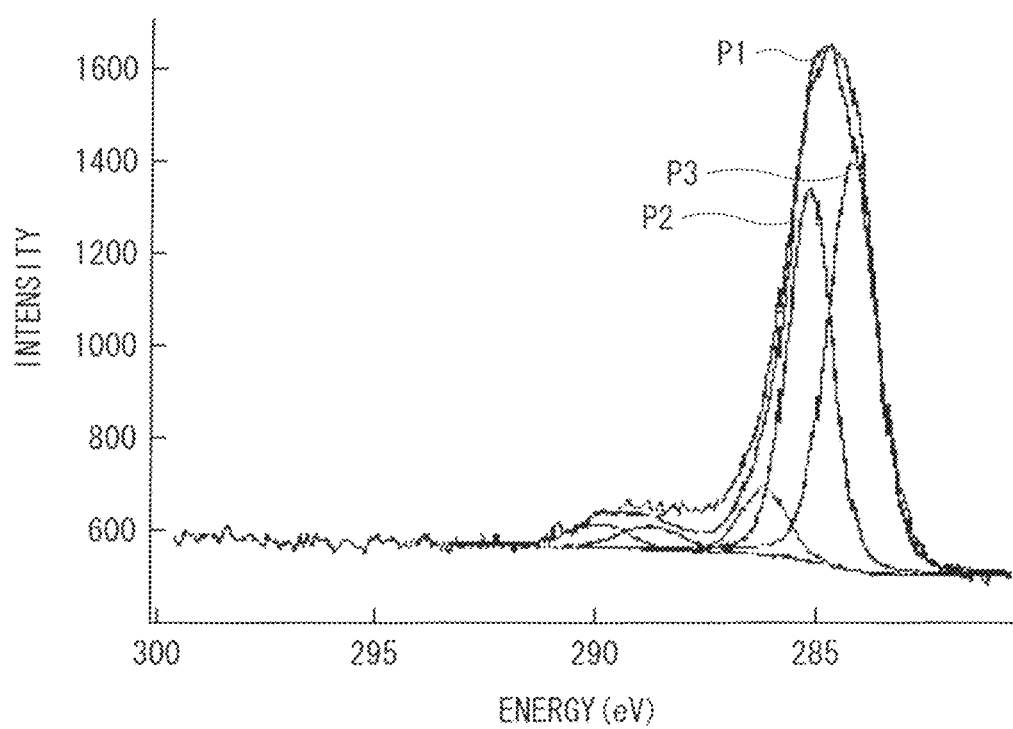
FIG. 9 is a diagram illustrating an analytical result of an SnCoC-containing material by XPS.

The composition of the obtained SnCoC-containing material was analyzed. The tin content was 49.5 mass %, the cobalt content was 29.7 mass %, the carbon content was 19.8 mass %, and the ratio of tin and cobalt (Co/(Sn+Co)) was 37.5 mass %. At this time, the tin content and the cobalt content were measured by Inductively Coupled Plasma (ICP) emission analysis, and the carbon content was measured by carbon sulfur analyzer. Further, the SnCoC-containing material was analyzed by X-ray diffraction method. A diffraction peak having a half-width of 1.0 deg or more based on diffraction angle of 2θ in the range of 2θ=20 to 50 deg was observed. Further, in the case where the SnCoC-containing material was analyzed by XPS, as illustrated in FIG. 9, peak P1 was obtained. In the case where the peak P1 was analyzed, peak P2 of the surface contamination carbon and peak P3 of C1s in the SnCoC-containing material existing on the lower energy side (region lower than 284.5 eV) were obtained. From the result, it was confirmed that carbon in the SnCoC-containing material was bonded to other element.

After the SnCoC-containing material was obtained, 80 parts by mass of the SnCoC-containing material as an anode active material, 8 parts by mass of polyvinylidene fluoride as an anode binder, and 12 parts by mass of graphite as an anode electrical conductor were mixed to obtain an anode mixture. Subsequently, the anode mixture was dispersed in N-methyl-2-pyrrolidone to obtain paste anode mixture slurry. Finally, both faces of the anode current collector 22A made of a copper foil (thickness: 15 μm) were uniformly coated with the anode mixture slurry by using a coating device and the resultant was dried to form the anode active material layer 22B (single face thickness: 50 μm). After that, the resultant was compression-molded by using a rolling press machine.

For the secondary batteries of Examples 11-1 to 11-15, cycle characteristics respectively at 23 deg C. and 45 deg C. and safety were examined. The results illustrated in Table 15 were obtained.

TABLE 15

Anode active material: SnCoC-containing material
Solvent: EC + DMC
Electrolyte salt: $LiPF_6$

| | Other solvent | | | | | Cycle discharge capacity retention ratio (%) | | Safety valve operation time |
|---|---|---|---|---|---|---|---|---|
| | Sulfone compound | | Nitrile compound or the like | | | | | |
| | Type | Content (wt %) | Type | Content (wt %) | Ether compound | 23 deg C. | 45 deg C. | (time) |
| Example 11-1 | Formula (1-2) | 1 | SCN | 0.1 | — | 68 | 70 | 74 |
| Example 11-2 | | | DNCO | 0.5 | | 71 | 73 | 73 |
| Example 11-3 | | | NEP | 0.5 | | 66 | 70 | 75 |
| Example 11-4 | | | — | — | $C_4F_9OCH_3$ | 70 | 72 | 74 |
| Example 11-5 | Formula (2-1) | 1 | SCN | 0.1 | — | 71 | 70 | 72 |
| Example 1-6 | | | DNCO | 0.5 | | 70 | 72 | 71 |
| Example 11-7 | | | NEP | 0.5 | | 70 | 73 | 69 |
| Example 11-8 | | | — | — | $C_4F_9OCH_3$ | 69 | 72 | 73 |
| Example 11-9 | — | — | — | — | — | 43 | 45 | 31 |
| Example 11-10 | Formula (1-2) | 1 | — | — | — | 50 | 52 | 34 |
| Example 11-11 | Formula (2-1) | 1 | | | | 51 | 54 | 33 |
| Example 11-12 | — | — | SCN | 0.1 | | 35 | 36 | 45 |
| Example 11-13 | | | DNCO | 0.5 | | 36 | 36 | 40 |
| Example 11-14 | | | NEP | 0.5 | | 34 | 35 | 41 |
| Example 11-15 | | | — | — | $C_4F_9OCH_3$ | 30 | 36 | 42 |

As illustrated in Table 15, in the case where the SnCoC-containing material was used as an anode active material, results similar to the results shown in Table 1 to Table 3 and Table 6 to Table 8 were obtained as well. That is, in Examples 11-1 to 11-8 in which the combination of the sulfone compound and the nitrile compound or the like was used, the discharge capacity retention ratios at 23 deg C. and 45 deg C. were higher and safety valve operation time was longer than in Examples 11-9 to 11-15 in which the combination of the sulfone compound and the nitrile compound or the like was not used. Further, in this case, the discharge capacity retention ratio and safety valve operation time became favorable without depending on the type of the sulfone compound and the type of the nitrile compound or the like. Accordingly, it was confirmed that in the secondary battery using the SnCoC-containing material as an anode active material, in the case where the solvent of the electrolyte contained the sulfone compound and the nitrile compound or the like, cycle characteristics and safety were improved.

Examples 12-1 to 12-10

A procedure similar to that of Examples 11-1 to 11-4 and 11-9 was executed, except that the composition of the solvent was changed as illustrated in Table 16. In this case, as a solvent, FEC or VC was used. In the case where FEC was used, in the examples in which the ether compound was not used, a mixed solvent was prepared so that the composition of EC, DMC, and FEC was 25:70:5 at a weight ratio (EC:DMC:FEC). Further, in the examples in which the ether compound was used, a mixed solvent was prepared so that the composition of EC, DMC, the ether compound, and FEC was 25:60:10:5 at a weight ratio (EC:DMC:ether compound:FEC). In the case where VC was used, the content thereof in the solvent was 1 wt %. For the secondary batteries of Examples 12-1 to 12-10, cycle characteristics and safety respectively at 23 deg C. and 45 deg C. were examined. The results illustrated in Table 16 were obtained.

TABLE 16

Anode active material: SnCoC-containing material
Solvent EC + DMC
Electrolyte salt: $LiPF_6$

| | | Other solvent | | | | | Cycle discharge capacity retention ratio (%) | | Safety valve operation time |
|---|---|---|---|---|---|---|---|---|---|
| | | Sulfone compound | | Nitrile compound or the like | | | | | |
| | Solvent | Type | Content (wt %) | Type | Content (wt %) | Ether compound | 23 deg C. | 45 deg C. | (time) |
| Example 12-1 | FEC | Formula (1-2) | 1 | SCN | 0.1 | — | 88 | 91 | 80 |
| Example 12-2 | VC | | | | | | 85 | 85 | 79 |
| Example 12-3 | FEC | Formula (1-2) | 1 | DNCO | 0.5 | — | 89 | 90 | 82 |
| Example 12-4 | VC | | | | | | 86 | 88 | 78 |
| Example 12-5 | FEC | Formula (1-2) | 1 | NEP | 0.5 | — | 85 | 85 | 84 |
| Example 12-6 | VC | | | | | | 82 | 84 | 80 |

TABLE 16-continued

Anode active material: SnCoC-containing material
Solvent EC + DMC
Electrolyte salt: $LiPF_6$

| | | Other solvent | | | | | Cycle discharge capacity retention ratio (%) | | Safety valve operation time |
|---|---|---|---|---|---|---|---|---|---|
| | | Sulfone compound | | Nitrile compound or the like | | | | | |
| | Solvent | Type | Content (wt %) | Type | Content (wt %) | Ether compound | 23 deg C. | 45 deg C. | (time) |
| Example 12-7 | FEC | Formula (1-2) | 1 | — | — | $C_4F_9OCH_3$ | 86 | 88 | 83 |
| Example 12-8 | VC | | | | | | 81 | 84 | 81 |
| Example 12-9 | FEC | — | — | — | — | — | 52 | 55 | 33 |
| Example 12-10 | VC | | | | | | 48 | 50 | 34 |

As illustrated in Table 16, in the secondary battery using the SnCoC-containing material as an anode active material, results similar to the results of Table 15 were obtained even if FEC or the like was added to the electrolytic solution. That is, in Examples 12-1 to 12-8 in which the combination of the sulfone compound and the nitrile compound or the like was used, the discharge capacity retention ratios at 23 deg C. and 45 deg C. were higher and safety valve operation time was longer than in Examples 12-9 and 12-10 in which the combination of the sulfone compound and the nitrile compound or the like was not used. In this case, in Examples 12-1 to 12-8 in which FEC or the like was used, the discharge capacity retention ratios at 23 deg C. and 45 deg C. were higher and safety valve operation time was longer than in Examples 11-1 to 11-4 in which FEC or the like was not used. Accordingly, it was confirmed that in the secondary battery using the SnCoC-containing material as an anode active material, in the case where the solvent of the electrolyte contained the sulfone
compound and the nitrile compound or the like, cycle characteristics and safety were improved even if the composition of the solvent was changed. In this case, in particular, it was confirmed that in the case where the electrolytic solution contained at least one kind of the halogenated cyclic ester carbonate shown in Formula (7) and the unsaturated carbon bond cyclic ester carbonate shown in Formula (8), cycle characteristics and safety were more improved.

Examples 13-1 to 13-15

A procedure similar to that of Examples 5-3, 5-6, 5-9, 5-12, and 5-15 was executed, except that the SnCoC-containing material was used as an anode active material as in Examples 11-1 to 11-15. For the secondary batteries of Examples 13-1 to 13-5, cycle characteristics and safety respectively at 23 deg C. and 45 deg C. were examined. The results illustrated in Table 17 were obtained.

TABLE 17

Anode active material: SnCoC-containing material
Solvent: EC + DMC
Electrolyte salt: $LiPF_6$

| | Other solvent | | | | | | | Cycle discharge capacity retention ratio (%) | | Safety valve operation time |
|---|---|---|---|---|---|---|---|---|---|---|
| | Sulfone compound | | Nitrile compound or the like | | | | | | | |
| | Type | Content (wt %) | Type | Content (wt %) | Ether compound | Electrolyte salt | 23 deg C. | 45 deg C. | (time) |
| Example 13-1 | Formula (1-2) | 1 | SCN | 0.1 | — | LiTFSI | 77 | 81 | 84 |
| Example 13-2 | | | DNCO | 0.5 | — | | 79 | 80 | 82 |
| Example 13-3 | | | NEP | 0.5 | — | | 75 | 77 | 83 |
| Example 13-4 | | | — | — | $C_4F_9OCH_3$ | | 75 | 81 | 82 |
| Example 13-5 | — | — | — | — | — | LiTFSI | 46 | 48 | 33 |

As illustrated in Table 17, in the secondary battery using the SnCoC-containing material as an anode active material, results similar to the results shown in Table 15 were obtained even if LiTFSI was added to the electrolyte. That is, in Examples 13-1 to 13-4 in which the combination of the sulfone compound and the nitrile compound or the like was used, the cycle discharge capacity retention ratios at 23 deg C. and 45 deg C. were higher and safety valve operation time was longer than in Example 13-5 in which the combination of the sulfone compound and the nitrile compound or the like was not used. In particular, in Examples 13-1 to 13-4 in which LiTFSI was added to the electrolyte, the cycle discharge capacity retention ratios at 23 deg C. and 45 deg C. were higher and safety valve operation time was longer than in Examples 11-1 to 11-4 in which LiTFSI was not added. Accordingly, it was confirmed that in the secondary battery using the SnCoC-containing material as an anode active material, in the case where the solvent of the electrolyte contained the sulfone compound and the nitrile compound or the like, cycle characteristics and safety were improved even if the composition of the electrolyte salt was changed. In this case, in particular, it was confirmed that in the case where the electrolyte contained at least one kind of the compounds shown in Formula (14), cycle characteristics and safety were more improved.

From the foregoing results of Table 1 to Table 17, the following was confirmed. That is, in the secondary battery of the present invention, the solvent of the electrolyte contained at least one kind of the sulfone compounds and at least one kind of the nitrile compound, the isocyanate compound, the pyrrolidone compound, and the ether compound. Thereby, cycle characteristics and safety were able to be improved without depending on the type of the anode active material, the solvent composition, the electrolyte salt composition or the like.

In this case, in the case where the metal material (silicon or the SnCoC-containing material) was used, the increase ratio of the cycle discharge capacity retention ratios at 23 deg C. and 45 deg C. and the increase ratio of safety valve operation time and the like were larger than those in the case that the carbon material (artificial graphite) was used as an anode active material. Accordingly, in the case of using the metal material as an anode active material, higher effect is able to be obtained than in the case of using the carbon material. Such a result may be obtained for the following reason. That is, in the case where the metal material advantageous to realizing high capacity as an anode active material was used, the electrolytic solution was easily decomposed than in the case of using the carbon material. Accordingly, decomposition inhibition effect of electrolytic solution was significantly demonstrated.

The present invention has been described with reference to the embodiment and the examples. However, the present invention is not limited to the aspects described in the foregoing embodiment and the foregoing examples, and various modifications may be made. For example, use application of the electrolyte of the present invention is not necessarily limited to the secondary battery, but may be other electrochemical device. Examples of other use applications include a capacitor.

Further, in the foregoing embodiment and the foregoing examples, the description has been given of the lithium ion secondary battery or the lithium metal secondary battery as a secondary battery type. However, the secondary battery of the present invention is not limited thereto. The present invention is able to be similarly applied to a secondary battery in which the anode capacity includes the capacity by inserting and extracting lithium ions and the capacity associated with precipitation and dissolution of lithium metal, and the anode capacity is expressed by the sum of these capacities. In this case, an anode material capable of inserting and extracting lithium ions is used as an anode active material. Further, the chargeable capacity of the anode material is set to a smaller value than the discharge capacity of the cathode.

Further, in the foregoing embodiment and the foregoing examples, the description has been given with the specific examples of the case in which the battery structure is the cylindrical type or the laminated film type, and with the specific example in which the battery element has the spirally wound structure. However, applicable structures are not limited thereto. The secondary battery of the present invention is able to be similarly applied to a battery having other battery structure such as a square type battery, a coin type battery, and a button type battery or a battery in which the battery element has other structure such as a laminated structure.

Further, in the foregoing embodiment and the foregoing examples, though the description has been given of the case using lithium as an electrode reactant element, the electrode reactant element is not necessarily limited thereto. As an electrode reactant, for example, other Group 1 element such as sodium (Na) and potassium (K), a Group 2 element such as magnesium and calcium, or other light metal such as aluminum may be used. The effect of the present invention is able to be obtained without depending on the electrode reactant type, and thus even if the electrode reactant type is changed, similar effect is able to be obtained.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:
1. An electrolyte, comprising:
a solvent and an electrolyte salt,
wherein the solvent contains at least one of sulfone compounds expressed by Formula (1) or Formula (2), succinonitrile, and
at least one of a halogenated cyclic ester carbonate expressed by Formula (3), unsaturated carbon bond cyclic ester carbonates expressed by Formula (4) to Formula (6), sultone, or an acid anhydride, excluding the sulfone compounds shown in the Formula (1) and the Formula (2),

(1)

where R1 is one of an alkenylene group with carbon number from 2 to 4 both inclusive or a halogenated group thereof, an arylene group or a halogenated group thereof, or a derivative thereof,

(2)

where R2 is one of an alkenylene group with a carbon number from 2 to 4 both inclusive or a halogenated group thereof, an arylene group or a halogenated group thereof, or a derivative thereof

[Formula 3]

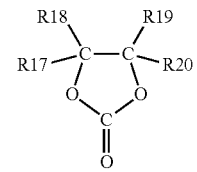

(3)

where R17 to R20 are one of a hydrogen group, a halogen group, an alkyl group, or a halogenated alkyl group, and where at least one of R17 to R20 is one of the halogen group or the halogenated alkyl group,

[Formula 4]

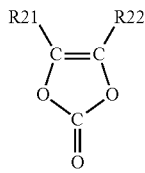

(4)

where R21 and R22 are one of a hydrogen group or an alkyl group,

[Formula 5]

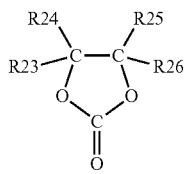

(5)

where R23 to R26 are one of a hydrogen group, an alkyl group, a vinyl group, or an aryl group, and where at least one of R23 to R26 is one of the vinyl group or the aryl group,

[Formula 6]

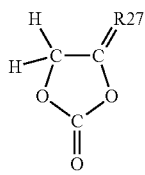

(6)

where R27 is an alkylene group.

2. A secondary battery, comprising:

a cathode;

an anode; and an electrolyte that contains a solvent and an electrolyte salt, wherein the solvent contains at least one of sulfone compounds expressed by one of Formula (1-1) to Formula (1-22) or one of Formula (2-1) to Formula (2-20), succinonitrile, and at least one of a halogenated cyclic ester carbonate expressed by Formula (3), unsaturated carbon bond cyclic ester carbonates expressed by Formula (4) to Formula (6), sultone, or an acid anhydride, excluding the sulfone compounds shown in the Formula (1-1) to Formula (1-22) and the Formula (2-1) to Formula (2-20),

[Formula (1-1) to Formula (1-22)]

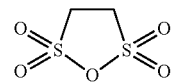 (1-1)

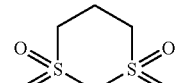 (1-2)

(1-3)

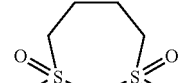 (1-4)

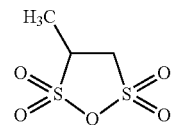 (1-5)

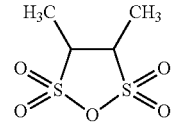 (1-6)

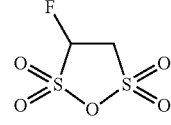 (1-7)

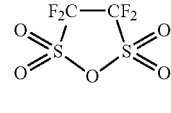 (1-8)

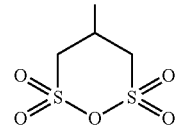 (1-9)

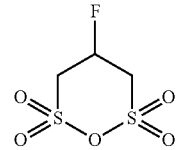 (1-10)

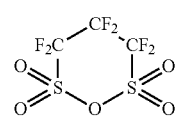 (1-11)

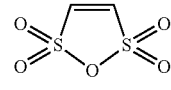 (1-12)

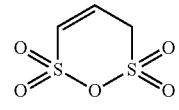

(1-13) 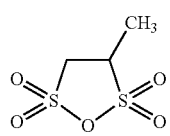
(1-14) 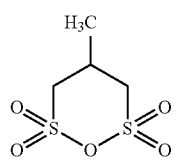
(1-15) 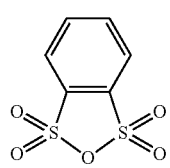
(1-16) 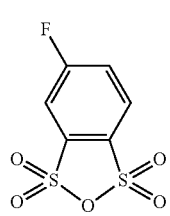
(1-17) 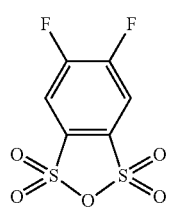
(1-18) 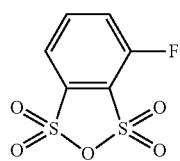
(1-19) 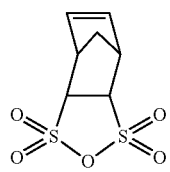
(1-20) 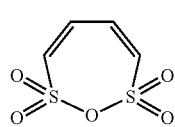
(1-21) 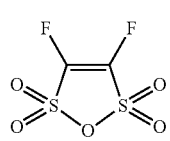
(1-22) 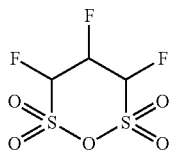
[Formula (2-1) to Formula (2-20)]
(2-1) 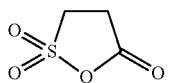
(2-2) 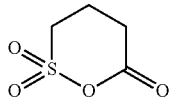
(2-3) 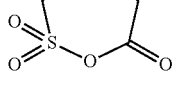
(2-4) 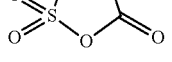
(2-5) 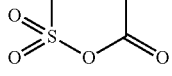
(2-6) 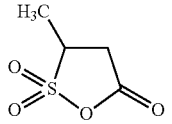
(2-7) 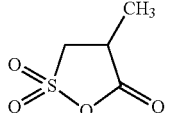
(2-8) 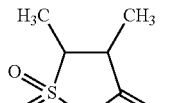
(2-9) 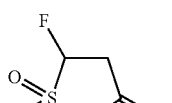
(2-10) 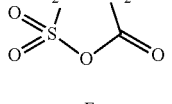
(2-11) 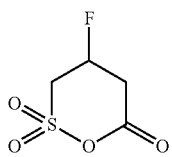

-continued (2-12) 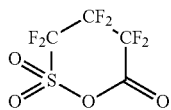

(2-13) 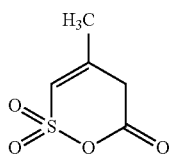

(2-14) 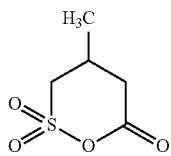

(2-15) 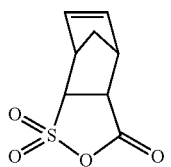

(2-16) 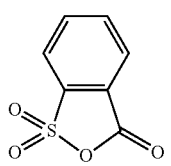

(2-17) 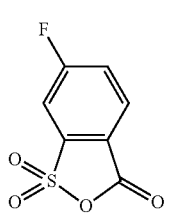

(2-18) 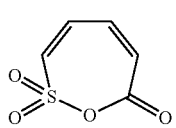

(2-19) 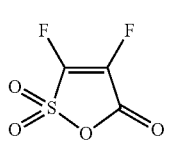

(2-20) 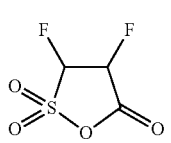

[Formula 3]

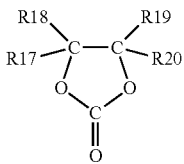

(3)

where R17 to R20 are at least one of a hydrogen group, a halogen group, an alkyl group, or a halogenated alkyl group, and where at least one of R17 to R20 is one of the halogen group or the halogenated alkyl group,

[Formula 4]

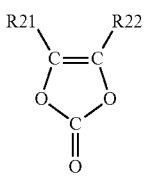

(4)

where R21 and R22 are one of a hydrogen group or an alkyl group,

[Formula 5]

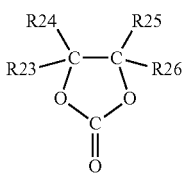

(5)

where R23 to R26 are one of a hydrogen group, an alkyl group, a vinyl group, or an aryl group, and where at least one of R23 to R26 is one of the vinyl group or the aryl group,

[Formula 6]

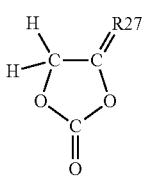

(6)

where R27 is an alkylene group.

3. The secondary battery according to claim 2, wherein an unsaturated carbon bond cyclic ester carbonate of the unsaturated carbon bond cyclic ester carbonates is at least one of vinylene carbonate, vinylethylene carbonate, or methylene ethylene carbonate, wherein a halogenated chain ester carbonate is at least one of fluoromethyl methyl carbonate or bis(fluoromethyl) carbonate, wherein the halogenated cyclic ester carbonate is one of 4-fluoro-1,3-dioxolane-2-one or 4,5-difluoro-1,3-dioxolane-2-one, wherein the sultone is one of propane sultone or propene sultone, and wherein the acid anhydride is one of succinic anhydride, glutaric anhydride, maleic anhydride, or phthalic anhydride.

4. The secondary battery according to claim 2, wherein the electrolyte salt contains at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), or compounds expressed by Formula (7) to Formula (12),

[Formula 7]

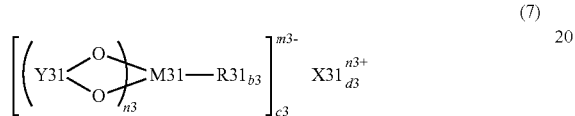

(7)

where X31 is one of a Group 1 element, a Group 2 element in a long period periodic table or aluminum (Al), where M31 is one of a transition metal element, a Group 13 element, a Group 14 element, or a Group 15 element in the long period periodic table, where R31 is a halogen group, where Y31 is one of —(O═)C—R32-C(═O)—, —(O═)C—(R33)$_2$—, or —(O═)C—C(═O)—, where R32 is one of an alkylene group, a halogenated alkylene group, an arylene group, or a halogenated arylene group, where R33 is one of an alkyl group, a halogenated alkyl group, an aryl group, or a halogenated aryl group, where a3 is one of integer numbers 1 to 4, where b3 is 0, 2, or 4, where c3, d3, m3, and n3 are one of integer numbers 1 to 3,

[Formula 8]

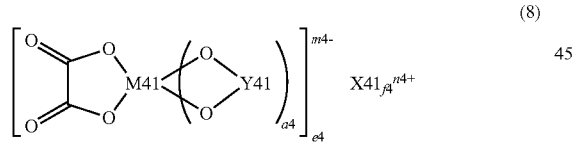

(8)

where X41 is one of a Group 1 element, a Group 2 element in the long period periodic table, where M41 is one of a transition metal element, a Group 13 element, a Group 14 element, or a Group 15 element in the long period periodic table, where Y41 is one of —(O═)C—(C(R41)$_2$)$_{b4}$—C—(═O)—, —(R43)$_2$C—(C(R42)$_2$)$_{c4}$—C—(═O)—, —(R43)$_2$C—(C(R42)$_2$)$_{c4}$—C(R43)$_2$—, —(R43)$_2$C—(C(R42)$_2$)$_{c4}$—S(═O)$_2$—, —(O═)$_2$S—C(R42)$_2$)$_{d4}$—S(═O)$_2$—, or —(O═)C—(C(R42)$_2$)$_{d4}$—S—(═O)$_2$—, where R41 and R43 are one of a hydrogen group, an alkyl group, a halogen group, or a halogenated alkyl group, where at least one of R41 or R43 is respectively the halogen group or the halogenated alkyl group, where R42 is one of a hydrogen group, an alkyl group, a halogen group, or a halogenated alkyl group, where a4, e4, and n4 are 1 or 2, where b4 and d4 are one of integer numbers 1 to 4, where c4 is one of integer numbers 0 to 4, and where f4 and m4 are one of integer numbers 1 to 3,

[Formula 9]

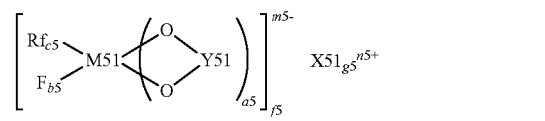

(9)

where X51 is one of a Group 1 element, a Group 2 element in the long period periodic table, where M51 is one of a transition metal element, a Group 13 element, a Group 14 element, or a Group 15 element in the long period periodic table, where Rf is one of a fluorinated alkyl group with carbon number from 1 to 10 both inclusive or a fluorinated aryl group with carbon number from 1 to 10 both inclusive, where Y51 is one of —(O═)C—(C(R51)$_2$)$_{d5}$—C(═O)—, —(R52)$_2$C—(C(R5)$_2$)$_{d5}$—C(═O)—, —(R52)$_2$C—(C(R51)$_2$)$_{d5}$—C(R52)$_2$—, —(R52)$_2$C—(C(R51)$_2$)$_{d5}$—S(═O)$_2$—, —(O═)$_2$S—(C(R51)$_2$)$_{e5}$—(═SO)$_2$—, or —(O═)C—(C(R51)$_2$)$_{e5}$—S(═O)$_2$—, where R51 is one of a hydrogen group, an alkyl group, a halogen group, or a halogenated alkyl group, where R52 is one of a hydrogen group, an alkyl group, a halogen group, or a halogenated alkyl group, and at least one thereof is one of the halogen group or the halogenated alkyl group, and where a5, f5, and n5 are 1 or 2, where b5, c5, and e5 are one of integer numbers 1 to 4, and where d5 is one of integer numbers 0 to 4, and where g5 and m5 are one of integer numbers 1 to 3

(10)

where m and n are an integer number equal to or greater than 1

[Formula 11]

(11)

where R61 is one of a straight chain or a branched perfluoro alkylene group with carbon number from 2 to 4 both inclusive

(12)

where p, q, and r are an integer number of 1 or more.

5. The secondary battery according to claim 2, wherein the compound shown in the Formula (7) is one of compounds expressed by Formula (7-1) to Formula (7-6), wherein the compound shown in the Formula (8) is one of compounds expressed by Formula (8-1) to Formula (8-8), and wherein the compound shown in the Formula (9) is a compound expressed by Formula (9-1)

[Formula (7-1) to Formula (7-6)]

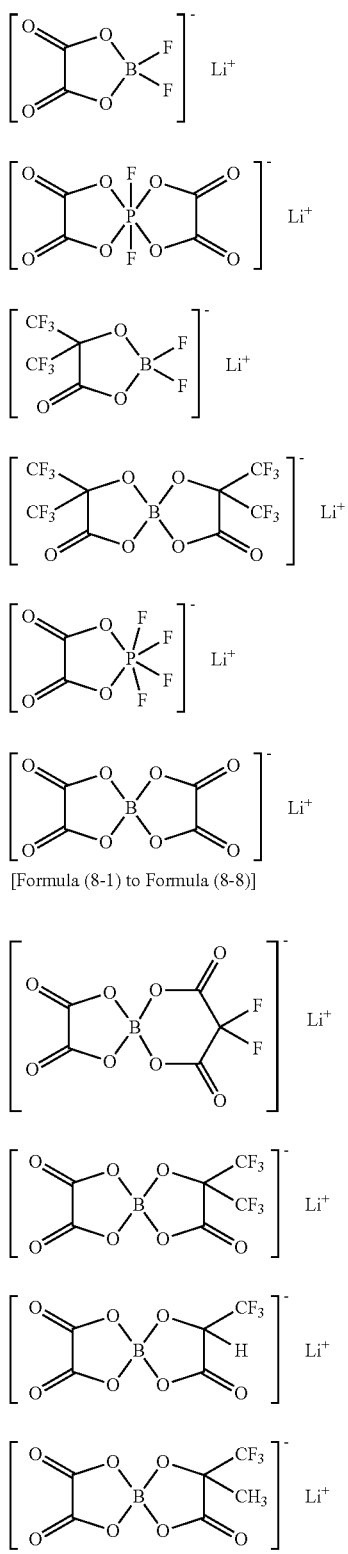

[Formula (8-1) to Formula (8-8)]

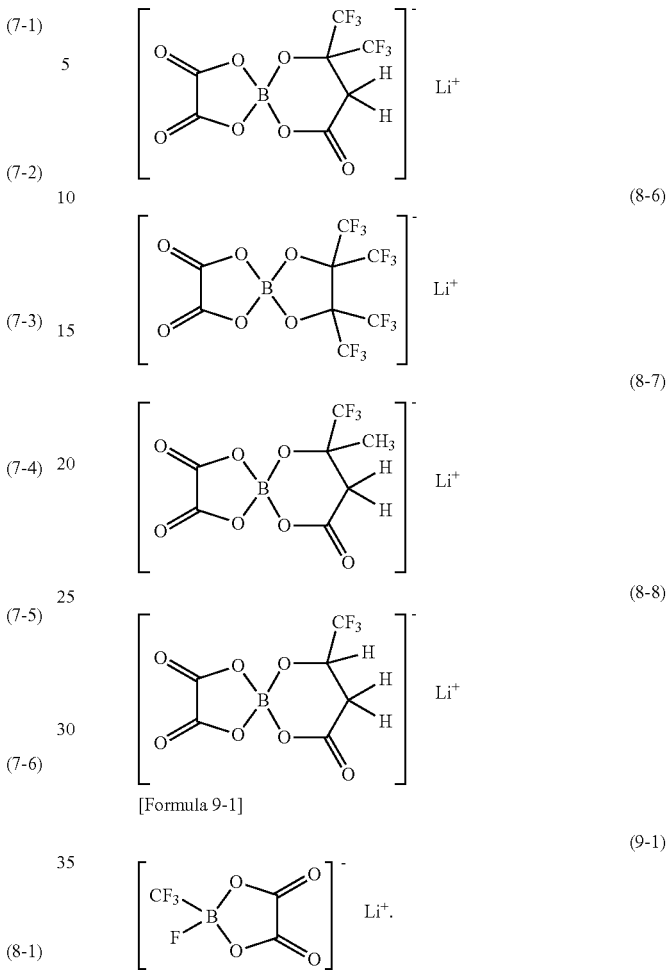

[Formula 9-1]

(9-1)

$$\left[ \begin{array}{c} CF_3 \\ \diagdown \\ F \end{array} B \begin{array}{c} O \\ \diagup \\ O \end{array} \begin{array}{c} O \\ \diagdown \\ O \end{array} \right]^- Li^+.$$

6. The secondary battery according to claim 2, wherein the anode contains at least one of a carbon material, lithium metal (Li), or a material that is able to insert and extract an electrode reactant and contains at least one of metal elements or metalloid elements as elements as an anode active material.

7. The secondary battery according to claim 2, wherein the anode contains a material containing at least one of silicon (Si) or tin (Sn) as a constituent element as an anode active material.

8. The secondary battery according to claim 7, wherein the material that contains at least one of silicon or tin as a constituent element is a simple substance of silicon or a material containing tin, cobalt (Co), and carbon (C) as a constituent element, wherein in the material that contains tin, cobalt (Co), and carbon (C) as a constituent element, a carbon content is 9.9 mass % or more and 29.7 mass % or less, a ratio of tin and cobalt (Co/(Sn+Co)) is from 20 mass % or more and 70 mass % or less, and half-width of a diffraction peak obtained by X-ray adiffraction is 1.0 deg or more.

\* \* \* \* \*